(12) United States Patent
Fanini et al.

(10) Patent No.: US 7,268,556 B2
(45) Date of Patent: *Sep. 11, 2007

(54) METHOD AND APPARATUS FOR A MULTI-COMPONENT INDUCTION INSTRUMENT MEASURING SYSTEM FOR GEOSTEERING AND FORMATION RESISTIVITY DATA INTERPRETATION IN HORIZONTAL, VERTICAL AND DEVIATED WELLS

(75) Inventors: Otto N. Fanini, Houston, TX (US); Stanislav W. Forgang, Houston, TX (US); Berthold Kriegshauser, Houston, TX (US); Liming Yu, Stafford, TX (US)

(73) Assignee: Baker Hughes Incorporated, Houston, TX (US)

( * ) Notice: Subject to any disclaimer, the term of this patent is extended or adjusted under 35 U.S.C. 154(b) by 118 days.

This patent is subject to a terminal disclaimer.

(21) Appl. No.: 10/824,093

(22) Filed: Apr. 14, 2004

(65) Prior Publication Data

US 2004/0196047 A1    Oct. 7, 2004

Related U.S. Application Data

(60) Division of application No. 10/214,436, filed on Aug. 7, 2002, now Pat. No. 6,900,640, which is a continuation-in-part of application No. 09/922,393, filed on Aug. 3, 2001, now Pat. No. 6,677,756.

(60) Provisional application No. 60/361,570, filed on Mar. 4, 2002.

(51) Int. Cl.
*G01V 3/18* (2006.01)

(52) U.S. Cl. .................................................. 324/339

(58) Field of Classification Search .................. 324/339
See application file for complete search history.

(56) References Cited

U.S. PATENT DOCUMENTS

| 5,038,107 | A | 8/1991 | Gianzero et al. |
| 5,168,234 | A | 12/1992 | Freedman |
| 5,339,036 | A | 8/1994 | Clark et al. |
| 5,453,693 | A | 9/1995 | Sinclair et al. |
| 5,530,358 | A | 6/1996 | Wisler et al. |
| 5,781,436 | A | 7/1998 | Forgang et al. |

(Continued)

FOREIGN PATENT DOCUMENTS

EP    0466454 A2    1/1992

(Continued)

*Primary Examiner*—Reena Aurora
(74) *Attorney, Agent, or Firm*—Madan, Mossman & Sriram, P.C.

(57) ABSTRACT

An improved induction tool for formation resistivity evaluations. The tool provides electromagnetic transmitters and sensors suitable for transmitting and receiving magnetic fields in radial directions that are orthogonal to the tool's longitudinal axis with minimal susceptibility to errors associated with parasitic eddy currents induced in the metal components surrounding the transmitter and receiver coils.

Various transmitter receiver combinations are provided to select sensitivity to a desired reservoir formation properties, for example, different orientations xy, xz, yz, 20-40, 20-90, and combinations, such as, Symmetric-symmetric; Asymmetric-symmetric; and Asymmetric-asymmetric. Measurements made with a multi-component logging instrument when used in a substantially horizontal, vertical or deviated borehole in earth formations are diagnostic of the direction of resistive beds relative to the position of the borehole.

11 Claims, 41 Drawing Sheets

U.S. PATENT DOCUMENTS

| | | |
|---|---|---|
| 5,886,526 A | 3/1999 | Wu |
| 5,892,361 A | 4/1999 | Meyer, Jr. et al. |
| 5,939,885 A | 8/1999 | McClure et al. |
| 6,084,052 A | 7/2000 | Aufdermarsh et al. |
| 6,105,690 A | 8/2000 | Biglin, Jr. et al. |
| 6,147,496 A * | 11/2000 | Strack et al. ............... 324/343 |
| 6,181,138 B1 * | 1/2001 | Hagiwara et al. ........... 324/338 |
| 6,188,222 B1 | 2/2001 | Seydoux et al. |
| 6,191,586 B1 | 2/2001 | Bittar |
| 6,297,639 B1 * | 10/2001 | Clark et al. ................. 324/338 |
| 6,310,470 B1 | 10/2001 | Hebing et al. |
| 6,466,872 B1 * | 10/2002 | Kriegshauser et al. ......... 702/7 |
| 6,566,881 B2 | 5/2003 | Omeragic et al. |
| 6,677,756 B2 | 1/2004 | Fanini et al. |

FOREIGN PATENT DOCUMENTS

| | | |
|---|---|---|
| FR | 2801985 A1 | 6/2001 |
| GB | 2287324 A | 9/1995 |

* cited by examiner

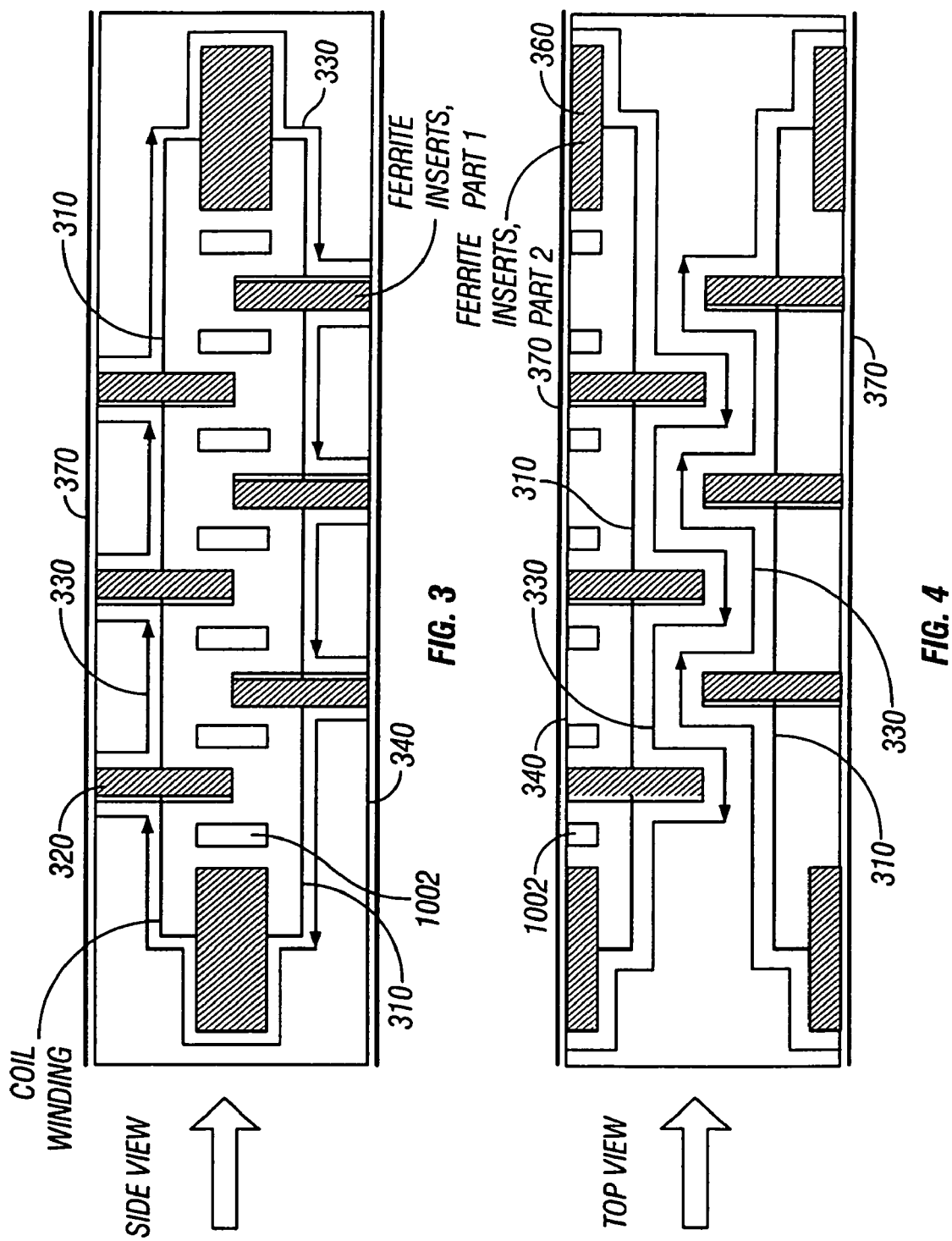

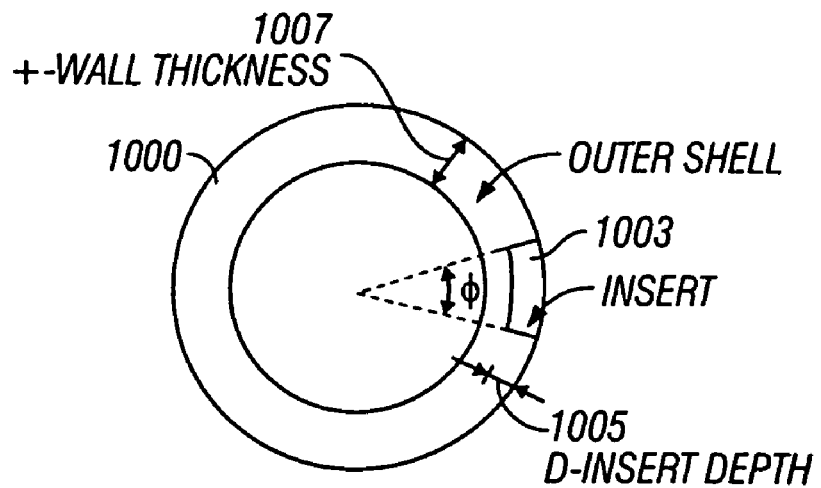
FIG. 15
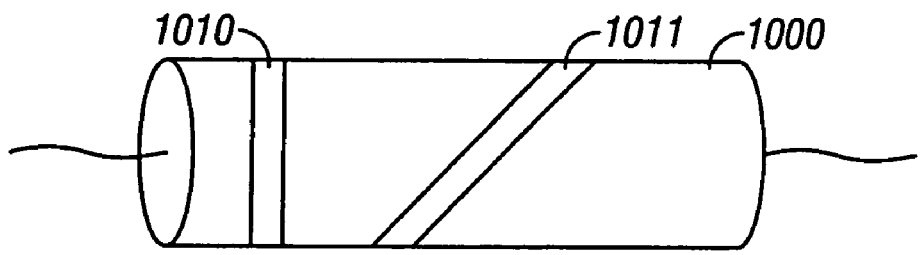
FIG. 16
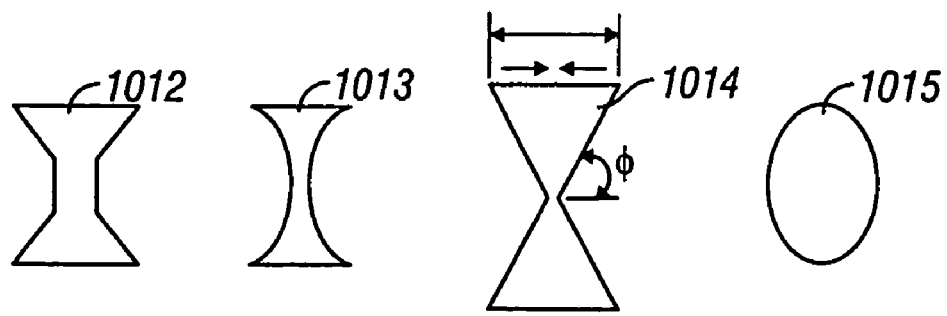
FIG. 17     FIG. 17A     FIG. 18

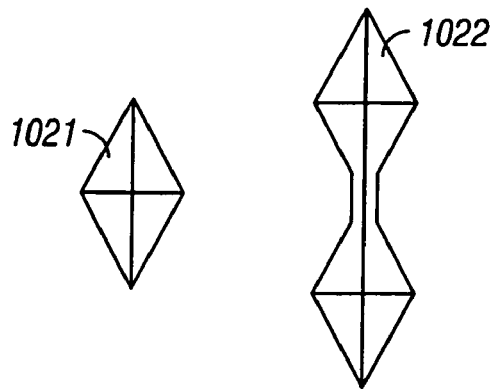
FIG. 19
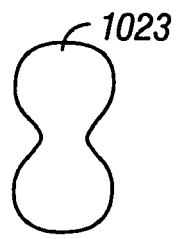 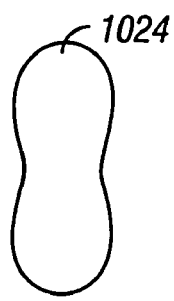 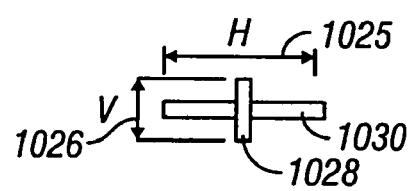
FIG. 20     FIG. 20A     FIG. 21
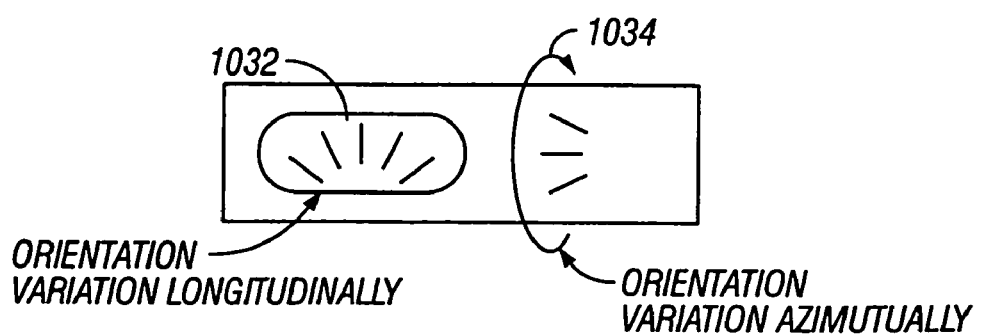
FIG. 22

F - LEFT
R - RIGHT
U - UPPER
L - LOWER
S - SWITCH
H - HORIZONTAL
V - VERTICAL

2) At least one of the layers is a magnetic layer

I) DATA AVERAGING ORGANIZATION
2D &Time Dependent CLUSTERED by Depth Interval & Azimuthal Sector

|  | S(1) | S(2) | S(3) | ... | S(9) | S(10) |
|---|---|---|---|---|---|---|
| ... | ∘∘∘ | ∘∘ | ∘∘ | ∘∘∘ | ∘∘ | ∘∘∘ |
| Z(m-1) | M(m-1,1) | M(m-1,2) | M(m-1,3) | ∘ | M(m-1,9) | M(m-1,10) 〜2208 |
| Z(m) | M(m,1) | M(m,2) | M(m,3) | ∘ | M(m,9) | M(m,10) |
| Z(m+1) | M(m+1,1) | M(m+1,2) | M(m+1,3) | ∘ | M(m+1,9) | M(m+1,10) |
| ... | ∘∘ | ∘∘ | ∘∘ | ∘∘∘ | ∘∘ | ∘∘ |

M(m,R)
m → Depth Interval Index
R → Azimuthal Sector Number

*FIG. 90*

II. TIME AVERAGING:

$M(m,R) = AVERAGE[f(RD_{(m_2, r_2, t_j)}]$

RD-Raw Data at Depth Interval m, Sector R And Time $T_j$ $$T_\mu(m,R) = \frac{T_{RD}(m,R)}{\sqrt{N}}$$

METHOD AND APPARATUS FOR A MULTI-COMPONENT INDUCTION INSTRUMENT MEASURING SYSTEM FOR GEOSTEERING AND FORMATION RESISTIVITY DATA INTERPRETATION IN HORIZONTAL, VERTICAL AND DEVIATED WELLS

CROSS-REFERENCE TO RELATED APPLICATIONS

This application is a divisional of U.S. patent application Ser. No. 10/214,436, filed Aug. 7, 2002 now U.S. Pat. No. 6,900,640 which in turn is a continuation in part of U.S. patent application Ser. No. 09/922,393 entitled "Multi-Component Induction Instrument" filed on Aug. 3, 2001 now U.S. Pat. No. 6,677,756 by Otto N. Fanini and Stanislav W. Forgang. This application is related to and claims priority from U.S. patent application Ser. No. 09/471,289, entitled "Apparatus Accurately Measuring Properties of a Formation" by Otto N. Fanini, Stanislav W. Forgang and Michael S. Crosskno, filed on Dec. 24, 1999. This application is related to and claims priority from U.S. Provisional Patent Application No. 60/361,570, entitled "Method and Apparatus for the use of Multicomponent Induction Tool and Cross Component Measurements for Geosteering and Formation Resistivity Data Interpretation in Horizontal Wells" by Abbas Merchant, Otto Fanini, Berthold Kriegshauser and Liming Yu, filed on Mar. 4, 2002.

BACKGROUND OF THE INVENTION

1. Field of the Invention

The present invention relates to the field of induction resistivity in frequency or time domain measurements for evaluation of potential hydrocarbon bearing formations and assisting drilling and well placement decisions with geosteering and geological information above, below and ahead of the bit using downhole induction instruments having reinforced metal mandrel (monitoring while drilling-MWD) or significant amounts of electrically conductive parts in or around the sensor section. The present invention provides for compensation of eddy currents induced in the tool body, which create additive error signals that interfere with resistivity measurements for automatically estimating dip angle through joint interpretation of multi-array induction and electromagnetic measurements (including high frequency "dielectric" or wave propagation ones), multi-component induction measurements for geosteering and open hole applications involving anisotropic formations.

2. Summary of the Related Art

Electromagnetic induction resistivity well logging instruments are well known in the art. These induction resistivity well logging instruments are used to determine the electrical conductivity, or its converse, resistivity, of earth formations penetrated by a borehole. Formation conductivity has been determined based on results of measuring the magnetic field due to eddy currents that the instrument induces in the formation adjoining the borehole. The electrical conductivity is used for, among other reasons, inferring the fluid content of the earth formations. Typically, lower conductivity (higher resistivity) is associated with hydrocarbon-bearing earth formations. The physical principles of electromagnetic induction well logging are well described, for example, in, J. H. Moran and K. S. Kunz, *Basic Theory of Induction Logging and Application to Study of Two-Coil Sondes*, Geophysics, vol. 27, No. 6, part 1, pp. 829-858, Society of Exploration Geophysicists, December 1962. Many improvements and modifications to electromagnetic induction resistivity instruments described in the Moran and Kunz reference, supra, have been devised, some of which are described, for example, in U.S. Pat. No. 4,837,517 issued to Barber, in U.S. Pat. No. 5,157,605 issued to Chandler et a. and in U.S. Pat. No. 5,600,246 issued to Fanini et al.

The conventional geophysical induction resistivity well logging tool is a probe suitable for lowering into the borehole and it comprises a sensor section and other, primarily electrical, equipment for acquiring the data to determine the physical parameters that characterize the formation. The sensor section, or mandrel, comprises induction transmitters and receivers positioned along the instrument axis and arranged in the order according to particular instrument specifications. The electrical equipment generates an electrical voltage to be further applied to a transmitter induction coil, conditions the signals coming from receiver induction coils, processes the acquired information. The acquired data then has been stored or by means of telemetry sent to the earth's surface through a wire line cable used to lower the tool into the borehole.

In general, when using a conventional induction logging tool with transmitters and receivers (induction coils) having their magnetic moments oriented only along the borehole axis, the hydrocarbon-bearing zones are difficult to detect when they occur in multi-layered or laminated reservoirs. These reservoirs usually consist of thin alternating layers of shale and sand and, oftentimes, the layers are so thin that due to the insufficient resolution of the conventional logging tool they cannot be detected individually. In this case the average conductivity of the formation is evaluated.

Thus, in a vertical borehole, a conventional induction logging tool with transmitters and receivers (induction coils) oriented only along the borehole axis responds to the average conductivity that combines the conductivity of both sand and shale. These average readings are usually dominated by the relatively higher conductivity of the shale layers. To address this problem, loggers have turned to using transverse induction logging tools where transmitters and receivers (induction coils) have their magnetic moments oriented transversely with respect to the tool longitudinal axis. The instrument for transverse induction well logging was described in U.S. Pat. No. 5,781,436 issued to Forgang et al.

In the transverse induction logging tools the response of transversal coil arrays or inclined coil arrays with a transverse component is also determined by an average conductivity, however, the relatively lower conductivity of hydrocarbon-bearing sand layers dominates in this estimation. In general, the volume of shale/sand in the formation can be determined from gamma-ray or nuclear well logging measurements. Then a combination of the conventional induction logging tool with the transversal induction logging tool can be used for determining the conductivity of individual shale and sand layers.

One of the main difficulties in interpreting the data acquired by a transversal induction logging tool is associated with its response vulnerability to borehole conditions. Among these conditions there are a presence of a conductive well fluid as well as well bore fluid invasion effects. A known method for reducing these unwanted impacts on a transversal induction logging tool response was disclosed in L. A. Tabarovsky and M. I. Epov, *Geometric and Frequency Focusing in Exploration of Anisotropy Seams*, Nauka, USSR Academy of Science, Siberian Division, Novosibirsk, pp. 67-129 (1972) and L. A. Tabarovsky and M. I. Epov, *Radial Characteristics Of Induction Focusing Probes With Trans-* verse Detectors In An Anisotropic Medium, Soviet Geology And Geophysics, 20 (1979), pp. 81-90.

The known method has been used a transversal induction logging tool comprising induction transmitters and receiver (induction coils). By irradiating a magnetic field the induction transmitter induces currents in the formation adjoining the borehole; in turn, the receivers measure a responding magnetic field due to these currents. To enable a wide range of vertical resolution and effective suppression of the unwanted borehole effects, measurements of magnetic from the formation can be obtained at different distances between the transmitter and receiver. However, even with these modifications, the data logs obtained with a conventional transversal induction logging instruments can be inconsistent, difficult to interpret, and the problems have been exacerbated while logging through a sequence of layers.

In the induction logging instruments the acquired data quality depends primarily both on parameters of the environment the tool operates in and on its intrinsic instrument its electromagnetic response characteristics. Thus, in an ideal case, the logging tool measures signals induced only by eddy currents excited in the formation by the primary magnetic field of the induction transmitter. Variations in the magnitude and phase of the eddy currents occurring in response to variations in the formation conductivity are reflected as respective variations in the output voltage of induction receivers. In conventional induction instruments these receiver voltages (or currents floating in the receiver coils) are signal conditioned and then processed using analog or digital phase sensitive detectors, primarily— algorithmically. The processing allows for determining both receiver voltage or current amplitude and phase with respect to the induction transmitter current or its magnetic field waveforms.

As in an open hole induction logging, the induction instruments currently deployed in monitoring while drilling (MWD) operations typically utilize solenoid-type transmitter and receiver induction coils coaxial with the tool mandrel. These instruments produce a "classical" set of induction measurements in the propagation mode, measuring attenuation and phase shift in the transmitted magnetic field due to the influence of the adjacent formation. Known induction tools utilize two coaxial receiver coils positioned in the center of the mandrel and two sets of balanced transmitter coils on both sides of the receiver coils. This balanced coil configuration, when operating at two frequencies of 400 kHz and 2 MHz, enables the typical known induction instrument to quantitatively evaluate eight directional horizontal formation resistivities for a plurality of investigation depths.

As a general rule for induction tool design, a high degree of magnetic coupling between the tool transmitter and the formation and the tool receiver and the formation is desirable. This high magnetic coupling between the tool transmitter/receiver and the formation facilitates increased instrument efficiency and increased overall signal to noise ratio and increases desirable sensitivity to formation parameters. However, the presence of conductive bodies typically found in the mandrel of known induction instruments becomes problematic, resulting in appearance of an additional and unavoidable magnetic coupling between these bodies and different sources of electromagnetic radiation\reception. Primarily, parasitic magnetic coupling between the transmitter, receiver and formation from one side and the conductive metal parts of the downhole tool from another side creates problems associated with parasitic eddy currents induced on the tool body surface and internal tool surfaces.

The parasitic eddy currents flowing on the surface of the downhole tool produce undesirable magnetic fields that interact with resistivity measurements as additive error components. These induced magnetic fields reduce the overall transmitter moment, couple directly into the receiver coil(s) and create undesirable offsets in measurement signals. Moreover, eddy currents on the tool body are temperature and frequency dependent that makes their adverse effects difficult, if not impossible to account and compensate for by known methods. Thus, there is a need for a method and apparatus that reduces and compensates for the adverse effects of eddy currents. Any remaining effect of the eddy currents can be calibrated out in an air calibration of a tool.

The relative formation dip angle is vital for proper and accurate interpretation of data acquired by the new multi-component array induction instrument. This newly developed induction instrument comprises three mutually orthogonal transmitter-receiver arrays. These configurations allow for determining both horizontal and vertical resistivities of an anisotropic formation in vertical, deviated, and horizontal boreholes. A description of the tool can be found in WO 98/00733, Electrical logging of a laminated formation, by Beard et al (1998). The transmitters induce currents in all three spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-direction transmitter coil and measured by a z-directed receiver where the z-direction has been conventionally parallel to the borehole axis. In addition, the instrument measures all cross-components of the magnetic fields, i.e., $H_{xy}$, $H_{xz}$, $H_{yx}$, $H_{yz}$, $H_{zx}$, and $H_{zy}$. In general inductive measurements can also be made in any non-orthogonal directions, for example, 20 and 40 degrees off or an orthogonal direction.

The signals acquired by the main receiver coils ($H_{xx}$, $H_{yy}$, and $H_{zz}$) are used to determine both the horizontal and vertical resistivity of the formation. This is done by inverse processing techniques of the data. These inverse processing techniques automatically adjust formation parameters in order to optimize in a cost-function for example a least-square sense measuring the data mismatch of the synthetic tool responses with measured data. Required inputs in this process are accurate information of the relative formation dip and relative formation azimuth. This information can be derived using in addition to the main signals ($H_{xx}$, $H_{yy}$, and $H_{zz}$) from the cross-components.

Conventional induction tools comprising only coaxial transmitter-receiver coil configurations do not have azimuthal sensitivity. Therefore, in a horizontal wellbore, the data does not contain information about directionality of the formation. It is not possible to distinguish whether a layer is above or below the borehole from these data alone. There is a need to be able to determine directionality of the formation. This knowledge can be obtained using a subset or all of the cross-components of the new multi-component induction tool that allows for determination of directionality of the formation.

SUMMARY OF THE INVENTION

The present invention provides improved measurement capabilities for induction tools for formation resistivity evaluations and geo-steering applications. The present invention provides electromagnetic transmitters and sensors suitable for transmitting and receiving magnetic fields in radial directions that are orthogonal to the tool's longitudinal axis with minimal susceptibility to errors associated with parasitic eddy currents induced in the metal components surrounding the transmitter and receiver coils. The present invention provides increased effective tool surface impedance by increasing self-inductance of the paths in which induced eddy currents flow on the surface of the multi-component induction instruments.

The present invention enables downhole tool designers to build more effective and better-protected radial induction arrays for existing and future downhole instruments operating in the frequency and/or time domains. In this case the array measurement results contain information primarily about the formation's vertical resistivity. Moreover, the present invention also makes it possible to combine transverse arrays with longitudinal arrays which conventionally measure horizontal formation resistivity or other directionality arrays. This combination enables obtaining a full resistivity tensor to evaluate formation resistivity anisotropy.

In one aspect, the present invention provides a composite non-conductive housing to reduce or even avoid the effects of parasitic eddy currents flowing on the tool surface. In another aspect, the present invention provides a conductive non-magnetic housing with reduced effects of conductive materials near coils and, primarily, the receiver. In another aspect of the invention, a non-conductive coating is placed over the housing to prevent high frequency eddy currents from leaking from the housing in the conductive mud of the adjacent wellbore and returning back to the housing.

In one aspect of the present invention inserts with certain material properties (conductivity, permeability and dielectric) and outer shell openings with special shapes and magnetic lenses combined with a transverse magnetic path are provided. In another aspect of the present invention an azimuthally symmetric measuring system combining an outer shell opening, shield, and coil placed on surface of the tool comprising a magnetic material or wound around magnetic material, transverse magnetic path, mud column are provided.

In another aspect of the present invention an azimuthally asymmetric measuring system combining outer shell opening, shield, coil placed on surface of magnetic material or wound around magnetic material, transverse magnetic path, mud column is provided. In yet another aspect of the present invention system configurations utilizing discontinuous parts of an equivalent cylindrical magnetic path, magnetic fields measured at high and low frequency and electric field sensors combined with outer shell opening with special shapes. In yet another aspect of the present invention, transmitter and receiver arrays with openings implemented with measuring system including features listed above. The present invention also provides a method for application to geo-steering operations.

The present invention provides a method that uses measurements for geo-steering applications. Measurements could be performed either in a time domain being then optionally converted into frequency domain with selecting a spectrum of interest, or performed in the frequency domain itself. The tool provides a tuned, broadband or re-tunable coil(s) and a tuned, broadband or re-tunable source. The present invention provides opening sizes and geometry of the tool. The tool openings can be varied dynamically to change the direction of sensitivity and frequency response of a transmitter or coil adjacent the above mentioned opening. The tool also provides a multi-layer flexible circuit board containing at least one of a coil, a selectable shield, a magnetic layer and tunable components. The tool also enables dual compensated measurement of array to improve signal to noise ratio and measurement stability and to improve signal content with reservoir, geological and geophysical information. The tool utilizes methods for application for geo-steering, drilling assistance and decisions. The tool provides a transverse magnetic path and in general any magnetic path combination which occurs in whole or in part in a transverse plane perpendicular to the tool longitudinal axis. The tool method utilizes multiple frequency sequential or simultaneous measurements and time domain measurements. The tool method utilizes measurements of an array combined with gyro, accelerometer, magnetometer and inclinometer data at same time.

Various transmitter-receiver combinations distributed azimuthally around the tool or longitudinally are provided to select sensitivity to a desired reservoir formation properties, for example, different orientations xy, xz, yz, 20°-40°, 40°-90°, and combinations, such as, Symmetric-symmetric; Asymmetric-symmetric; and Asymmetric-asymmetric to help direct the sensitivity of the tool to a desired direction.

The present invention also provides a method of using a multi-component resistivity logging tool in a deviated, highly deviated or substantially horizontal borehole. Using at least data recorded in a single receiver with two different transmitter orientations and vice versa due to a reciprocity, it is possible to determine the direction of resistive beds relative to the borehole. When multi-frequency measurements are used, the present invention also makes it possible to determine a distance and direction to the resistive bed and formation anomalies such as a fracture or discontinuity in the bed.

BRIEF DESCRIPTION OF THE DRAWINGS

FIG. 3 and FIG. 4 are side views of a preferred embodiment illustrating radial and longitudinal ferrite inserts to minimize eddy currents on the tool surface flowing due to a radial transmitter filed;

FIG. 15 illustrates Cross-section of tool illustrating geometry and dimensions of a insert to the tool's external surface;

FIG. 16 illustrates External tool's side view along tool longitudinal axis showing annular apertures. One annular aperture (left) is placed in transverse plane perpendicular to tool's longitudinal axis. The other annular aperture (right) is placed in transverse plane whose direction is inclined (between 0 and 90 degrees) with respect to the tool's longitudinal axis;

FIG. 17 illustrates Description of aperture shape with the form of a "time capsule" profile. One particular shape has both extremities with a conical cut and the center has a restriction with a parallel cut. An alternate shape has cuts at both the extremities which are parallel to each other. Lateral cuts are curved and could have a circular, elliptic or parabolic shapes, for example with center outside cut;

FIG. 17A illustrates Description of key dimensions in one of the "time capsule" shapes;

FIG. 18 illustrates Aperture with an elliptic shape;

FIG. 19 illustrates Aperture shape has the form of a parallelogram(left) and alternatively one parallelogram in each extremity of the aperture united by a restriction of parallel cuts;

FIG. 20 illustrates Aperture shape like a "bone". Extremities have a shape resembling a circular shape united by a "neck" restriction;

FIG. 20A illustrates Aperture shape like a "bone". Extremities have a shape resembling an elliptic shape united by a neck restriction;

FIG. 21 illustrates Aperture shape like a cross shape combining cuts in a longitudinal and transverse direction with respect to the tool's longitudinal axis;

FIG. 22 illustrates Tool's side view along the tool longitudinal axis showing description of a sequence of apertures (each represented by a line) which are varying their direction and are organized longitudinally (left side example) and another case where the aperture's directions are varying and are organized azimuthally(right side example); Apertures could alternatively be organized within a plane with direction inclined to the tool longitudinal axis;

FIG. 85$b$ shows a model of the responses of $H_{xx}$ and $H_{zz}$ in both isotropic and anisotropic materials of FIG. 85$a$;

FIGS. 89-92 illustrate binning of formation data;

FIG. 93 illustrates a preferred time averaging equation; and

DETAILED DESCRIPTION OF A PREFERRED EMBODIMENT

The transmitter and receiver coil geometric areas together with the transmitter current define a total magnetic moment of an induction tool. By design, these coils are built preferably with an effective geometrical area sufficiently large to achieve the maximum possible random noise-free measurements while using conventional amounts of electrical power available to MWD equipment. A coil effective geometric area would be sufficiently large when non-productive losses that may occur while generating the primary magnetic field or detecting the secondary magnetic field flux induced from the formation are either adequately compensated for or properly accounted for. In many circumstances these limitations can be evaluated from the basic physics principles, i.e., from boundary conditions for the magnetic field being in a close proximity to a conductive and/or ferromagnetic materials or propagating along these parts.

It is known from the electromagnetic field science that if an externally generated alternating magnetic field has been radiated normally to the surface of a conductive body, it will induce eddy currents on this surface. These currents, in turn, produce their own magnetic fields that, in vector sense, oppose to the external field. Generally, the opposing field magnitude increases with increasing material electrical conductivity and decreases with increasing distance to the source. These result in the fact that an integral magnetic flux in a close proximity to a highly conductive metallic surface becomes negligible. For those who are skilled in the art it should be understood that similar effects are present in induction MWD instruments having transmitter and receiver coils wound in a close proximity to the metal tool body.

Hence, when a transmitter induction coil is positioned right above a conductive tool surface, the magnetic field of eddy currents induced on the surface opposes the primary source and thus decreases the integral flux radiated into the formation. Conversely, if a receiver induction coil is positioned above a conductive surface, the magnetic field of eddy currents induced on this surface due to formation response will decrease an effective flux crossing the coil. Both processes substantially distort receiver output voltage and, consequentially, lower the tool signal-to-noise ratio.

In the most practical tool designs, the wavelength of the transmitter field is significantly longer than the electromagnetic skin depth of the tool body material or the coil linear dimensions. This fact allows for neglecting active electromagnetic losses in the tool body materials, disregarding phase shifts between surface eddy currents and the driving magnetic field, etc. Surface eddy currents decrease effective coil geometrical areas, however, when operating frequencies are too high to ignore coil dimensions and/or the tool body material losses, the eddy currents effect becomes more complex and should be analyzed separately for every logging case.

Figure 1:
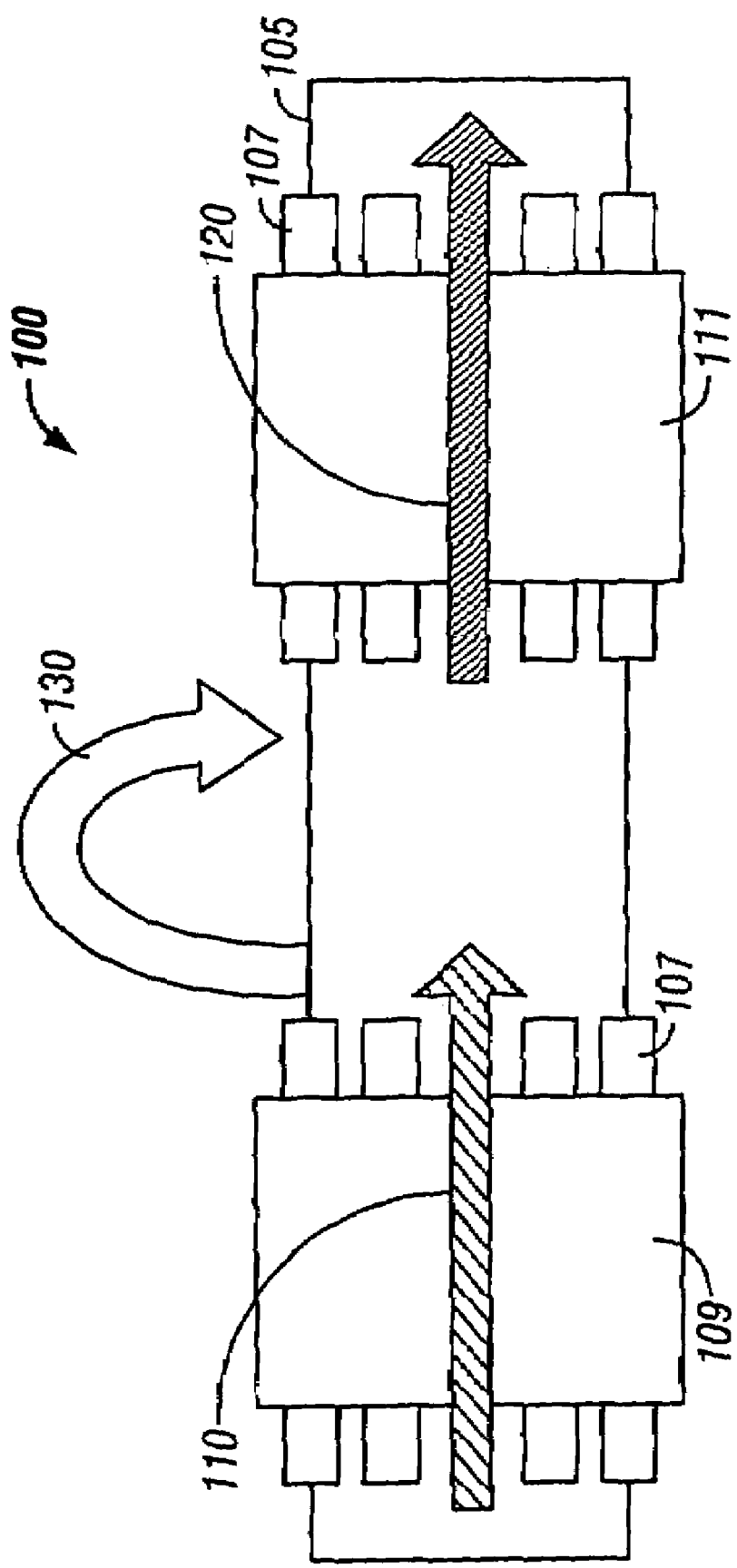
FIG. 1 illustrates circumferential direction of eddy currents that will flow on the surface of the conventional induction MWD instrument with a longitudinally-oriented transmitter magnetic field propagating along the longitudinal axis of the tool body.

Turning now to FIG. 1, FIG. 1 illustrates the direction of the eddy currents flowing on a tool surface with transmitter magnetic fields are oriented and propagating along the longitudinal axis of the tool body. As shown in FIG. 1, a longitudinal magnetic field 110 is generated by transmitter and longitudinal magnetic field 120 is received by the receiver oriented along the longitudinal axis of the tool 100. Surface parasitic eddy currents are generated in the mandrel 105 and preferably circulate on in a circumferential path along the direction 130, as shown in FIG. 1. Non-conductive or highly resistive ferrite inserts 107 in the transmitter collar 109 and receiver collar 111 are utilized for two purposes. The inserts under the transmitter coil 107 increase electrical impedance of the tool surface to allow for a larger flux leak from the coil to be radiated in the formation. Inserts under the receiver coil 107 effectively increase the external field penetration through coil cross-section allowing for larger signal to be measured. Both effects occur due to known behavior of the induction coil wound fully or partially around a ferromagnetic solid. The inserts 107 reduce the effect of circumferential eddy currents on magnetic fields in collars 109 and 111.

Preferably, the tool body is made of non-magnetic but conductive material to reduce often non-linear magnetization effects of this material on the flux transmitted and received by the tool. The tool body can alternatively be made of non-conductive composite material to completely eliminate eddy currents flowing on the tool surface. In this design case, having ferrite inserts 107 under the transmitter coil in transmitter collar 109 becomes unnecessary. Having the inserts 107 under receiver collar 111 would still be desirable for attracting more external flux lines to penetrate through its cross-section.

Figure 2:
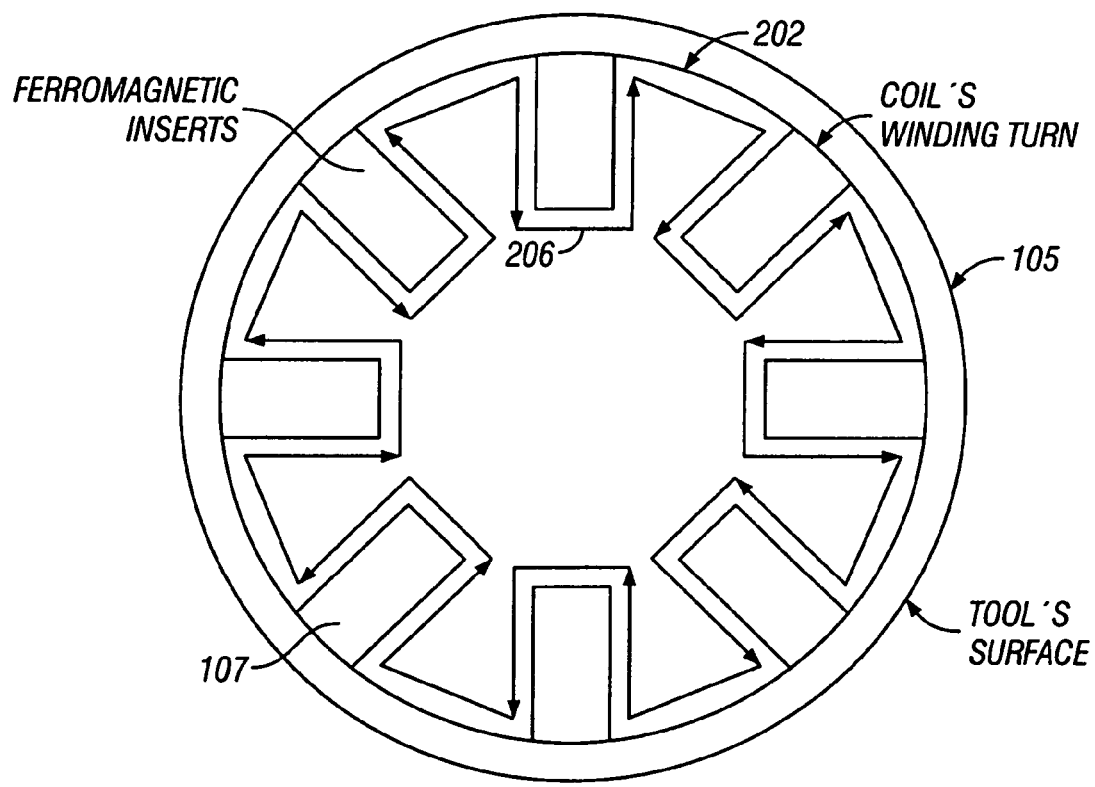
FIG. 2 illustrates a preferred embodiment with a coil that is wound around a tool body inside of collar and has a magnetic moment directed along the tool longitudinal axis body.

Turning now to FIG. 2, coil 202 is shown wound around a tool body 100 inside of collar109 (or collar111). Ferrite inserts 107 are shown embedded in the tool surface 105 and within coil winding 202. The tool transmitter radiates in a direction along the tool longitudinal axis and, therefore, induced eddy currents 206 travel circumferentially around ferrite inserts 107 as shown in FIG. 2. The ferrite inserts effectively increase the eddy current travel path and forces this path to exhibit a substantial inductance. The increased effective impedance encountered by the eddy currents flowing through this travel path, around the ferrite inserts, will reduce magnitude of these currents and, respectively, downscale their parasitic effects on effective transmitted and received magnetic fluxes.

Turning now to FIG. 3 and FIG. 4, a preferred embodiment of the present invention is illustrated which provides for placement of induction coils 310 for radiating a transmitter magnetic field in the formation or receiving respective signal from the formation. The magnetic moment of each of these coils has been perpendicular to the longitudinal axis of the tool 340 to support induction measurements from the radial direction. While operating, both primary, i.e., transmitter and secondary, i.e., formation fields mainly induce longitudinal eddy currents 330 on the surface of the tool 340. The present invention increases the tool surface impedance not only within transmitter and receiver coil projections on the tool surface, but outside of these projections on the tool body, as well. As shown in FIG. 3, high magnetic permeability inserts 320 are provided within the coil and outside of the coil 310 along the mandrel to reduce the effect of eddy currents 330 having different travel directions.

Thus, referring to FIG. 3, two major currents are induced by the magnetic field of the radial coil and flowing in opposite directions. A first current is contained within the projection of the coil winding on the tool metal surface and the second current flows outside of this projection. The present invention reduces the influence of longitudinal current streams on the measurement results by providing segment type ferrite inserts 320 arranged transverse with the tool's longitudinal axis and located primarily within the coil projection on the mandrel surface as shown in FIG. 3. Longitudinal ferrite inserts 360 are similarly placed along the mandrel primarily outside the coil projection area on the mandrel surface, as shown in FIG. 4. These longitudinal inserts extend the path and also increase the effective impedance for circumferential streams of eddy currents traveling outside of the coil projection on the tool surface. That is, FIG. 4 demonstrates the principle of the surface eddy current suppression by means of increasing the tool surface inductive impedance. The ferrite inserts being embedded in the surface forced currents to flow in multiple loops, simultaneously increasing inductance of these loops and their impedance to the current circulation. Preferably, a plurality of longitudinal inserts are provided instead of a single insert on each side of the coil. By applying similar consideration, those who are skilled in the art would find that in the case of the receiver coil used per the present invention ferrite inserts within the coil projection on the tool surface effectively increase the coil area.

In a preferred embodiment, a non-conductive coating 370 is placed over tool 340 to restrict eddy currents 330 from leaking into conductive fluid filling the well bore surrounding the tool 340. Effectiveness of the non-conductive coating depends on coating thickness and the coating complex electric permittivity. The coating effectiveness will also operate in converse with the tool operation frequency and, therefore, the coating material thickness and frequency should be selected properly. A good engineering practice would require a capacitive impedance introduced by this coating between the tool surface and borehole fluid to be at lest an order of magnitude higher than the integral inductive impedance the surface eddy currents experience. For those who are skilled in the art would see that these two reactive impedances may present a series resonance circuit that could destroy measurement phase stability and quality, primarily in boreholes filled with high conductivity fluids.

It is known that a ferromagnetic body placed in a less magnetic volume "filled" with magnetic flux lines acts as a flux concentrator, i.e., the flux lines are distorted in a way that a majority of the lines pass through the ferromagnetic body. The analogue to this effect can be found in an electrical current (flux) flowing through the circuit and selecting the minimal electrical (magnetic) impedance to flow. In accordance with this analogue, volumes containing ferromagnetic inclusions are known as having smaller "magnetic" impedance to the flux lines spatial routing. For downhole MWD applications this means that improper coil position within close proximity to the ferromagnetic tool parts and components (such as a tool body) might significantly change MWD transmitted and received magnetic fluxes. Moreover, for some embodiments this can create an effect completely compromising the above mentioned advantages. Thus, it may result in suppression of magnetic field transmitted to and received from the formation as shown in FIG. 5.

Figure 5:
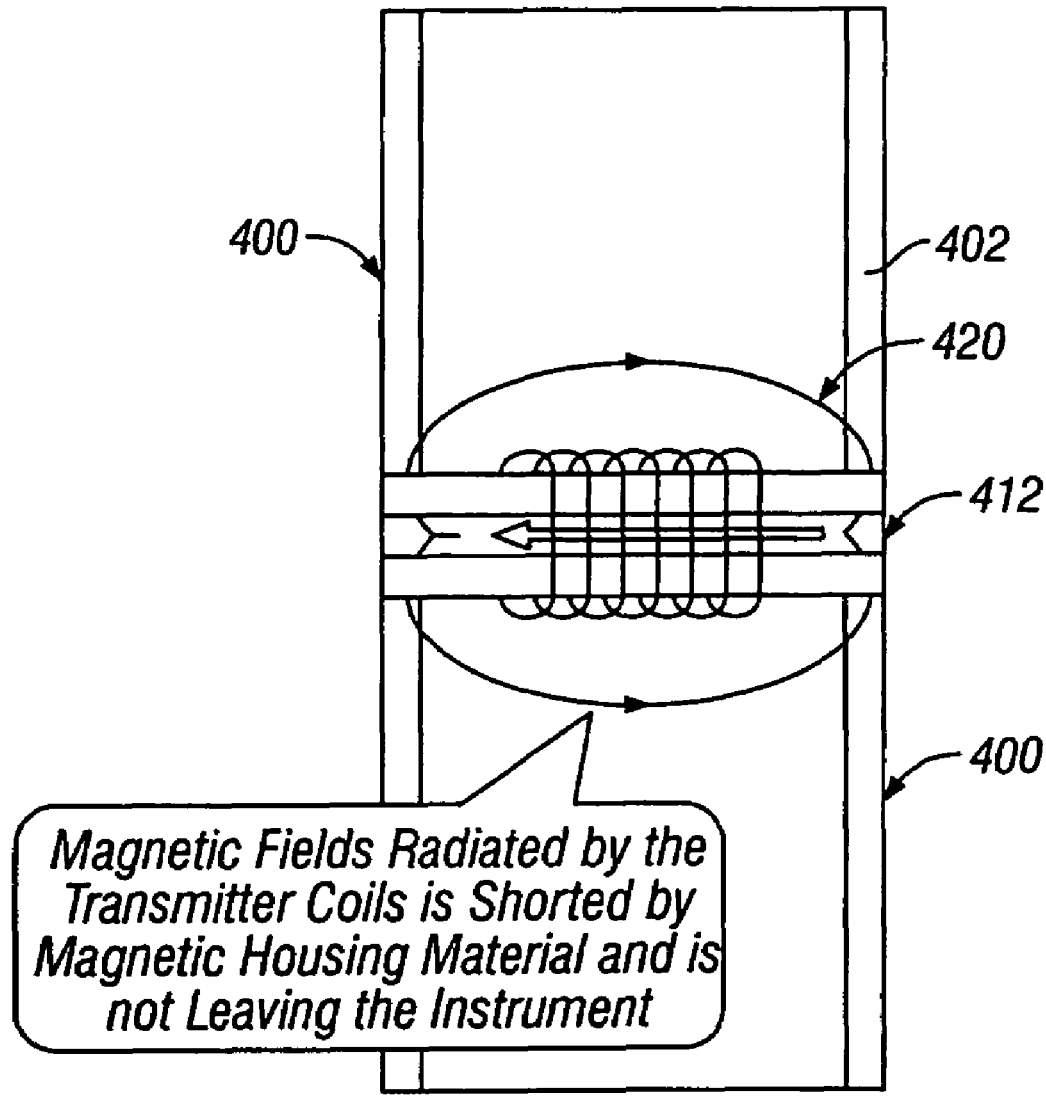
FIG. 5 is an illustration of a conductive housing interfering with a transmitted magnetic field in the case when tool housing also contains ferro-magnetic inclusions.

FIG. 5 illustrates a negative effect of a tool pressure housing 402 built from magnetic material. As shown in FIG. 5, a transmitter coil 410 has been wound on the transverse ferrite core 412 that has been positioned inside the tool metal housing and connects both external MWD surfaces 400. Depending on the ratio of magnetic permeability of the ferrite 412 to the housing 402 one, the magnetic flux 420 can be partially or fully trapped inside the body and never leave the tool to survey the formation and vice-versa.

Figure 6:
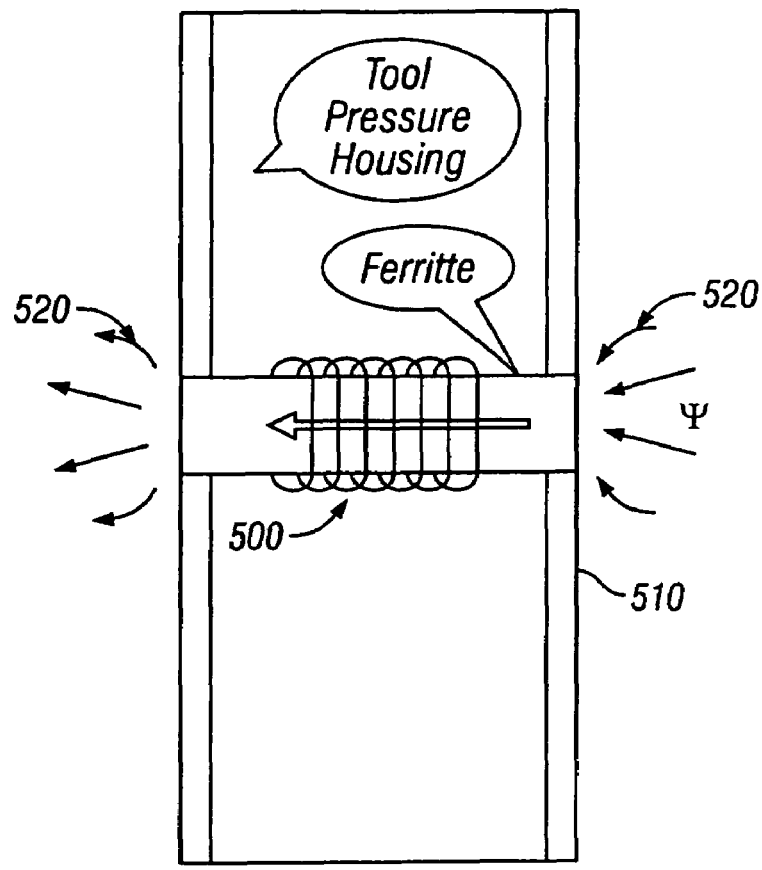
FIG. 6 is an illustration of a ferrite insert inside of a coil shaping the magnetic flux outside the instrument and in close proximity to a tool surface.

As shown in FIG. 6, applications of ferrite inserts 510 in the transmitter or receiver coils 500 would have different meanings. Thus, in case of receiver coil it results in the increased magnetic flux density 520 inside the coil's core compared to the external field to be measured. If the transmitter coil current is set (as with supplying it with a "current" source), however, the presence or absence of the ferromagnetic core does not practically affect the radiated field except for some increased flux line concentration per unit of cross sectional area in close proximity to the coil. Thus, the ferrite inside of the transmitter coil serves primarily as a "container" that does not allow transmitter field flux lines to leak inside the instrument and route the flux lines in a transverse path across the tool. In the case where ferromagnetic inserts are used for the receiver coil, they work as both a "container" and magnetic flux density magnifier.

Figure 7:
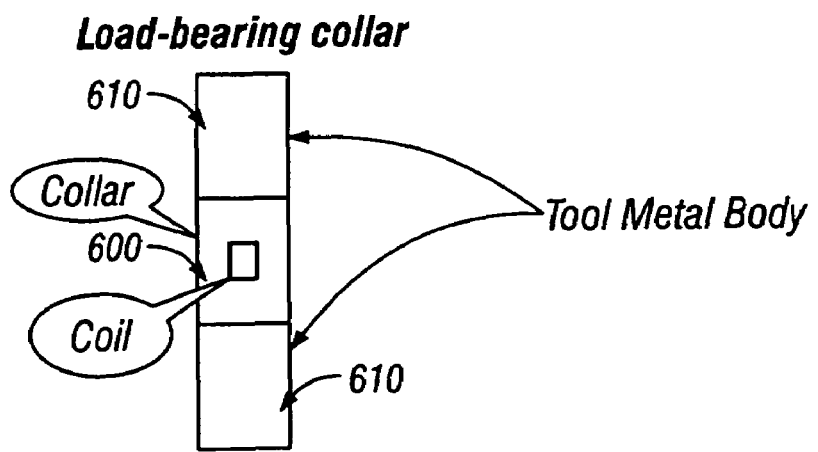
FIG. 7 is an illustration of a preferred collar surrounding a coil.
Figure 8:
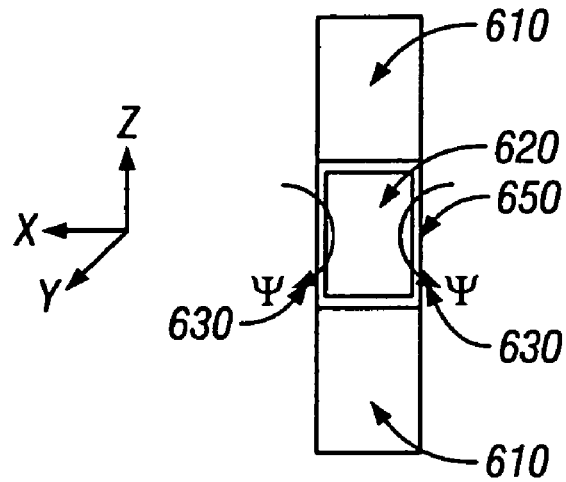
FIG. 8 is an illustration of a preferred collar surrounding a coil.
Figure 9:
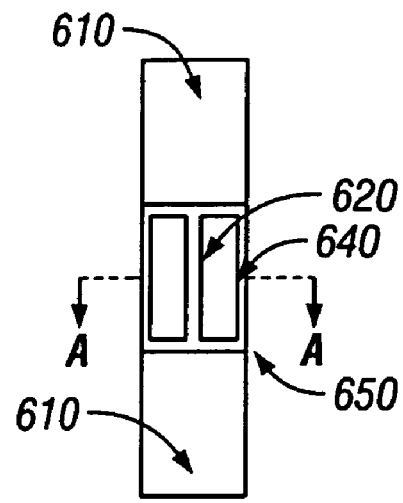
FIG. 9 is an illustration of a preferred collar surrounding a coil.

Turning now to FIG. 7, a preferable solution is shown which provides a non-conductive collar 600, which, in the case of induction measurement instruments is preferably not a load-bearing collar 610. A preferred embodiment as shown in FIG. 8 comprises a simple hollow composite cylinder 650 mounted coaxial with the instrument on the tool external surface with the coil 640 buried inside the composite collar. In this case the thickness of the collar introduces a gap between the collar 650 surface and external surface of the central pipe 620. This arrangement enables the magnetic flux 630 to penetrate in coil leaking through the gap, i.e., between coil wires and external surface of the metal pipe.

Figure 10:
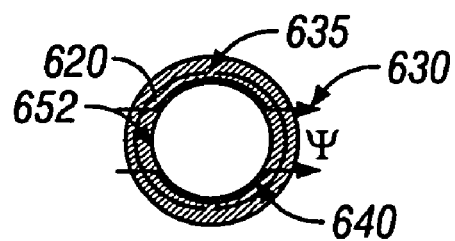
FIG. 10 is a cross sectional area of the coil and collar of FIG. 9.

Moreover, the composite filling the gap further comprises embedded ferromagnetic fibers 635 oriented normally to the collar surface, as shown in FIG. 10, thereby increasing the coil effectiveness (primarily for the receiver). An inner cylindrical composite 652 is added with ferromagnetic fibers oriented along a circle in a plane perpendicular to tool axis. These fibers in this inner cylindrical composite part guide magnetic flux lines around a central structural metallic MWD component 620. To facilitate this aspect of the tool implementation, the central structural metallic MWD component 620 is made of a non-ferromagnetic metallic material or alternatively covered with a cylindrical layer of a non-ferromagnetic metallic material. Alternatively the central structural metallic MWD component 620 could be covered with a cylindrical layer of ferromagnetic metal material providing a transverse magnetic path.

In a preferred embodiment, all radial the coil windings are preferably symmetrical with respect to the external tool surface. Also in a preferred embodiment, longitudinal coil windings and split coils have the same axis of symmetry as the tool itself by design. The overall benefits of symmetrical windings in induction tool are known in the art and have been supported by numerical modeling results and experimental field data. In case of MWD instruments, in particular, the asymmetrical windings cause non-symmetric eddy currents traveling in different locations in the instrument. Being parasitic, the magnetic fields due to these currents are almost impossible to cancel, that is, using asymmetrical windings would result in unwanted signal pick-up and cross-talk between coils, distortion of the tool's calibration and introduce the data interpretation difficulties.

In a preferred embodiment, the radial transmitter and receiver coil are each wound around the tool surface, having an even number of turns and symmetrically wound, that is, half of the coil windings going on one side of the tool and the other half—on the opposite side. In this case the radial coils provided inside of the collar, are symmetrically wound so that their total magnetic moment in the axial direction is substantially equal to "zero".

FIGS. 11 through 27 describe the inserts and openings provided by the present invention. The inserts and openings' function would be primarily to allow electromagnetic energy to leak through the tool metallic outer shell in both directions for either a transmitter or a receiver. There are three groups of characteristics for the inserts and openings comprising a combination with a parallel grid shield and a transverse magnetic path across the tool body, material properties, and shape.

The present invention provides a novel combination of a parallel grid shield and a transverse magnetic path across the tool body. The present invention provides an insert specification which includes the joint implementation of an insert, shield and magnetic path. This is a hardware solution which contains the basic functions for a measuring system: means to leak electromagnetic energy through the metallic outer shell (openings/insert); parallel grid shields to improve sensor's directional selectivity to the field orientation of interest; transverse magnetic path. This is shown to the right of FIG. 11. Various inserts shapes including longitudinal, transverse, deviated, curvilinear, and annular shapes which are shown in FIGS. 11, 12, 13, 14, and 16. If this is not sufficient to obtain a claim allowance then it is necessary to resort to the shape of the opening and material properties of what is placed within the opening/insert what is discussed next. An example for an aperture with dynamically adjustable shape and dimension is also illustrated herein.

FIG. 15 illustrates characteristics of inserts, which have contrasting characteristics (i.e. conductivity, permeability, dielectric) with respect to the surrounding outer shell material. In a one embodiment of the present invention the material characteristics of the insert are magnetic and/or non-lossy (ferrite). The depth of the insert can also vary from a thin sheet to the whole outer-shell thickness.

FIG. 16 illustrates an external tool's side view along tool longitudinal axis showing annular apertures. One annular aperture (left) is placed in transverse plane perpendicular to tool's longitudinal axis. The other annular aperture (right) is placed in transverse plane whose direction is inclined (between 0 and 90 degrees) with respect to the tool's longitudinal axis.

Figure 23:
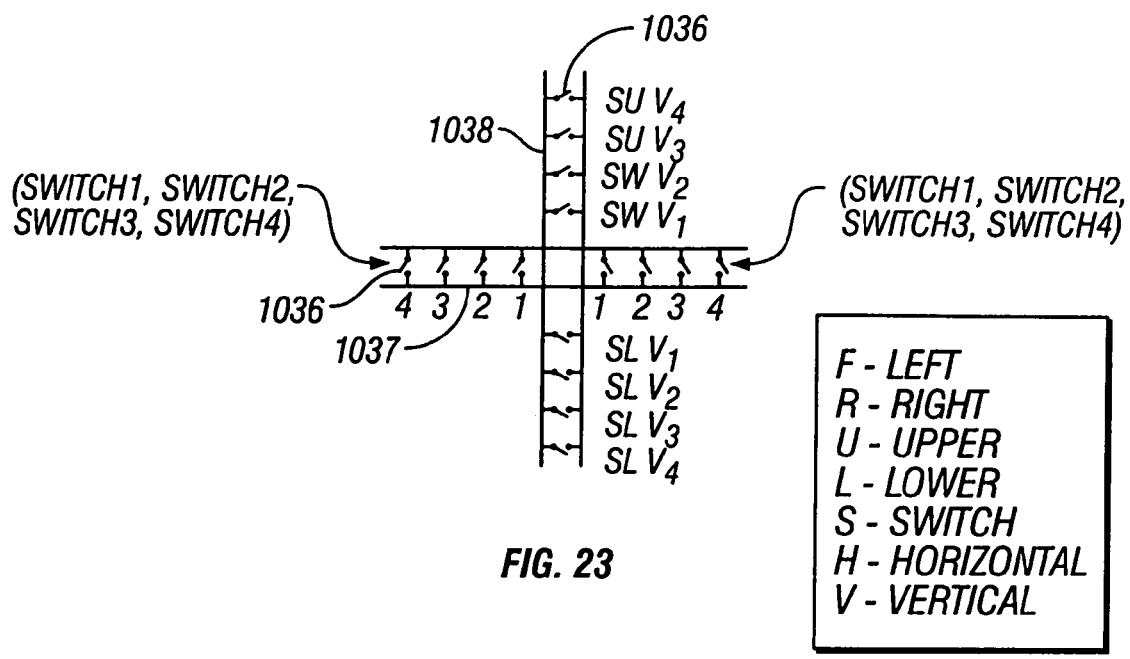
FIG. 23 illustrates switches that are connected within the aperture and can change dynamically the geometry and dimensions of the aperture. An example of a cross-cut is shown but this can be extended to other shapes.
Figure 24:
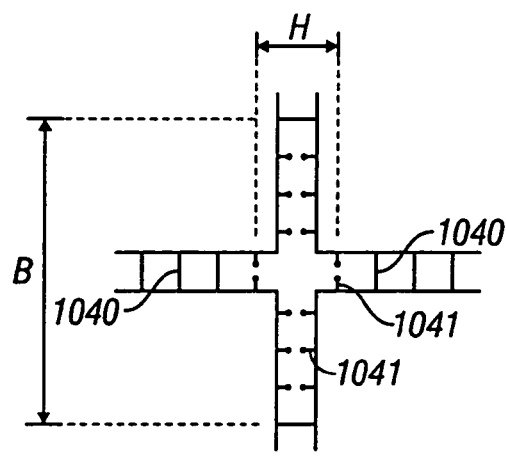
FIG. 24 illustrates an example showing an aperture whose effective dimensions and shape have been reconfigured with switches that can be extended to other shapes.
Figure 25:
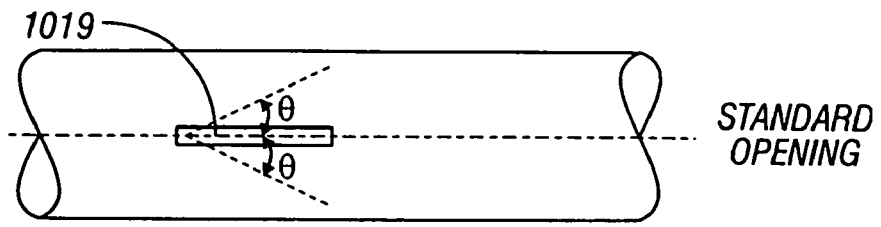
FIG. 25 illustrates standard apertures. Aperture can be inclined by an angle theta with respect to the tool longitudinal direction.
Figure 26:
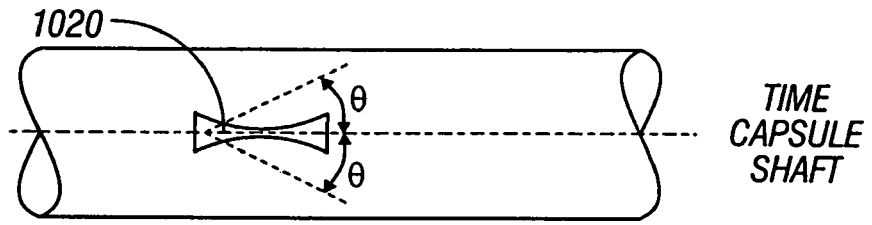
FIG. 26 illustrates an aperture with time capsules shapes. The aperture can be inclined be an angle theta with respect to tool longitudinal direction.
Figure 27:
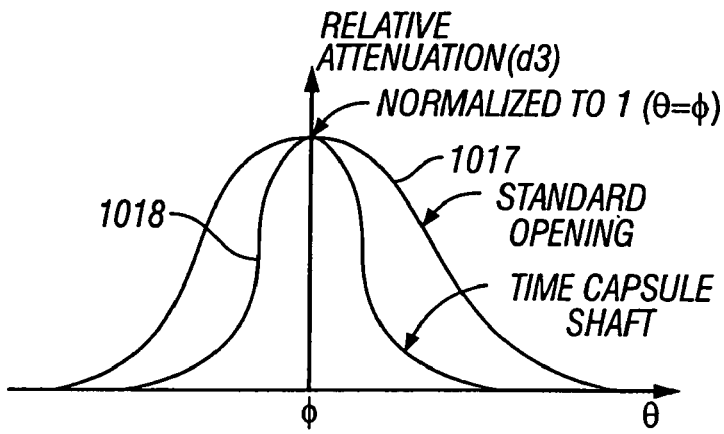
FIG. 27 illustrates comparative relative attenuations through the aperture with "time capsule" shape and standard aperture opening versus angle between direction of aperture and direction incident magnetic field projected on tool external surface where aperture is cut. Each relative attenuation has been normalized to 1 at theta equal to 0 for comparison of spatial direction selectivity between the two aperture geometries.
Figure 59:
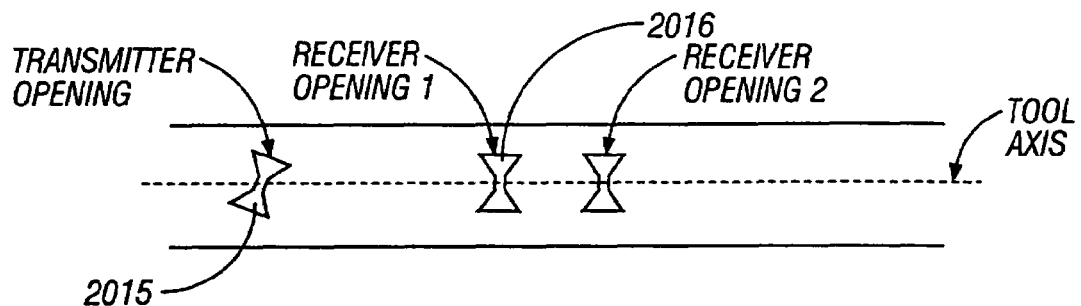

The present invention also provides a variety of opening shapes to be considered as shown in FIG. 17 (conical and time capsule), FIG. 17a (conical), FIG. 18 (elliptical), FIG. 19 (diamond and double-diamond), FIG. 20 (bone), FIG. 20a (bone), FIG. 21 (cross-cut), FIG. 22 (longitudinal and transverse opening arrays) FIG. 23 (adjustable cross-cut ratio), FIG. 24 (cross-cut ratio example), FIG. 25 (standard longitudinal example), FIG. 26 (time capsule example), and FIG. 27 (directional sensitivity improvement). FIG. 27 illustrates how the transmission directional selectivity of magnetic field through the opening is altered by the different aperture shapes. This selectivity is more effective for fields near the outer shell surfaces and it would be less pronounced for field far from this surface. Directionality for the receiver and transmitter's spatial electromagnetic field sensitivities is obtained by combining opening/insert arrays organized longitudinally and azimuthally in the outer shell as shown in FIG. 59 and FIG. 22.

Figure 28:
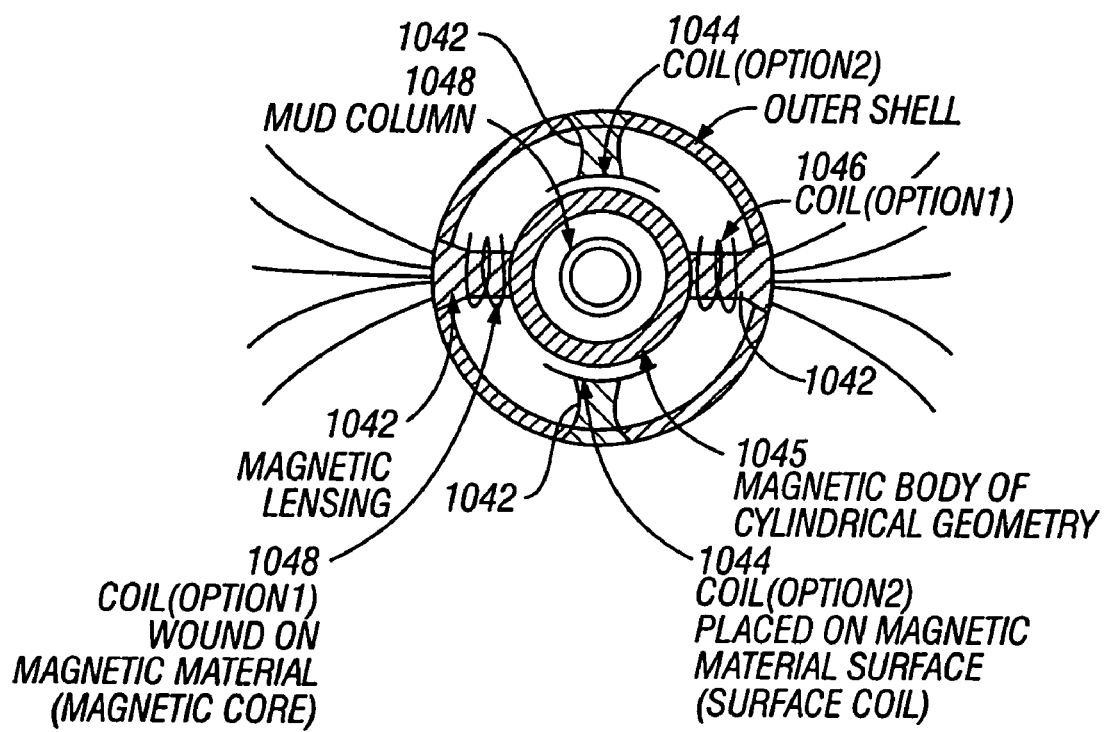

The present invention also provides for magnetic lens effects. Magnetic materials are shaped like optical components such as lenses and placed in the measuring system to increase sensitivity. A magnetic lens with a concave face is placed at the external edge plane of the cylindrical outer shell as shown in FIG. 28. These magnetic lens are coupled to a transverse magnetic path such as the case of cylindrical geometry shown in FIG. 28. Both types of coil options are utilized, that is, a coil wound on magnetic material and a coil placed on magnetic surface).

Figure 31:
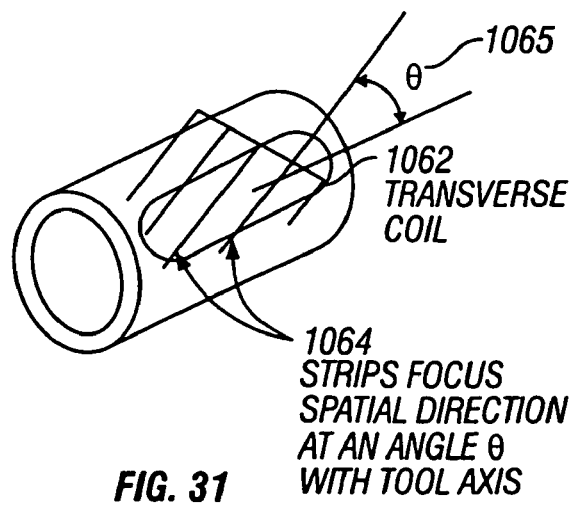
FIGS. 28-72 illustrate preferred coil, apertures, inserts and shield configurations.
Figure 29:
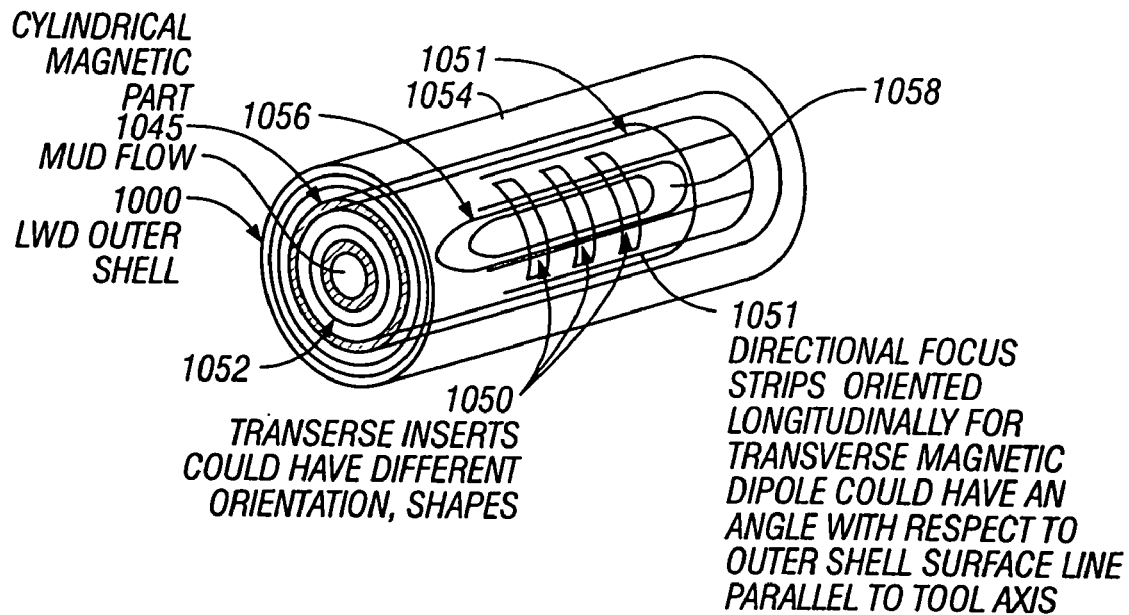
Figure 30:
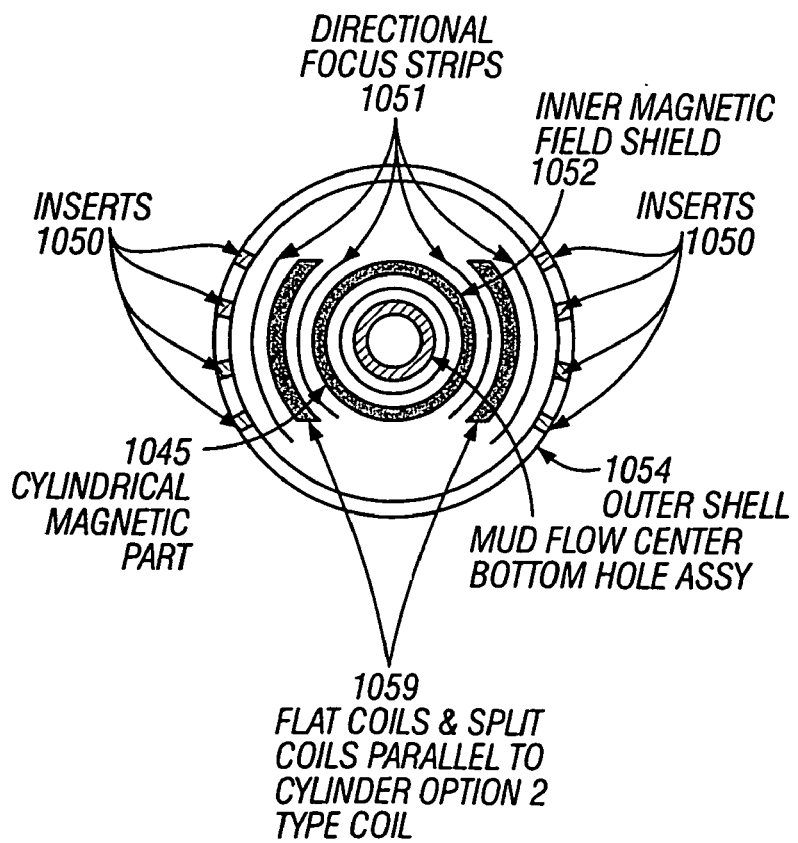
Figure 32:
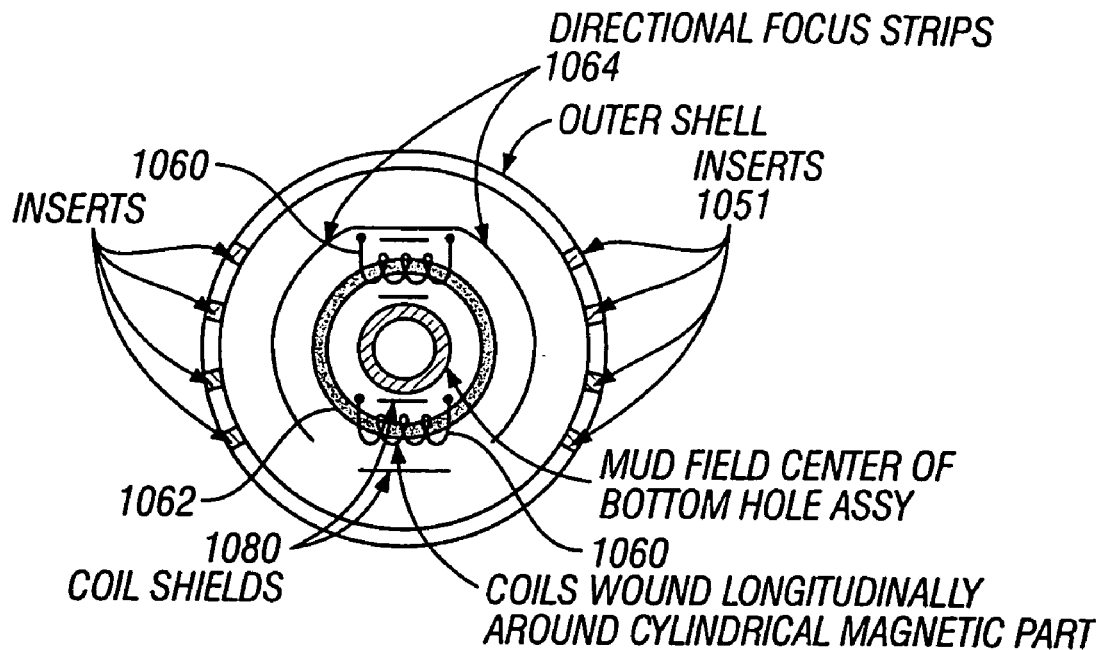
Figure 33:
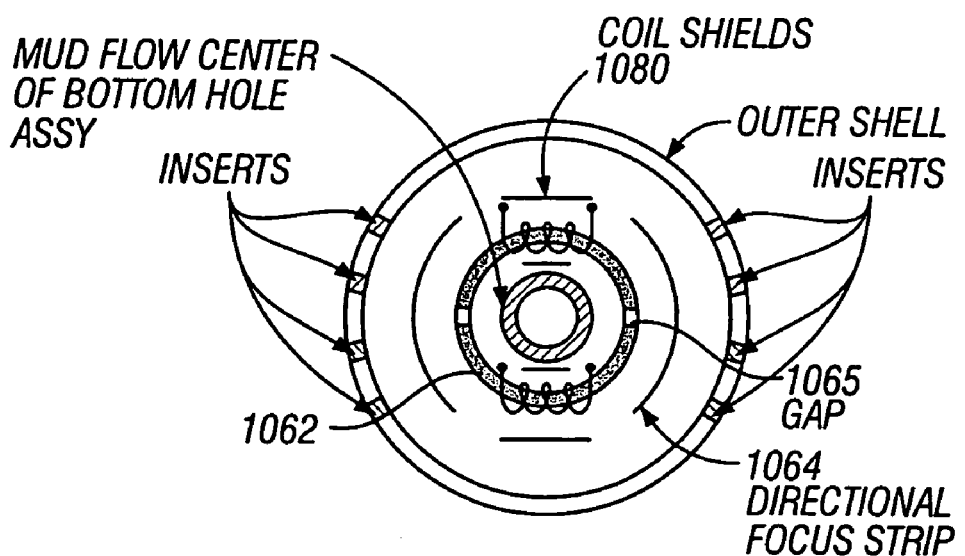
Figure 34:
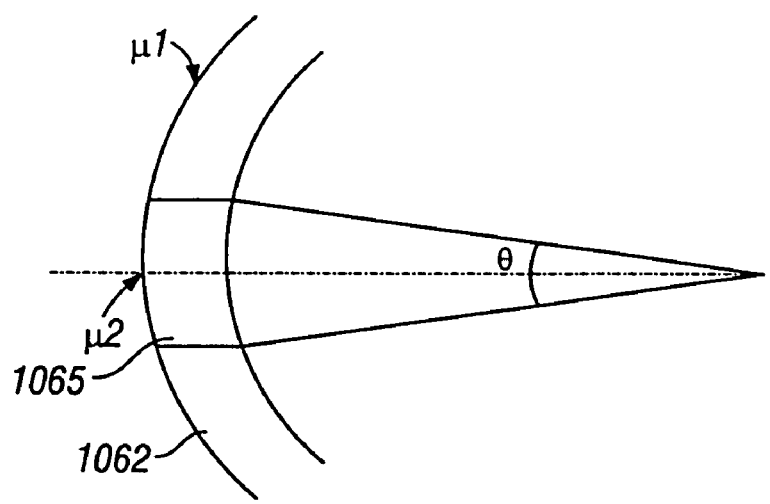
Figure 35:
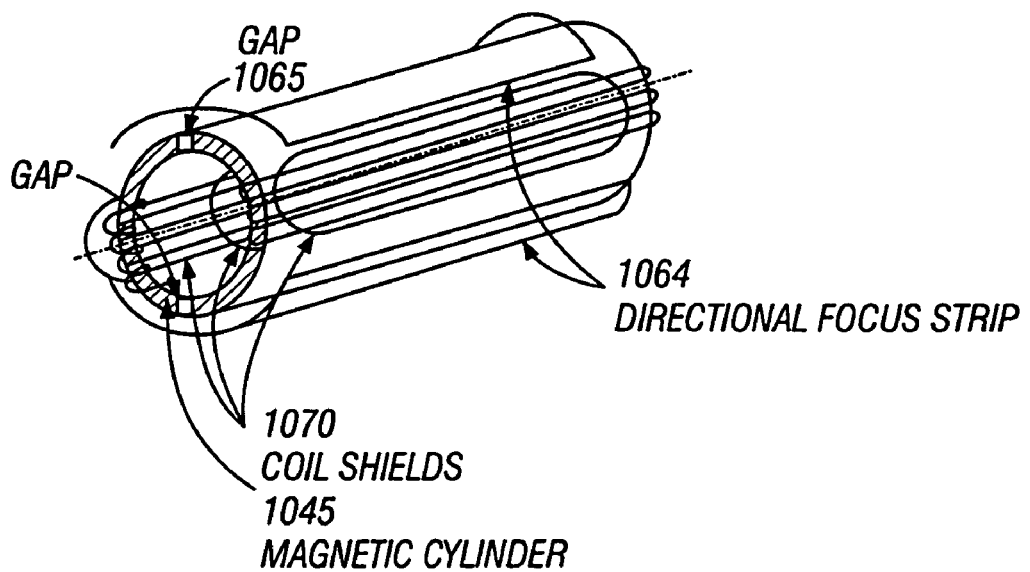

The present invention also provides a structure for a symmetric measuring system. FIG. 29 illustrates transverse inserts combined with shields including directional focusing conductive strips on a parallel grid placed under the outer shell openings with the functionality to control the magnetic field's directions which will go through. FIG. 29 also shows the MWD outer shell, openings, cylindrical magnetic part, and a coil. FIG. 30 shows a cross-section of a symmetric arrangement using the option 2 type coil as shown in FIG. 28. This arrangement also appears in FIG. 10. FIG. 30 illustrates openings and inserts, combined with shields, that is, directional focus strips on both sides of the coil, a split flat and a surface coil, (option 2 type coil shown in FIG. 28), a cylindrical magnetic portion, an outer shell, a mud flow pipe, and an inner electromagnetic shield placed around the mud pipe. FIG. 31 shows how parallel grid shields with conductive strips placed over the transverse coils can have different orientation to effectively filter electric fields in a desired direction. FIG. 31 provides a split coil arrangement with coordinated polarities. FIG. 32 utilizes option 1 as shown in FIG. 28 (coil wound around a magnetic material). The coil shown in FIG. 28 and FIG. 32 utilizes a symmetrical split coil arrangement with coordinated polarity. Each coil in FIG. 32 is surrounded by an electromagnetic shield. The coils are wound longitudinally around the cylindrical magnetic part providing a transverse magnetic path as shown in FIG. 6. The inserts and openings in the outer shell are also indicated. The mud flow pipe is indicated in the center. The continuous cylindrical path is suitable for a receiver but for additional functionality as required for a transmitter functionality, a pair of gaps is provided to interrupt the flux flowing through the magnetic path in order to be pushed into the formation efficiently. The pair of gaps is added to the structure of FIG. 32 to form FIG. 33 where they are marked in the drawing. FIG. 34 illustrates the extent of this gap indicating there needs to be a sufficiently high permeability contrast between the gap's material and the magnetically permeable material forming the magnetic path continuation next to it. There are one or more gaps placed along the magnetic path. FIG. 35 combines key elements of the present invention. FIG. 35 illustrates coils wound with option 1 as shown in FIG. 28, that is, a coil wound around a magnetic material. The magnetic cylinder part is also shown in FIG. 10. A coil wound placed on the surface of a transverse magnetic path is shown in FIG. 6 (option 1, FIG. 28) and a coil wound on a magnetic cylinder is shown in FIG. 10 (option 2, FIG. 28). The magnetic cylinder shown in FIG. 10 and other figures is one special case of a transverse magnetic path.

Figure 36:
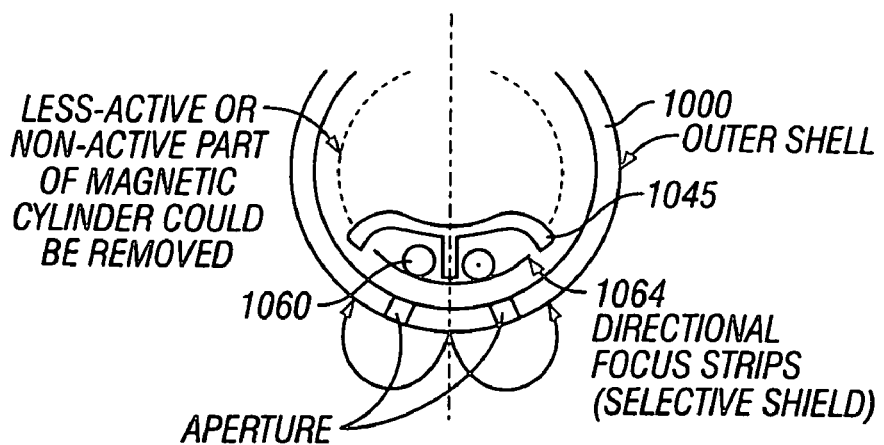
Figure 37:
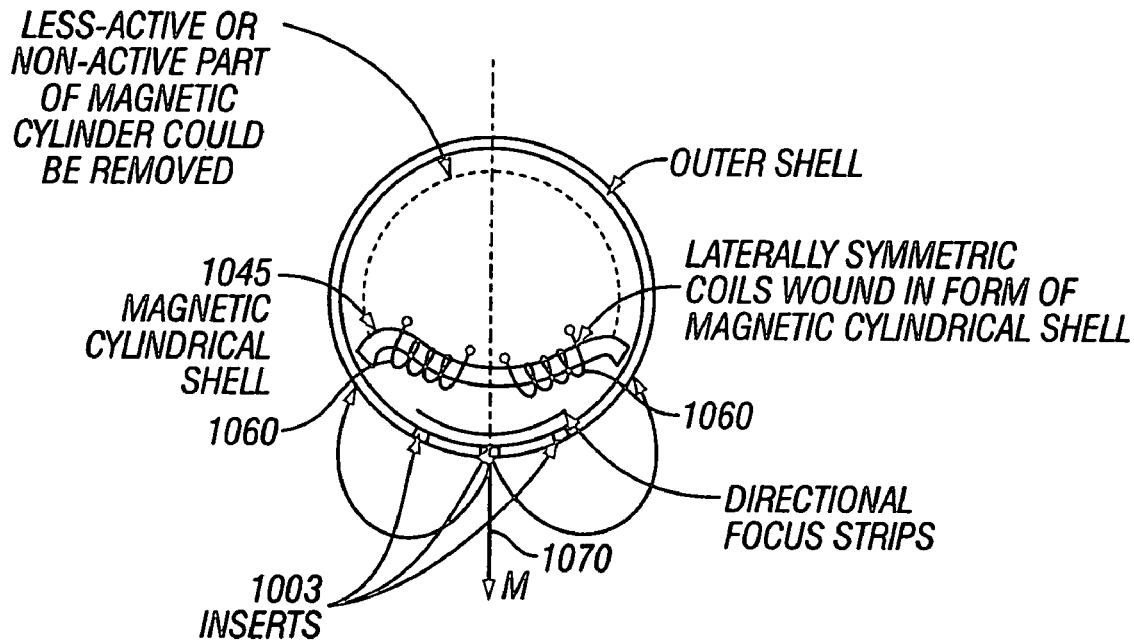
Figure 38:
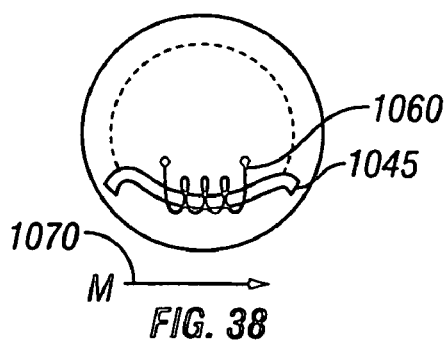

The present invention also provides an asymmetric measuring system. FIGS. 36, 37 and 38 illustrate a special case of a half transverse coils. FIG. 36 illustrates a coil wound with option 2 (a coil placed along the surface of a magnetic material, that is, a surface coil). The measuring system now uses a magnetic cylindrical shell, which provides a magnetic return path for the magnetic flux generated by the coil placed at the magnetic material's surface. In an alternative embodiment, the less active or non-active parts of the magnetic cylinder can be removed with only a magnetic cylindrical shell left. FIG. 36 illustrates inserts and openings, which enable electromagnetic energy to pass through the outer shell. The position for directional focus strips (parallel conductive grid shown in FIG. 31) is illustrated in FIG. 36. An axis of symmetry is also shown in this drawing. Flux density flow outside the tool is indicated. FIG. 37 shows two coils wound with option 1 (coil wound longitudinally around magnetic material) and placed symmetrically in the cylindrical shell generating flux density in opposite directions. In all other features FIG. 37 is similar to FIG. 36. Flux density flow outside the tool is indicated. Axis of symmetry is shown in FIG. 37. FIG. 38 is a special case of FIG. 37 where only one coil is wound around cylindrical magnetic shell. The present invention also provides for reduced transverse magnetic paths as compared to complete magnetic cylindrical shell.

Figure 39:
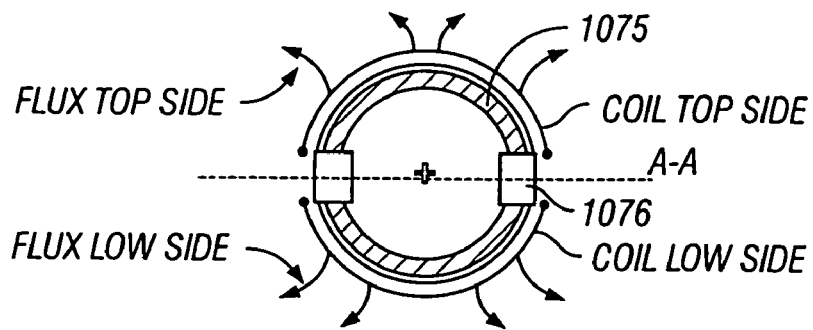
Figure 40:
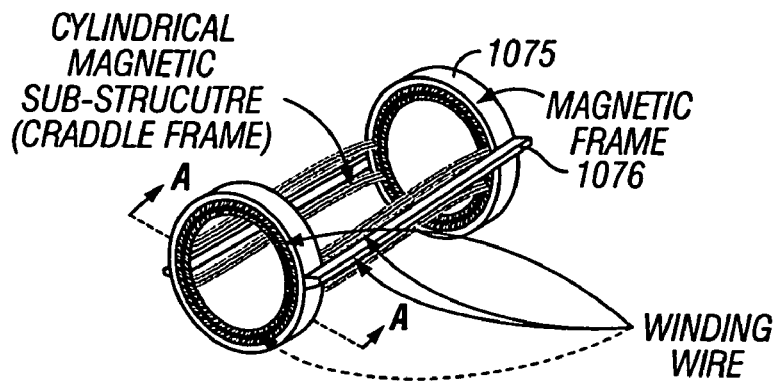
Figures 41A, 41B:
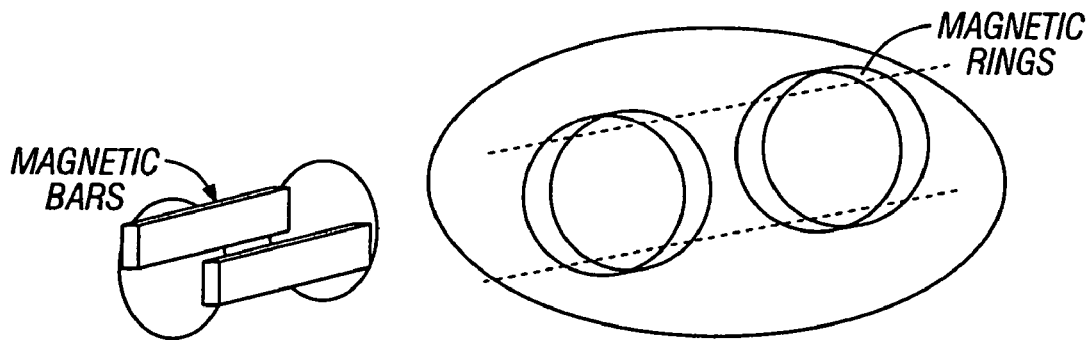

As shown in FIG. 39, a cross-section A-A of the magnetic frame illustrated in FIG. 40 and its longitudinal position also indicated in FIG. 40. The magnetic frame provides a magnetic path found also included within in cylinder made of magnetic material as shown in previous figures. The magnetic frame as shown in the figure has two circles at each end united by two bars mounted longitudinally across from each other in opposite sides. There are two symmetric coils provided with coordinated polarities mounted on each side (I top side and II low side) of the magnetic frame. Flow of flux density is also indicated. FIG. 41*a* (longitudinal opposing magnetic bars), FIG. 41*b* (coaxial rings) and FIG. 41*c* (cylindrical shells) illustrate options with reduced transverse magnetic paths.

Figure 42:
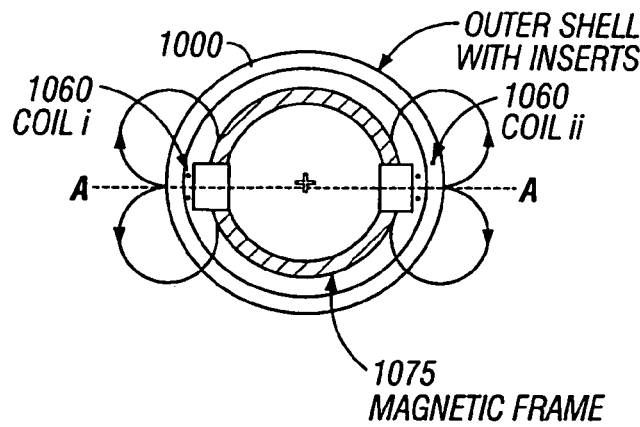
Figure 44:
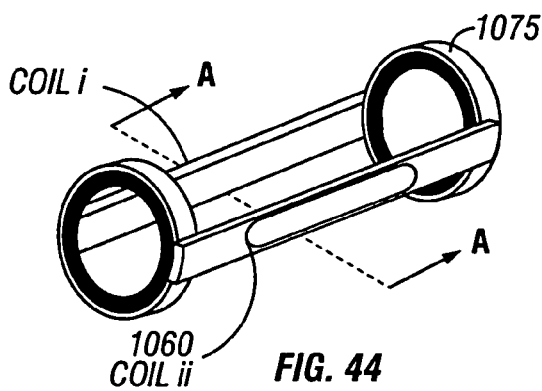

Another alternative for the setup shown in FIGS. 39 and 40 is illustrated in FIGS. 42 and 44. The two symmetric coils (coil type 2, FIG. 28) are placed in the external surface of each one of the opposing bars in the magnetic frame shown in FIG. 44 (similar to FIG. 40) with coordinated polarities.

Figure 43:
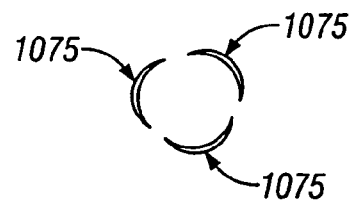
Figure 45:
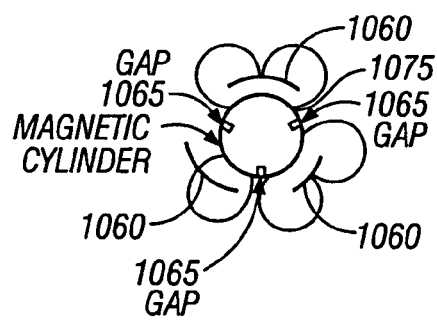
Figure 46:
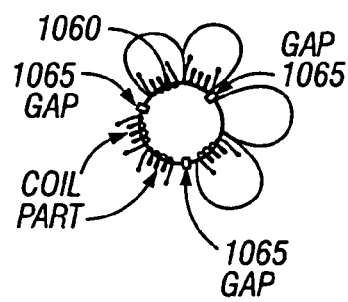
Figure 47:
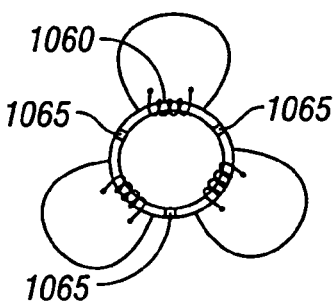
Figure 48:
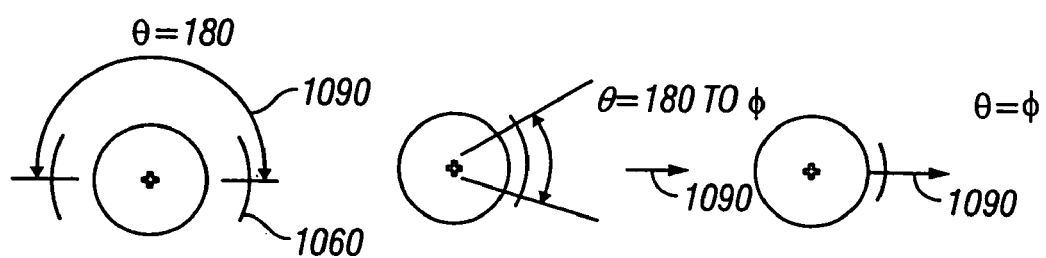
Figure 49:
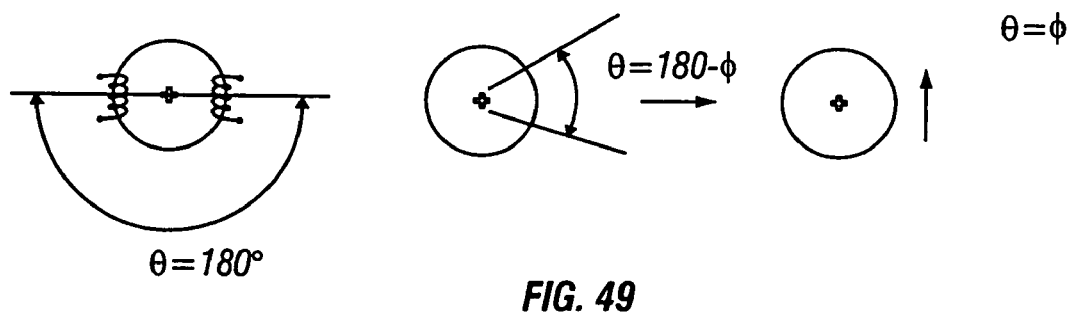

FIGS. 43 and 45 illustrate a simple sketch suggesting how one, two or more coils could be mounted in the external surface of corresponding magnetic bars where they would be mounted. FIG. 45 shows how three systems shown in FIG. 36 could be combined (coil type 2, FIG. 28). FIG. 46 illustrates how three pair of coils (coil type 1, FIG. 28) could be mounted in three cylindrical sections of a magnetic cylindrical shell separated by gaps combining three coil systems shown in FIG. 37. Similarly FIG. 47 illustrates how to combine the three coil systems shown in FIG. 38 (coil type 1, FIG. 28). FIGS. 48 and 49 show a range of relative radial positions for the split coil pair. FIG. 48 coil pairs (option 2 wound type FIG. 28) vary their relative radial angular positions from 180 degrees (symmetric around tool longitudinal axis FIG. 30) to 0 degree (coils coincide to form FIG. 36). Similarly FIG. 49 coil pairs (options 1 wound type—FIG. 28) vary their relative radial angular positions from 180 degrees (symmetric around tool longitudinal axis FIG. 32) to 0 degree (coils coincide to form FIG. 38).

Figure 50:
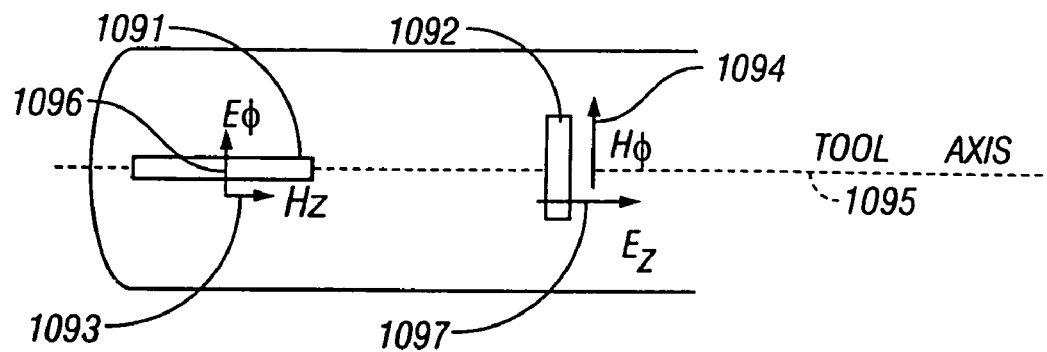
Figure 51:
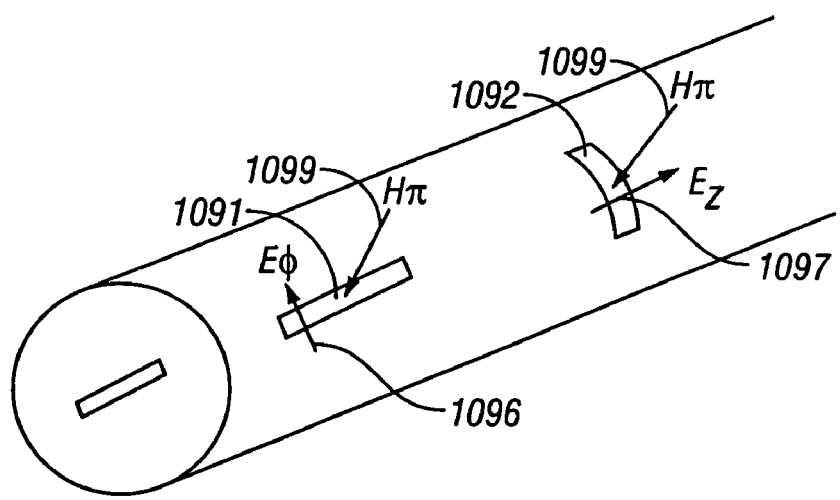

The present invention provides for electromagnetic fields measurement at high and low frequencies. FIG. 50 and 51 illustrate the fields, which typically are measurements of interest at high and low frequency respectively. FIG. 50 illustrates field measurements at high frequency. In FIG. 50 for the longitudinal opening/insert the azimuthally oriented electrical field and longitudinal magnetic field are indicated. In FIG. 50 for the transverse opening/insert the longitudinal electrical field and azimuthally magnetic field are indicated. FIG. 51 illustrates field measurements at low frequency. The main difference is the fields are of deeper penetration into the formation and are normal to the tool's opening/surface as the figure illustrates.

Figure 52:
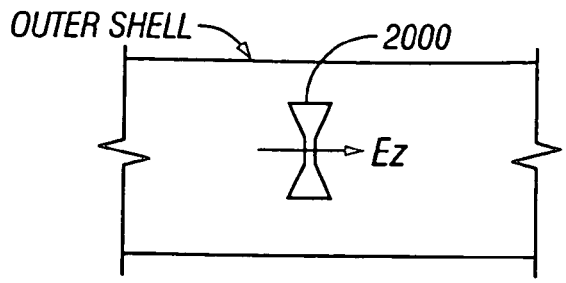
Figure 53:
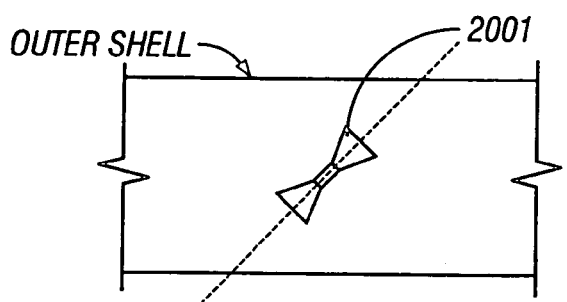
Figure 54:
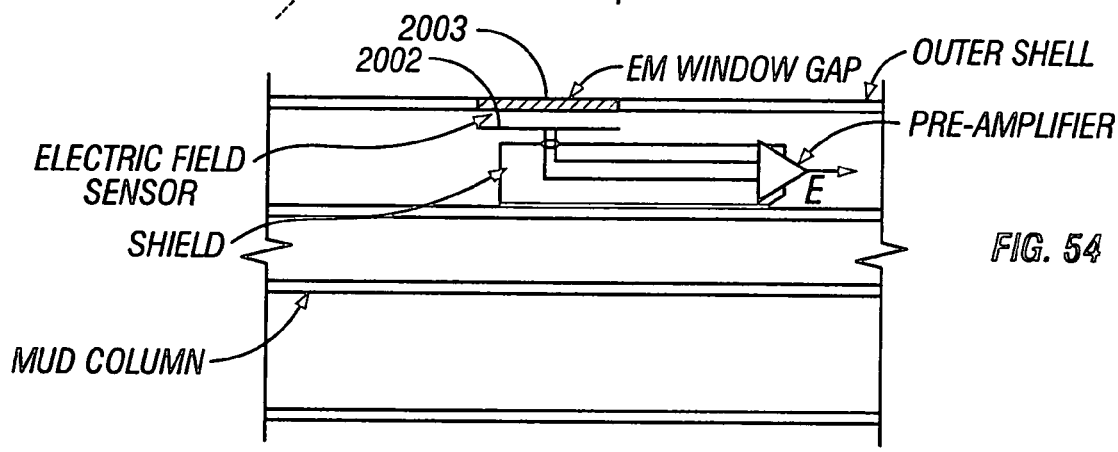
Figure 56:
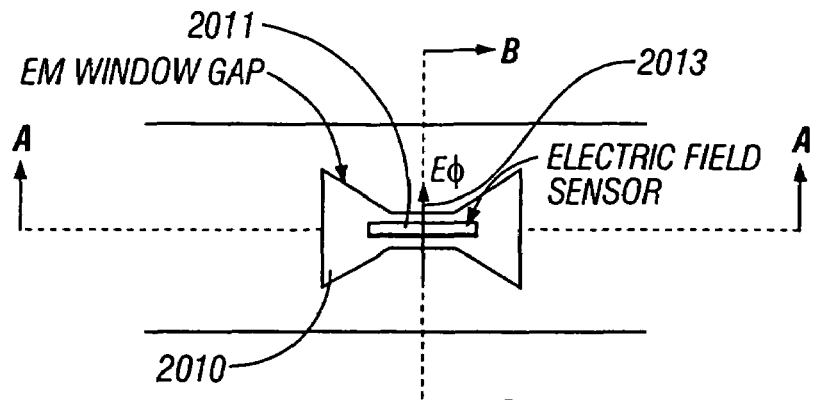
Figure 57:
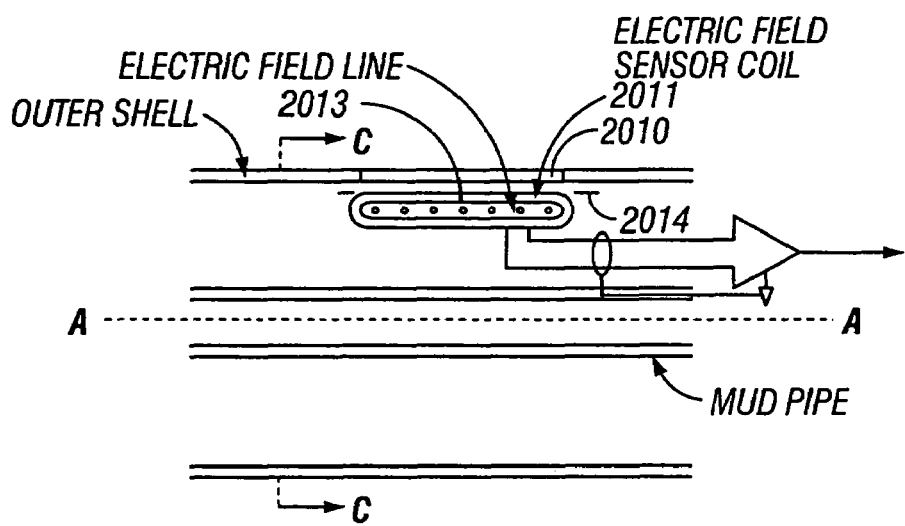
Figure 58:
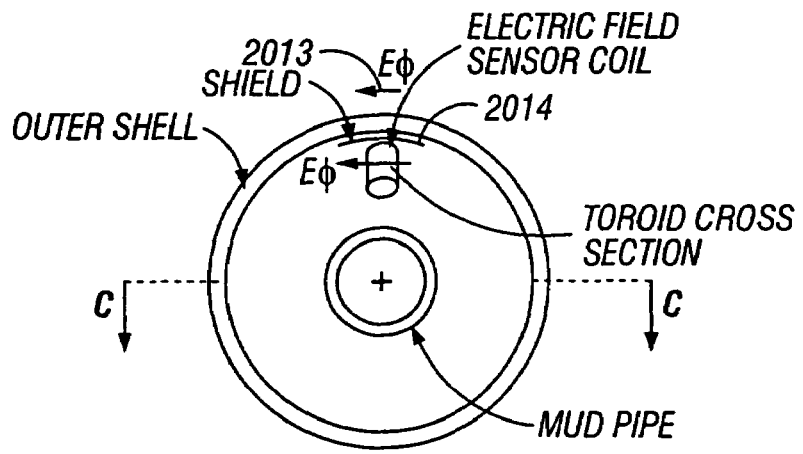

The present invention enables an electric field sensor to be combined with the openings and inserts of the present invention. FIG. 52 illustrates longitudinal electrical field measured through a transverse opening electromagnetic window. FIG. 53 illustrates an electric field measured through a sloped opening. Similarly it has been shown how conventional longitudinal openings allow measurement of electrical field parallel to the opening (electromagnetic window). FIG. 54 illustrates a tool longitudinal cross-section with a T-shaped electric field antenna under an electromagnetic window aperture placed in the outer shell. The signal detected by the antenna is brought to pre-amplifier by coaxial wire referenced to a ground producing amplified signal $V_E$. Mud column is also indicated. Similarly FIG. 55 utilizes a L-shape electrical field antenna instead. Similarly FIG. 56 utilizes a toroid-shaped sensor (Discussed in the open literature by Karinski at the SPWLA 2001 conference) shown aligned with a longitudinal opening/insert. The tool's longitudinal cross-section A-A, shown in FIG. 57, illustrates the toroid-shaped sensor utilizing a core with a profile having a ribbon-like, circle or oval cross-sections. FIG. 58 illustrates cross-section B-B in plane perpendicular to tool axis. Mud column pipe and outer shell are shown in FIG. 58.

The present invention also provides measuring system with transmitter and receiver arrays. FIG. 59 suggests a measurement system with a group of transmitter and receiver opening arrays. FIG. 59 illustrates one transmitter opening and two receiver openings (1 & 2). The following measurement combinations are enabled and utilized by the method and apparatus of the present invention: (i) Measure amplitude ratio of any received signal pair; (ii) Measure phase difference of any received signal pair; (iii) any combination of receiver array aperture or openings; (iv) measurement with any order of transmitter-receiver (one or more) openings; (v) Cover any array of transmitter-receiver openings order and orientation; (vii) i through v arranged longitudinally; (vi) i through v arranged azimuthally; (viii) cross-components—different receiver orientations; and (ix) cross-components—different receiver azimuthally positions.

Figures 11, 11A:
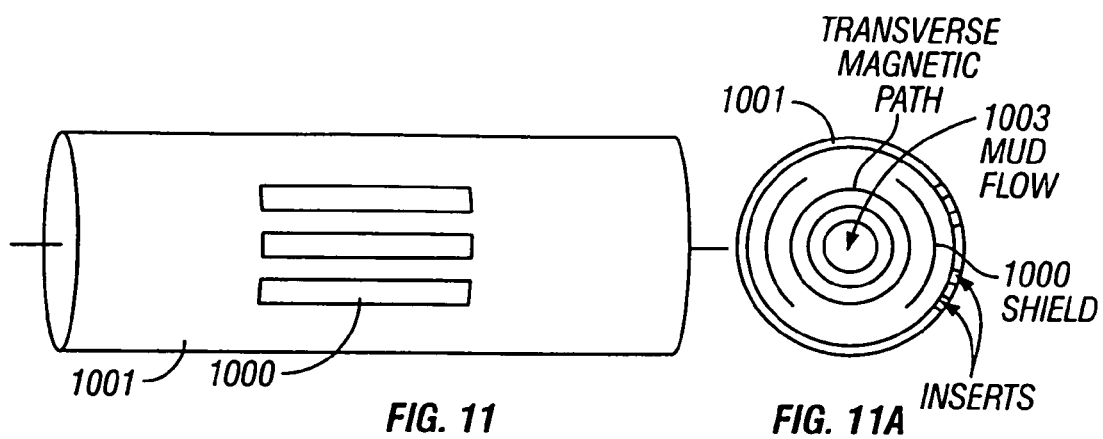
FIG. 11 illustrates a preferred tool external side view along longitudinal axis showing longitudinal apertures traditionally used in previous resistivity propagation tools.
FIG. 11A illustrates a cross-section of a preferred tool showing outer shell, shields, transverse magnetic path and internal mud flow section.
Figure 12:
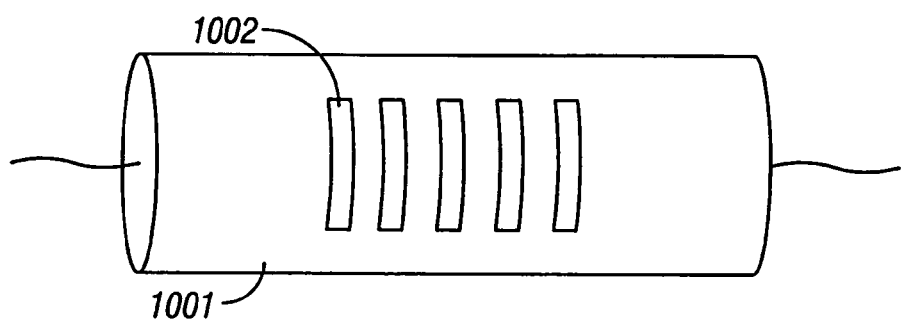
FIG. 12 illustrates external tool's side view along tool longitudinal axis showing transverse apertures aligned with transverse plane perpendicular tool longitudinal axis.
Figure 13:
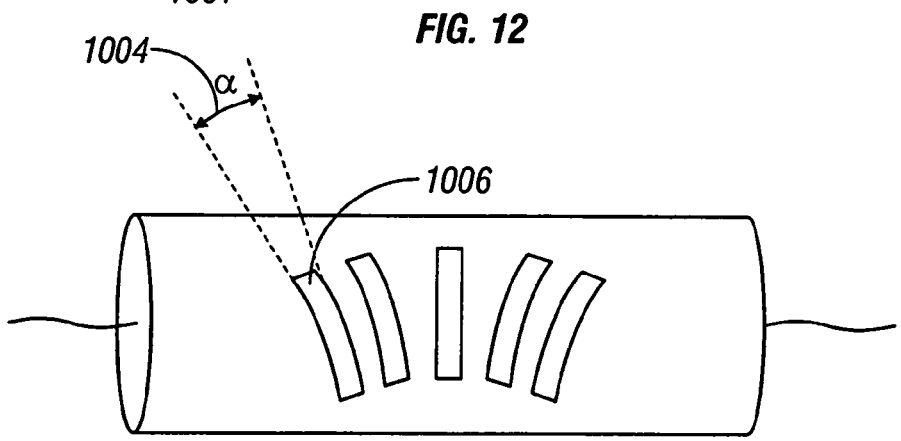
FIG. 13 illustrates external tool's side view along tool longitudinal axis showing apertures in a transverse plane varying its orientation from a direction perpendicular to the tool axis towards a direction aligned with the tool's longitudinal axis.
Figure 14:
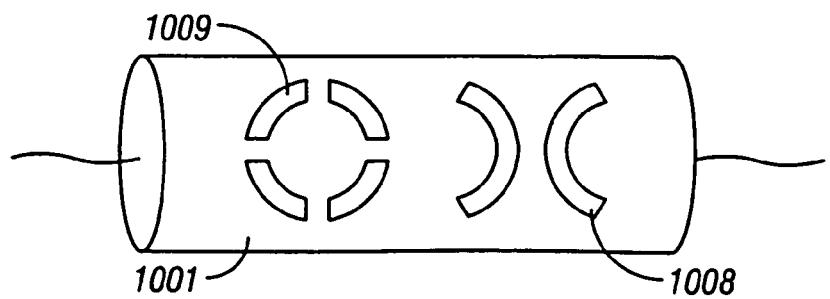
FIG. 14 illustrates external tool's side view along tool longitudinal axis showing apertures with a circular shape including aperture gaps in the circular direction.

Turning now to FIGS. 11, 12 and 13, FIG. 11 illustrates a cylindrical tool housing 1001 having longitudinal apertures 1000, which can either be empty or filled with an insert material. FIG. 12 illustrates transverse apertures 1002, which can either be empty or filled with an insert material. FIG. 13 illustrates deviated apertures 1006, which deviates more from a straight path as the aperture progresses along the longitudinal axis of the aperture, which can either be empty or filled with an insert material. FIG. 14 illustrates curvilinear apertures 1009 and 1008, which can either be empty or filled with an insert material. As shown in FIG. 15, a variable depth insert 1003 is shown, wherein the thickness 1005 of the insert is less than or equal to the thickness 1007 of the wall. FIG. 16 illustrates an annular aperture 1010 and an inclined annular aperture 1011.

Turning now to FIG. 17, the shape of the apertures affects the selectivity and attenuation of the transmitted or received fields associated with shaped apertures. For example, the attenuation pattern 1017 shown the rectangular opening 1000 of FIG. 11 has less selectivity than the attenuation pattern 1018 for the time capsule shaped aperture 1012 of FIG. 17. Each aperture shape of the present invention provides a different and unique attenuation pattern through the outer shell for the antenna transmitter and receiver inside of the tool body. FIGS. 17 and 17A illustrates "time capsule" aperture shapes 1012, 1013 and 1014. FIG. 18 illustrates an elliptical aperture shape 1015. FIG. 19 illustrates a diamond 1021 and double diamond 1022 aperture shape. FIGS. 20 and 20A illustrates additional variations 1023 and 1024 on the apertures of the present invention.

Turning now to FIG. 21, a cross-cut aperture is illustrated, having a horizontal dimension 1025 and a vertical dimension 1026. The relation of the horizontal dimension to the vertical dimension determines the effective angle of orientation for the measured or transmitted electric and magnetic fields projection with respect to the longitudinal axis of the tool. The angle theta for the vector $E_T$ of the electric field is given by $\tan^{-1}$ (vertical dimension/horizontal dimension), that is $E_T = E_V + E_H$. The present invention enables high frequency, low frequency, time domain transients and frequency domain induction and propagation. Frequency domain enables measurements of fields tangential to the surface of the tool. The cross-cut enables the equivalent of a deviated aperture due to the superposition of the vertical and horizontal components.

FIG. 22 illustrates a series of apertures that vary longitudinally 1032 and a series of apertures that vary azimuthally 1034, which enables aligning the axis of the measurement with the axis of a layer in the formation. In a preferred embodiment, multiple patterns are provided and one or all are utilized separately or together during transmission and or reception. FIG. 23 illustrates a cross-cut aperture that is switched to change the vertical and horizontal dimensions of the cross-cut aperture and vary the relative attenuation. The switches 1036 adjust the length of the apertures 1037 and 1038. The switch electrically shorts out the aperture and effectively changes the length of the aperture. As shown in FIG. 24, switches 1040 are shown in the closed position and switches 1041 are shown in the open position. All switches behind a closed switch 1040 are also closed so that the effective area of the aperture is only that area occupied by the open switches 1041, up to and including the first closed switch 1040.

FIG. 28 illustrates magnetic lens 1042 and two coil configuration options. Option 1 (magnetic core) is to wound a coil 1046 around a magnetic lens 1042 and Option 2 (surface coil) is to place a magnetic coil on the surface. Surface coils 1044 (type 2) are placed on surface of magnetic body 1045 and mounted with magnetic lens 1042. FIG. 28 illustrate a mud column 1048, and magnetic material 1045, which continues a magnetic path from the lens 1042. FIG. 29 illustrates a surface coil 1056 with transverse apertures and inserts 1050 and directional focus strips or shield 1051. The field is directed according to the angular position of the directional focus strips 1051. Outer shell is shown in 1054 and 1000 with aperture 1050. A cross section of the configuration of FIG. 29 is illustrated in FIG. 30. A directional focus strip or shield is placed one each side or either side of the coils 1059. The coils are preferably split symmetrically and parallel to the cylinder 1045.

Turning now to FIG. 32, a coil configuration wherein coils 1060 (option 1 FIG. 28) and shields 1080 are wrapped around a magnetic material 1062 is illustrated. Turning now to FIG. 31, a transverse coil 1062 having a longitudinal axis parallel to the tool body is shown along with a focus strip or shield 1064. The shield is oriented at an angel theta 1065 with respect to the longitudinal tool axis, which directs the directional field sensitivity of the coil with an angle at a preferred direction. Preferably a pattern apertures and a series of shields are coupled to together to achieve a preferred field directions. The shields enhance the selectivity of the field direction associated with the apertures shapes and relational arrangements as shown above. The multiple apertures and shields can be switched to be used simultaneously or individually to obtain a directional signal. This is especially helpful in geo-steering applications. Turning now to FIG. 32, a receiver configuration is illustrated wherein a coil 1060 is wrapped around a magnetic path. 1062. Directional focus strips 1064 or shields are shown wherein coil 1060 is shielded by the shields 1080 from undesirable fields. Turning now to FIG. 33, a transmitter configuration is illustrated having a gap 1065 to enable transmission of flux into the formation. FIG. 34 illustrates gap 1065 wherein the magnetic permeability, $\mu 1$ of the gap is much less than the magnetic permeability, $\mu 2$ of the magnetic material 1062.

Turning now to FIG. 35, FIG. 35 illustrates a symmetrical split coil transmitter for the diminution of eddy currents, wound on a transverse magnetic path as shown in FIG. 6 and a magnetic cylinder as shown in FIG. 10. As shown in FIG. 35, directional focus strip 1064 and gap 1065 is provided. Turning now to FIG. 36, an asymmetrical arrangement is shown in which only a portion of the magnetic cylinder 1045 which is most active is present and curved outward to shape the magnetic field by reducing the magnetic impedance. The coil 1060 is wound outside of the existing portion of the magnetic cylinder 1045. A directional focus strip 1045 serves as a selective shield to focus the magnetic field. FIG. 37 illustrates a dual coil 1060 arrangement wound onto the partial cylinder 1045. FIG. 38 illustrates a single coil 1060 arrangement wound onto the partial cylinder 1045. Note that at high frequencies, the tangential field M is picked up by the structure of FIG. 38.

Figure 41C:
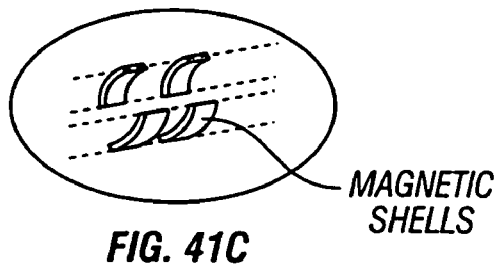

Turning now to FIG. 39, FIG. 39 illustrates the ends 1075 of a ferrite magnetic path are illustrated. A magnetic cradle or substructure of the magnetic cylinder is illustrated in FIG. 40. The magnetic cradle contains the coil and the magnetic flux associated with the coil. The cradle keeps the coil from touching the tool body and a transverse magnetic path contour just inside the coil winding. FIGS. 41A, 41B and 41C illustrate additional transverse magnetic path substructures of the magnetic cylinder provided by the present invention. FIG. 42 illustrates a combination of a symmetrical coil pair 1060 and magnetic frame 1075. FIGS. 43 and 44 illustrate a pair of symmetric surface coils 1060 on top of a magnetic cradle 1075. FIG. 43 illustrates a set of three surface coils arranged on a magnetic cylinder. Thus, one, two, three or more surface coils or coils wound on magnetic centers can be used coupled together or independent of one another. FIG. 45 illustrates three surface coils 1060 with gaps 1065 separating sections of magnetic cylinder 1075. FIG. 46 illustrates three symmetrical pairs wound on magnetic centers on sections of a cylinder sub section. FIG. 47 illustrates the single coils wound on magnetic centers on sections of a cylinder sub section. FIG. 48 illustrates three arrangements for surface coils (type 2, FIG. 28) wherein the separation between coils is 180 degrees, (180-theta) degrees and zero degrees. FIG. 49 illustrates three arrangements for coils wound on magnetic centers (type 1, FIG. 28) wherein the angular separation theta 1090 between coils varies from 180 degrees to zero degrees. Thus, the present invention provides a combination of shield and a cylinder, a shield and an insert/aperture, or a shield, an insert/aperture and a cylinder. In a preferred embodiment the shield is active and switched so that the shield is selectively engaged. The switched shield enables rotation of a magnetic dipole direction for reception and transmission of magnetic flux in the tool. Aperture geometries and dimensions can be dynamically changed by switches.

Turning now to FIG. 50, at high frequency induction shallower fields, for propagation and time domain high frequency spectra, are measured as shown in FIG. 50, the longitudinal magnetic field, Hz 1093 is measured by the longitudinal aperture 1091, which is parallel to the longitudinal axis of the tool 1095, and the transverse magnetic field, H$\phi$ 1094 is measured by the transverse aperture 1092. Note that Hz has a perpendicular electric field component E$\phi$ 1096 and H$\phi$ has a perpendicular electric field component Ez 1097. Turning now to FIG. 51, at lower frequencies the deeper fields Hr are measured from the formation by a transverse magnetic path, that is Hr is measured by the longitudinal 1091 and the transverse 1092 apertures. FIGS. 52 and 53 illustrate a transverse time capsule shaped aperture 2000 and a sloped "time capsule" shaped aperture 2001 respectively.

Figure 55:
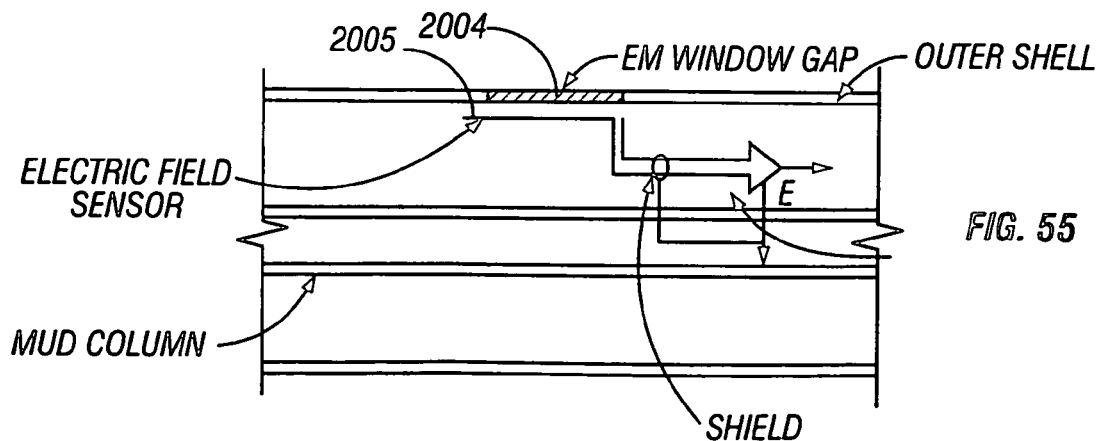

FIG. 54 illustrates a "T-shaped" antenna 2002 beneath a transverse aperture 2003 (FIG. 52) utilized to measure Ez. FIG. 55 illustrates a "L-shaped" antenna 2005 beneath a transverse aperture 2004 utilized to capture Ez. FIGS. 56, 57 and 58 illustrate a longitudinal time capsule shaped aperture 2010 for capturing electrical field E$\phi$ 2013 in electric field sensor 2011. Note that the shield 2014 is formed by parallel conductors connected at one end and oriented perpendicular to the electric field being measured. Apertures 2002, 2003 and 2010 can be oriented in longitudinal, transverse or inclined directions (see FIGS. 52 and 53). With these aperture orientations Eφ, Ez and combinations of Eφ with Ez will be measured respectively.

FIG. 59 is discussed above. FIG. 59 illustrates a plurality of transmitters and receivers. The transmitters and receivers shown in FIG. 59 are utilized to achieve a dual compensated measurement array. As shown in FIG. 59, an array configuration comprises a plurality of transmitters, T1, T2, T3, etc. and a plurality of receivers, R1, R2, R3, etc. For example, assuming the following configuration of transmitter and receiver coils along the longitudinal axis of the tool: T1, T3, R1, R2, T4 and T2. Dual compensated measurement is accomplished by firing from T1 and making paired measurements from the remaining coils. Then firing from T2 at the other end and making a symmetric measurement from the other side. For example, when firing from T1, reception occurs at T3, R1, R2, and T4. Note that the same coil can be used as a receiver and as a transmitter, thus reception at T3 and T4 is possible. Dual compensated measurements are accomplished by measuring the ratio of the amplitudes and phase differences of the signal received at R1 and R2; R2 and T4; T3 and R1; R1 and T4; T3 and R2. Then similarly the primary signal should be fired from T2 with and receiving at T4, R2, R1 and T3. Dual compensated measurements are accomplished by comparing the ratio of the amplitudes and phase differences of the signal received at R2 and R1; T4 and R2; R1 and T3; T4 and R1; R2 and T3. Generally, firing T1 into any antenna pair combination located between T1 and T2 and firing T2 into the corresponding symmetric pair combination located between T1 and T2 could do this. Such corresponding symmetric measurements obtained from both T1 and T2 are used to compensate pressure and temperature effects on the measurements. For example, T1 is fired and the signal is measured at R1 and R2. Then T2 is fired and the response is measured at R2 and R1. A plurality of receivers and transmitters and dual compensated measurements is discussed in U.S. Pat. No. 5,892,361 and U.S. Pat. No. 5,574,374. In a preferred embodiment the ratio of the amplitudes measured at R1 and R2 at a given frequency is measured. In the time domain a time difference between two receivers R1 and R2 is measured and then the ratio metric time domain difference between R1 and R2 or the phase difference between the signals received at R1 and R2 has been determined. The amplitude difference in the frequency domain is measured while a single frequency is used. This method can include a plurality of frequencies. The compensated measurement improves quality of raw data and sensitivity to formation parameters enhancing data interpretation performance and results.

Figure 60:
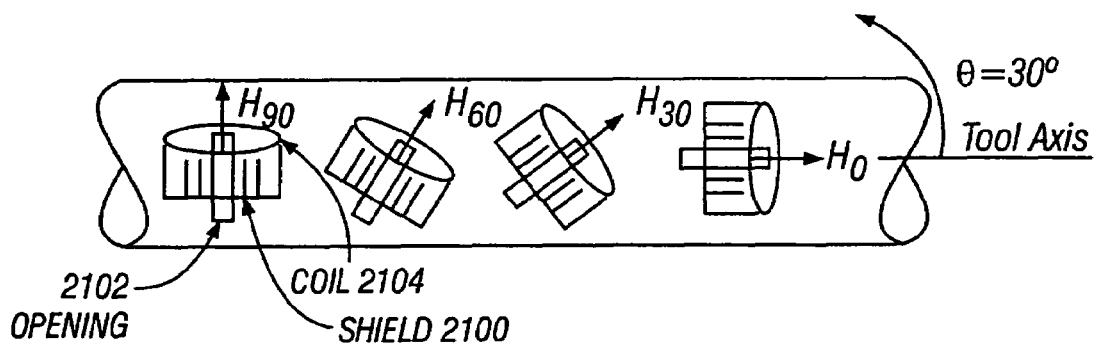

Turning now to FIG. 60, illustrates an apparatus for measurement of a magnetic field in a preferred direction. As shown in FIG. 60, a plurality of measurement coil assemblies is provided for measurement of $H_0$, $H_{30}$, $H_{60}$, and $H_{90}$. Each coil assembly comprises a coil 2104, an opening 2102, and a shield 2100. Each coil assembly is positioned to align with a particular magnetic field direction or angle. In FIG. 60, for example, the coil assemblies are positioned to, but not limited to, align with magnetic fields at 0, 30, 60 and 90 degrees from the longitudinal axis of the tool. The directional measurements are to resolve formation geological and reservation characteristics. A set of coil assemblies can be distributed longitudinally as shown in FIG. 60, or distributed azimuthally.

Figure 61:
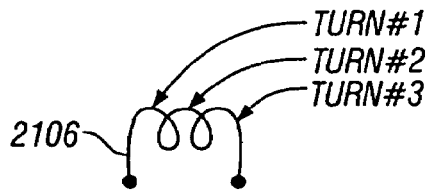
Figure 62:
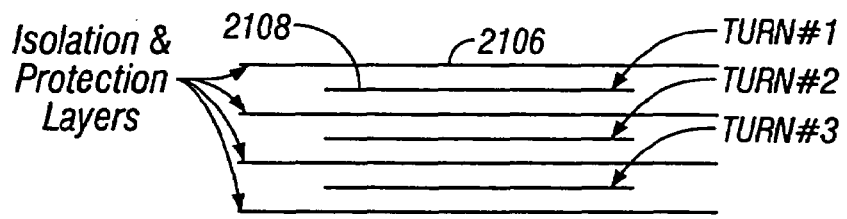
Figure 63:
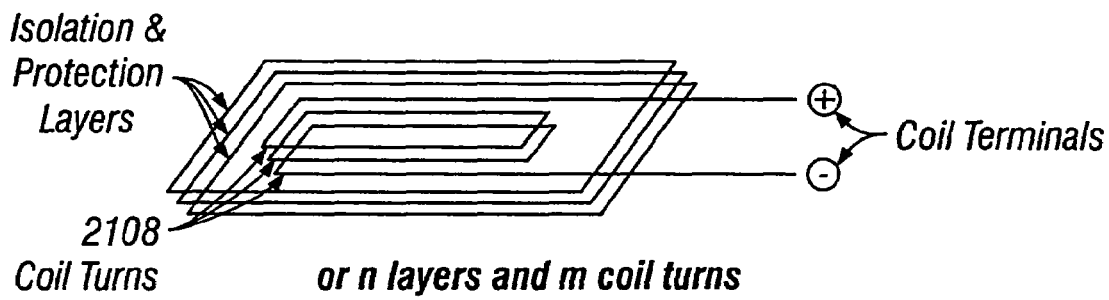
Figure 64:
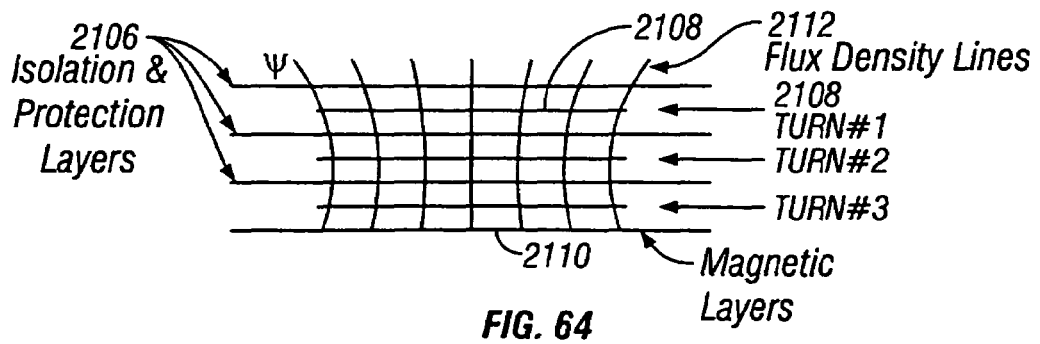
Figure 65:
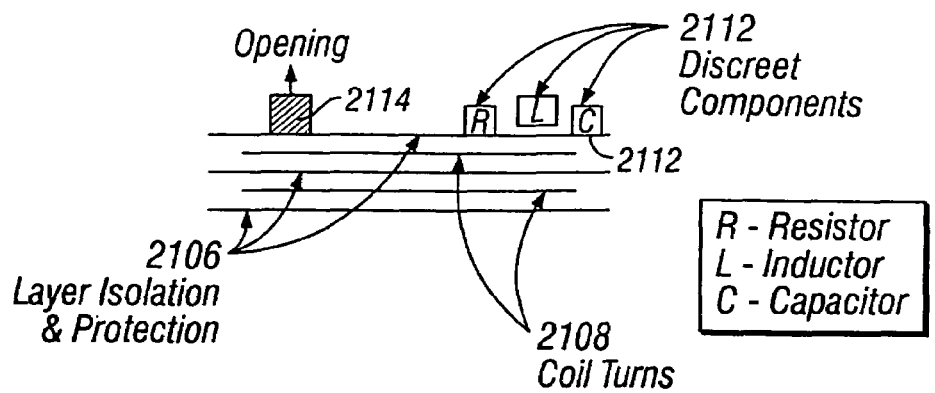
Figure 66:
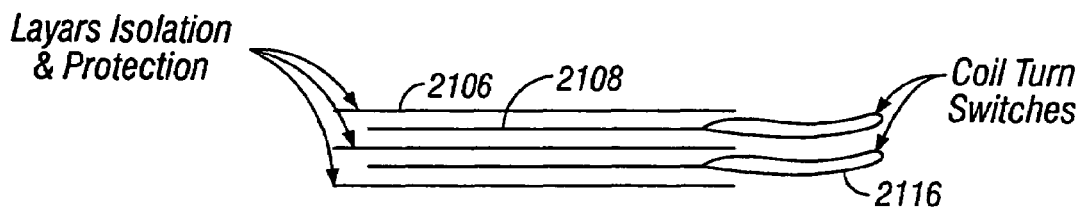
Figure 67:
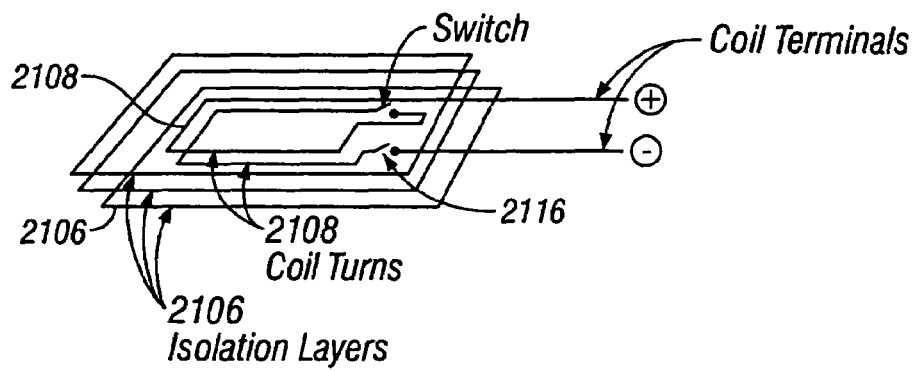
Figure 68:
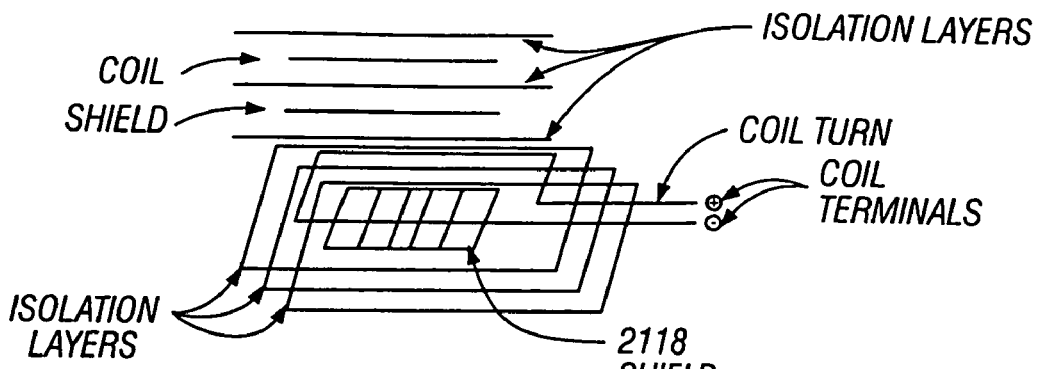
Figure 69:
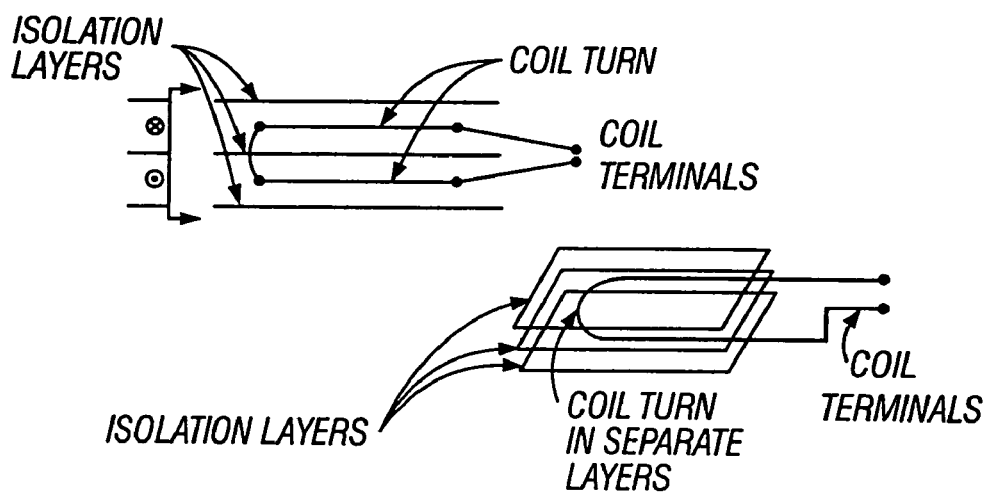
Figure 70:
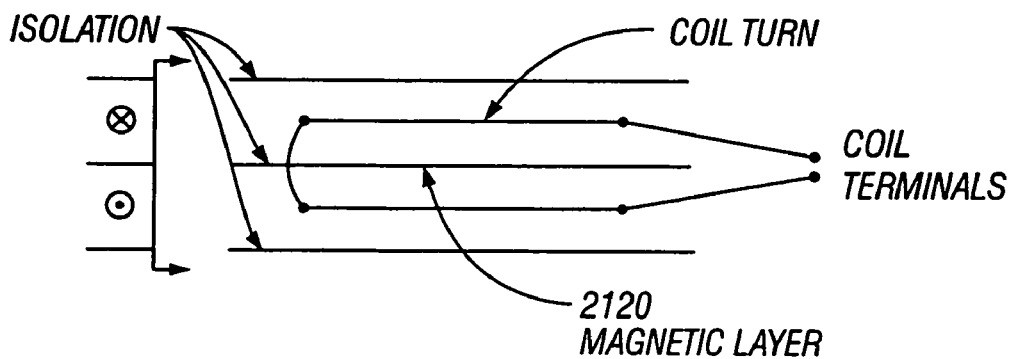

Turning now to FIG. 61, a coil can be implemented by multiple turns built with a multiple layer flexible circuit board. Turning now to FIG. 62, a one piece multiple layer circuit board comprises a cross section of the flexible circuit board comprising coil turns 2108 separated by isolation/protection layers 2106. Thus there are four isolation protection layers with a single coil turn between each pair of isolation layers. Turning now to FIG. 63, FIG. 63 illustrates an isometric view of the flexible circuit board comprising N isolation layers and M coil turns. Turning now to FIG. 64, a flexible circuit board further comprising a magnetic layer to serve as a magnetic cylinder and a surface coil (type 2, FIG. 28) on top of the magnetic layer. Turning now to FIG. 65, a flexible circuit board is shown comprising tunable and switchable components 2112 and/or magnetic lenses focusing or magnetic path 2114 mounted on the flexible circuit board. Turning now to FIG. 66, a flexible circuit board is shown comprising a coil and a switch 2116 to make or break the coil 2108. Thus, in the structure shown in FIG. 66, there can be multiple coils in multiple layers and by switching one can select the direction desired for orientation of the magnetic field sensitivity. Thus, one can make or break coil turns in a single layer or in multiple layers. Turning now to FIG. 67 and 68, a flexible circuit board housing a coil is shown having a shield 2118 layer with coil and isolation layers which can be switchable. Turning now to FIG. 69, a coil having a coil return 2119 in a separate layer, thus the area of the coil is perpendicular to the flexible circuit board, thus, multiple turns can be contained in the plane perpendicular to the flexible circuit board. As shown FIG. 70, the coil turns are shown with a magnetic layer between them so that the flexible circuit board now comprises a coil wound on magnetic material (type 1, FIG. 28).

Figure 71:
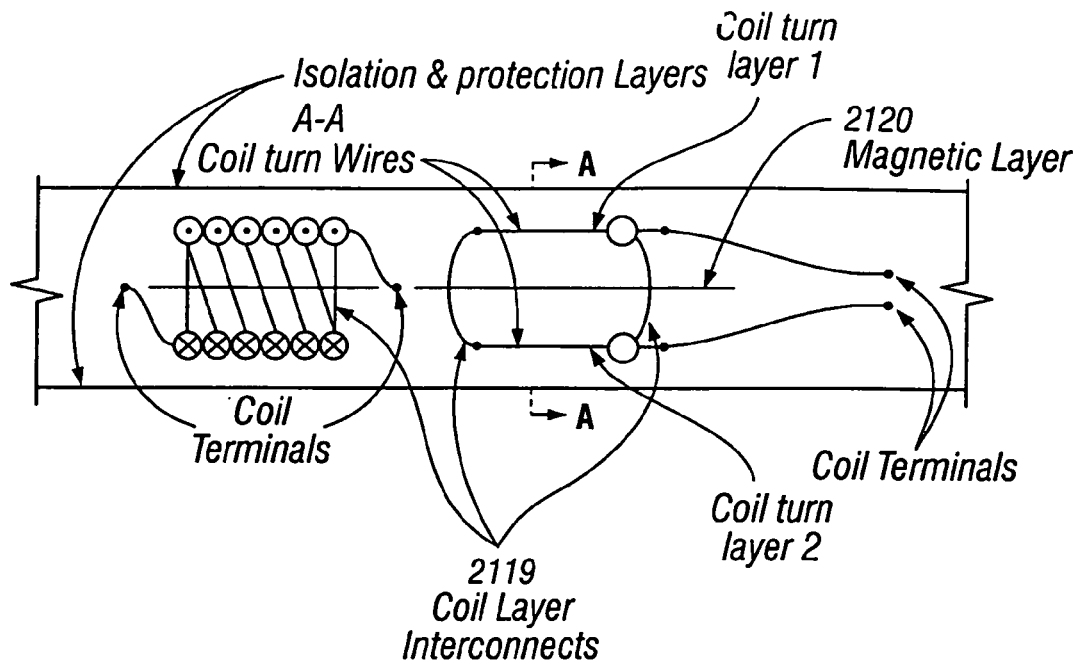
Figure 72:
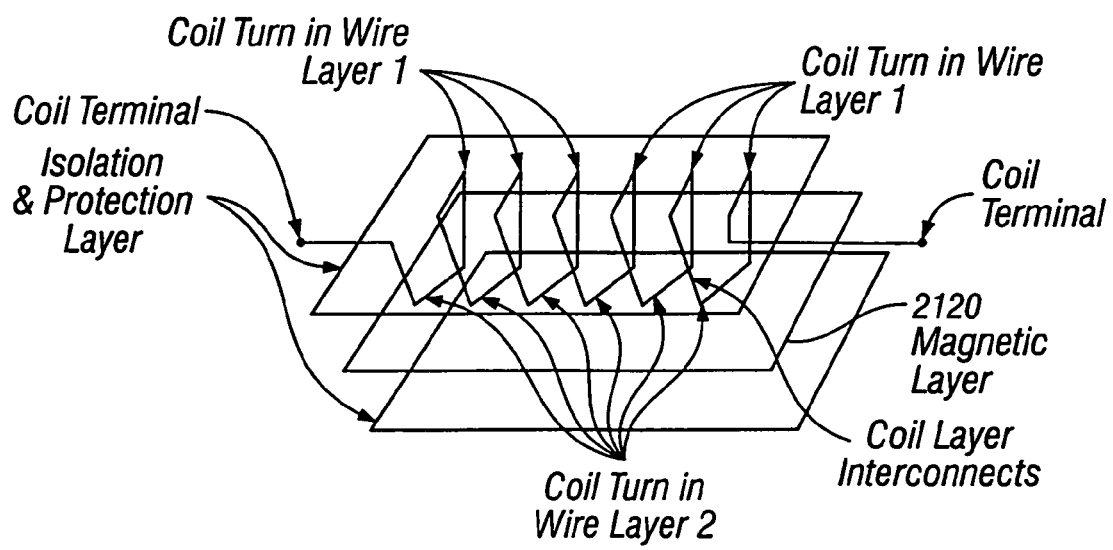
Figures 73, 74:
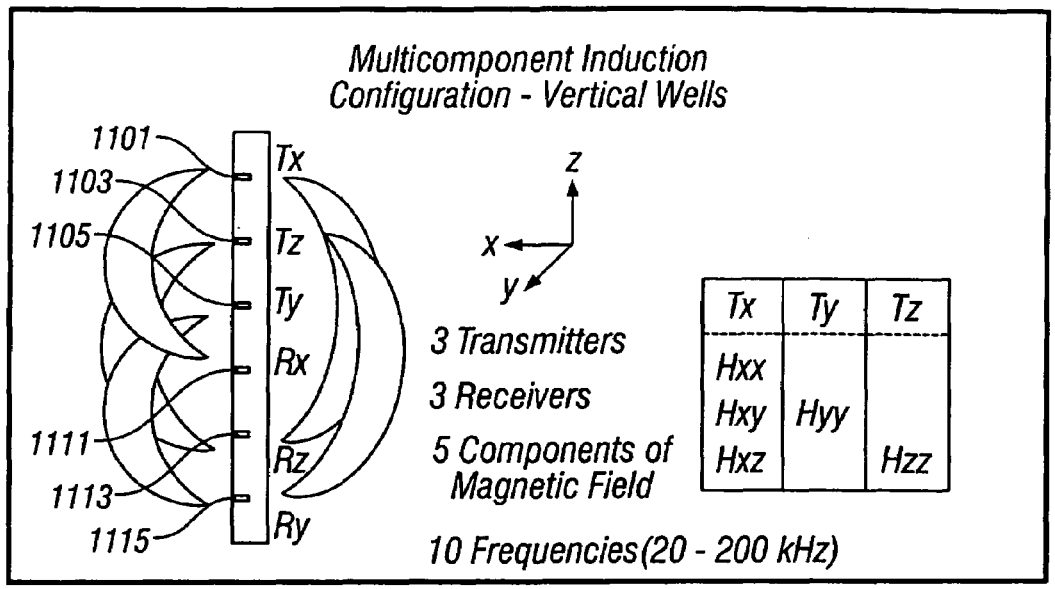
FIG. 73 depicts a sketch of the new 3DEX multi-component induction tool developed by Baker Hughes.
FIG. 74 shows an example of two simulated cases of horizontal formations.

Turning now to FIG. 71 and 72, a multiple layer flexible circuit board is illustrated having a coil return in a separate layer to form multiple coil turns. Turning now to FIG. 73, FIG. 73 shows the configuration of transmitter and receiver coils in a preferred embodiment of the 3DExplorer™ (3DEX) induction logging instrument of Baker Hughes. Three orthogonal transmitters 1101, 1103, and 1105 that are referred to as the $T_x$, $T_z$, and $T_y$ transmitters are placed in the order shown. The three transmitters induce magnetic fields in three spatial directions. The subscripts (x, y, z) indicate an orthogonal system substantially defined by the directions of the normals to the transmitters. The z-axis is chosen to be along the longitudinal axis of the tool, while the x-axis and y-axis are mutually perpendicular directions lying in the plane transverse to the axis. Corresponding to each transmitter 1101, 1103, and 1105 are associated receivers 1111, 1113, and 1115, referred to as the $R_x$, $R_z$, and $R_y$ receivers, aligned along the orthogonal system defined by the transmitter normals, placed in the order shown in FIG. 73. $R_x$, $R_z$, and $R_y$ are responsible for measuring the corresponding magnetic fields $H_{xx}$, $H_{zz}$, and $H_{yy}$. Within this system for naming the magnetic fields, the first index indicates the direction of the transmitter and the second index indicates the direction of the receiver. In addition, the receivers $R_y$ and $R_z$, measure two cross-components, $H_{xy}$ and $H_{xz}$, of the magnetic field produced by the $T_x$ transmitter (1101). This embodiment of the invention is operable in single frequency or multiple frequency modes.

As an example of the sensitivity to directionality of the 3DEX tool, a bed layer configuration illustrated in FIG. 74 and response value are tabulated in Table 1.

TABLE 1

Magnetic field response

| (A/m) | Case 1 | Case 2 |
|---|---|---|
| Hxx | 8.86777008E-04 | 8.86777008E-04 |
| Hxy | −1.99889226E-04 | −1.99889226E-04 |
| Hxz | 2.45139177E-04 | −2.45139207E-04 |
| Hyy | 1.11758942E-03 | 1.11758942E-03 |
| Hyx | 1.99889240E-04 | 1.99889240E-04 |
| Hyz | −1.41531185E-04 | 1.41531200E-04 |
| Hzz | 1.16889027E-03 | 1.16889027E-03 |

Figure 87:
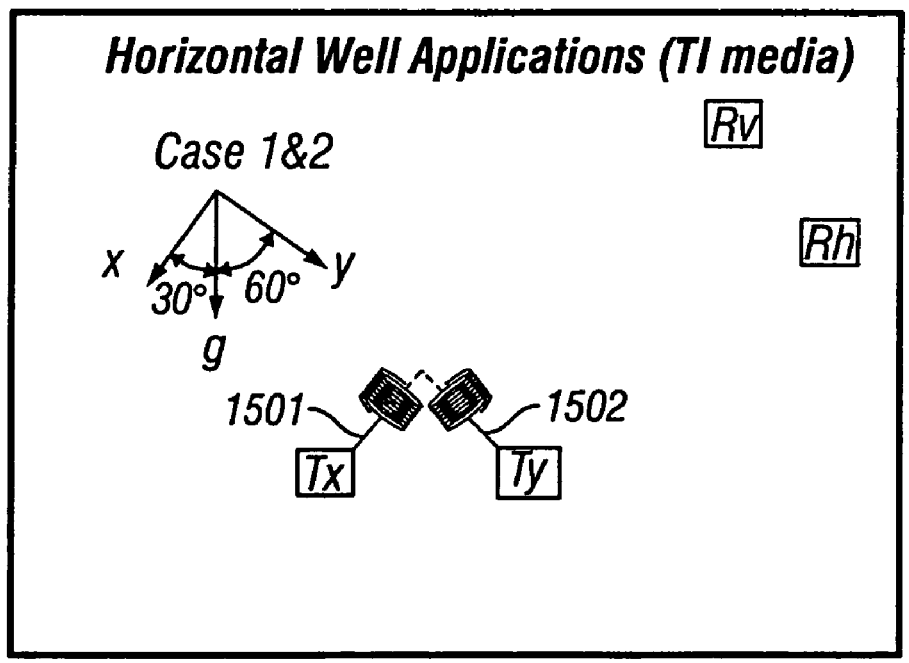
FIG. 87 shows a configuration for a horizontal well application used to obtain results shown in FIG. 74.

The configuration in FIG. 74 is comprised of two cases of three-layered media, labeled Case 1 and Case 2. In both cases, the middle layers 1213 and 1223 are 1 m thick and have a horizontal resistivity ($R_h$) of 4 Ohm-m and a vertical resistivity ($R_v$) of 10 Ohm-m. In Case 1, the $R_h$ and $R_v$ are both 1 Ohm-m in the top layer 1211 and 2 Ohm-m in the bottom layer 1215. In Case 2, the resistivities are interchanged from Case 1, with a $R_h$ and $R_v$ both equal to 2 Ohm-m in the top layer 1221 and 1 Ohm-m in the bottom layer 1225. In both cases, the relative dip of the borehole is 90 degrees (horizontal borehole) and azimuth angle is 30 degrees. The configuration is shown in FIG. 87, with $T_z$ pointing out of the page, $T_x$ (1501) aligned with its normal at an angle of 30 degrees to the vertical, and $T_y$ (1502) aligned with its normal at an angle of 60 degrees to the vertical.

Table 1 shows the magnetic fields responses for the 3DEX instrument taken while positioned in the middle of the center layer. The responses are normalized to a unit transmitter-receiver moment and are for an excitation frequency of 20 kHz. The normalized field responses are in units A/m. These simple results demonstrate that although $H_{xx}$, $H_{yy}$, and $H_{zz}$ are insensitive to directionality, the $H_{xy}$ and $H_{xz}$ components (shown in bold in Table 1) are sensitive to directionality in a horizontal, vertical or deviated wellbore. With this knowledge, a practitioner of the art can discriminate whether a layer is above or below, or on which side of the vertical horizontal or deviated borehole trajectory and thus can use said knowledge for geo-steering purposes.

Figure 88:
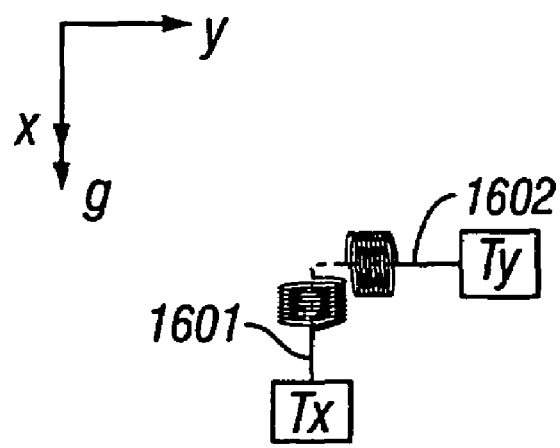
FIG. 88 shows a configuration for a horizontal well application used to obtain results displayed in FIGS. 75-83.

FIG. 88 shows the configuration of the tool used for cases 3 through 11 shown in FIGS. 75-83. $T_z$ is pointing out of the page as in FIG. 87. The transverse transmitters are newly aligned so that the $T_x$ transmitter (1601) is aligned with the normal to the plane of the transmitter along the vertical while the $T_y$ (1602) transmitter is aligned with the normal to the plane of the transmitter along a horizontal direction.

Figure 75:
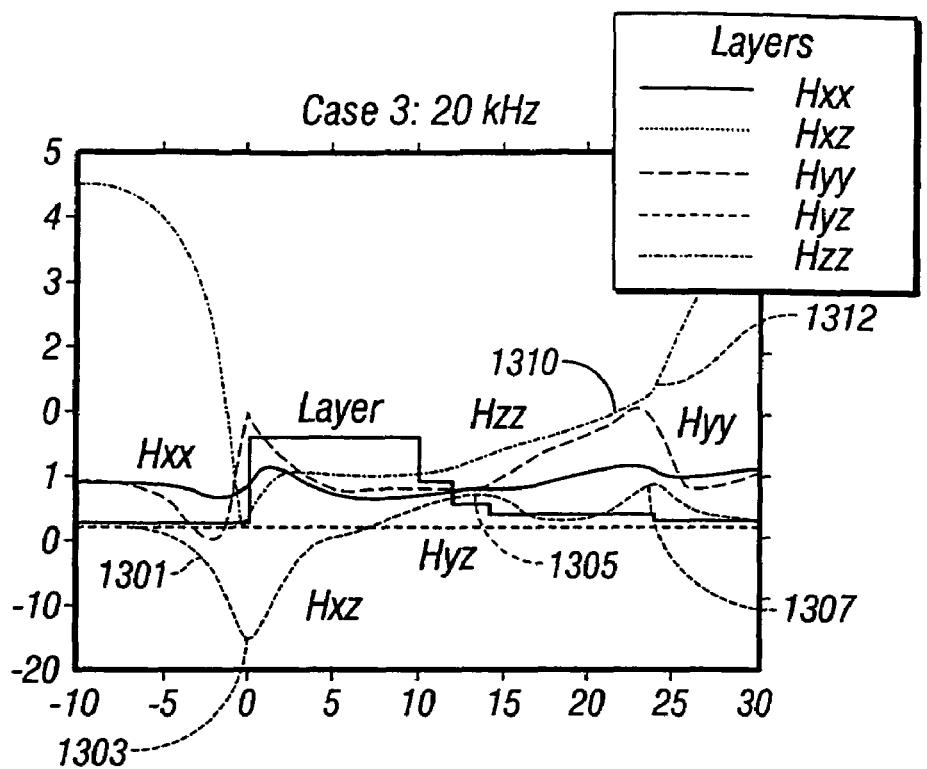
FIG. 75 shows a graph of a typical six-level anisotropic turbidite sequence along with responses of the five components to the applied RF magnetic field at 20 kHz.

FIG. 75 shows a case (Case 3) of a typical anisotropic turbidite layer sequence. The lithology sequence from top to bottom of the model is shale, thick sand, followed by a transition to a low resistivity and electrically anisotropic sand-shale sequence. The resistivities of this bed layer structure are tabulated in Table 2.

TABLE 2

| Resistivity Bed | Depth top boundary (ft) | Rh (ohm-m) | Rv (ohm-m) |
|---|---|---|---|
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 5 |
| 6 | 24 | 0.8 | 0.8 |

It is to be noted that FIGS. 75-81 do not show tool responses as a tool is moved along a wellbore: in each of the figures, the borehole is horizontal. What is shown is the response of the tool in a horizontal borehole at a specific location in the layered medium given by the horizontal axis in the plots. The sequence contains six overall bed layers, the resistivity of all layers being isotropic except for the fifth bed layer. The anisotropic fifth layer (between 15 and 25 feet of depth) has $R_h$=1.5 ohm-m and $R_v$=5 ohm-m The tool operates at multiple frequencies. Only the 20 kHz response is shown here. In thick beds, when the boundaries are more than 5 feet away from the tool, the $H_{xz}$ response is zero (1301). The $H_{xz}$ response starts showing sensitivity to a bed boundary when that bed boundary is within 5 feet of the tool. If the tool is moving from a region on of low resistivity to a region of high resistivity, $H_{xz}$ has a negative response (1303). Similarly, when the tool is moving from a region of high resistivity to a region of low resistivity, the $H_{xz}$ response is positive (1305 and 1307). $H_{zz}$ experiences a positive deflection in the isotropic (fifth) bed layer (1310), but experiences a larger deflection as the tool enters the isotropic sixth bed layer (1312).

Figure 76:
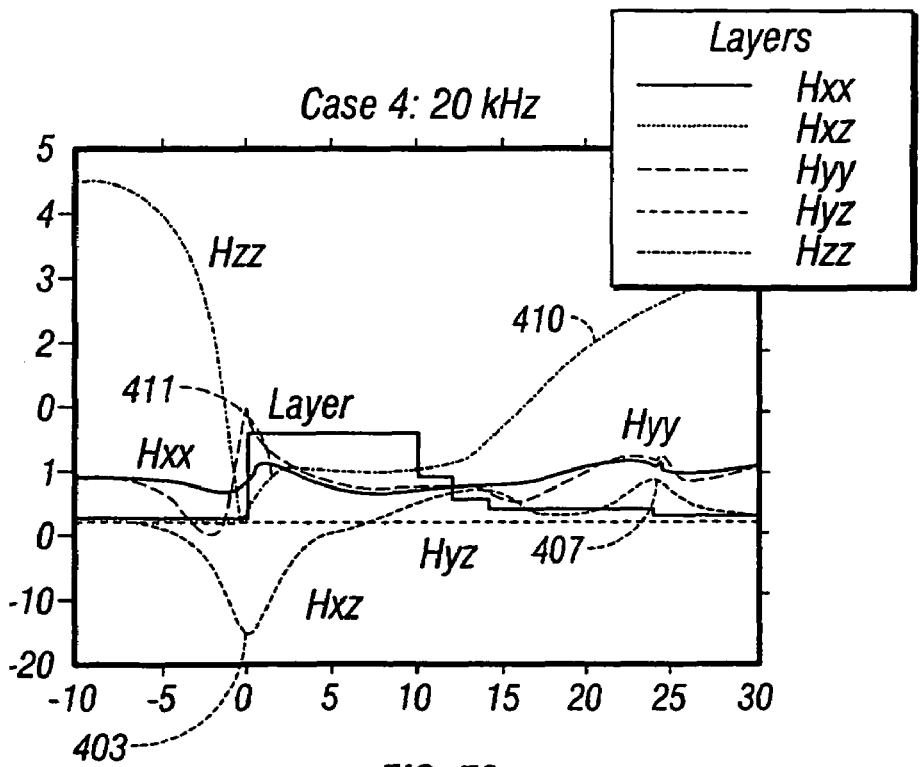
FIG. 76 shows a graph of a six-level isotropic sequence along with responses of the five components to the applied RF magnetic field at 20 kHz.

A comparison can be made between Case 3 in FIG. 75 and Case 4 in FIG. 76. FIG. 76 shows a bed layer structure having a resistivity that is completely isotropic at all bed layers, including an isotropic fifth bed layer. The resistivities of this bed layer structure are tabulated in Table 3.

TABLE 3

| Resistivity Bed | Depth top boundary (ft) | Rh (ohm-m) | Rv (ohm-m) |
|---|---|---|---|
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 1.5 |
| 6 | 24 | 0.8 | 0.8 |

In Case 4, $R_v$ and $R_h$ are both equal to 1.5 ohm-m at the fifth bed layer. The $H_{xz}$ component in FIG. 76 is not different substantially from the $H_{xz}$ response in FIG. 3, even along transitions into and out of the isotropic fifth bed. There is however a noticeable influence on $H_{zz}$ component as the tool crosses the boundary between the fourth and fifth bed layers. Comparing (1310) in FIG. 3 with (1310) in FIG. 3, shows the dampening effect anisotropy had on the $H_{zz}$ component.

Figure 77:
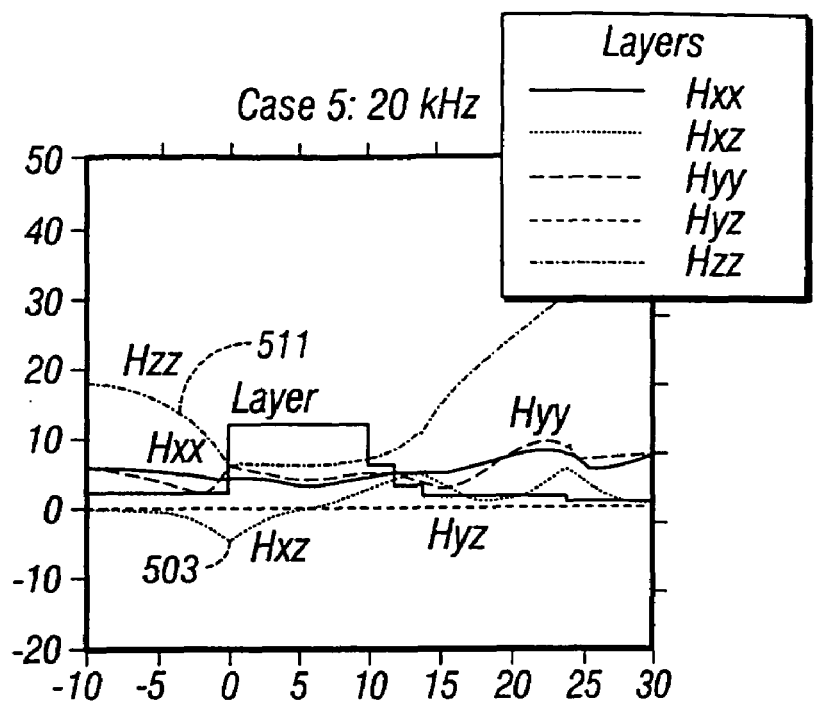
FIG. 77 shows a graph of the sequence of FIG. 76 with altered resistivities at the first bed layer along with responses of the five components to the applied RF magnetic field at 20 kHz.

FIG. 77 shows a bed layer sequence with a single variation on Case 4 of FIG. 76. The horizontal and vertical resistivities at the first depth are equal to 2 ohm-m in FIG. 5 whereas the corresponding resistivities are 0.6 ohm-m in FIG. 76. The resistivities of this bed layer structure are tabulated in Table 4.

TABLE 4

| Resistivity Bed | Depth top boundary (ft) | Rh (ohm-m) | Rv (ohm-m) |
|---|---|---|---|
| 1 | −10 | 2 | 2 |
| 2 | 0 | 12 | 12 |
| 3 | 10 | 6 | 6 |
| 4 | 12 | 3 | 3 |
| 5 | 14 | 1.5 | 1.5 |
| 6 | 24 | 0.8 | 0.8 |

In the new formation of FIG. 77, corresponding to the reduced differences in the resistivities of the first and second bed layers, there is less deflection of the $H_{xz}$ component crossing from the first bed to the second bed (503) compared to (403) in FIG. 4. The magnitude of the negative deflection of $H_{zz}$ (511) is also reduced from it's deflection (411) in FIG. 76.

Figure 78:
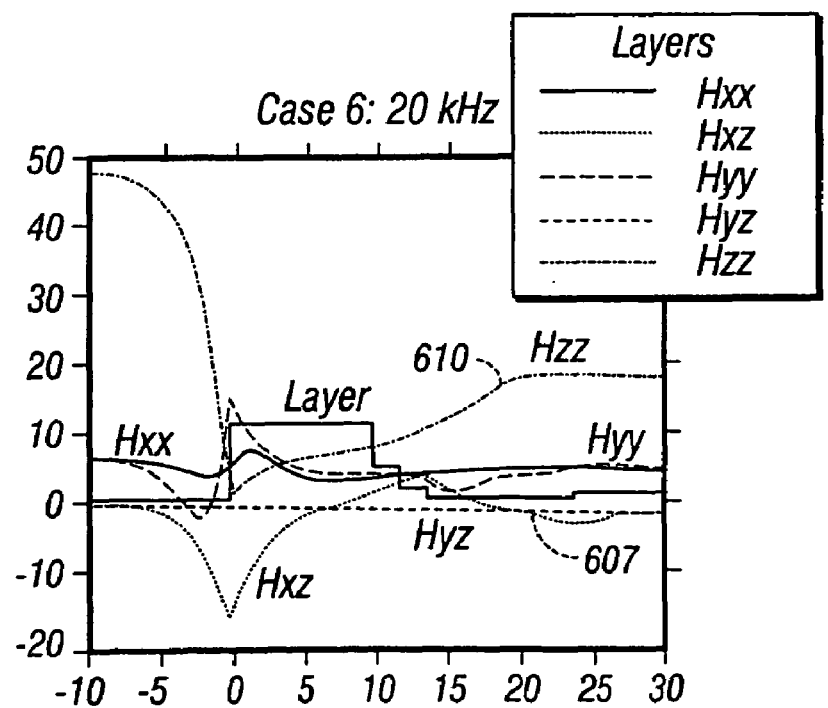
FIG. 78 shows a graph of the sequence of FIG. 76 with altered resistivities at the sixth bed layer along with responses of the five components to the applied RF magnetic field at 20 kHz.

The bed layer structure in FIG. 78 shows another single variation on the sequence of FIG. 76. In FIG. 78, the sixth depth level has $R_h$ and $R_v$ equal to 2 ohm-m where the resistivity is 0.8 ohm-m in FIG. 76. The resistivities of this bed layer structure are tabulated in Table 5.

TABLE 5

| Resistivity Bed | Depth top boundary (ft) | Rh (ohm-m) | Rv (ohm-m) |
|---|---|---|---|
| 1 | −10 | 0.6 | 0.6 |
| 2 | 0 | 12 | 12 |
| 3 | 10 | 6 | 6 |
| 4 | 12 | 3 | 3 |
| 5 | 14 | 1.5 | 1.5 |
| 6 | 24 | 2 | 2 |

Whereas in FIG. 76 the fifth bed layer is more resistive than the sixth bed layer, in FIG. 78 the sixth bed layer is more resistive in all directions than the fifth bed layer. As a result, the deflection of $H_{xz}$ (607) is opposite the direction of the deflection in FIG. 76 (407) across this boundary. As the tool moves from fifth level to the sixth level, the response of the $H_{zz}$ component (610) also reverses its deflected direction from FIG. 76 (410).

Figure 79:
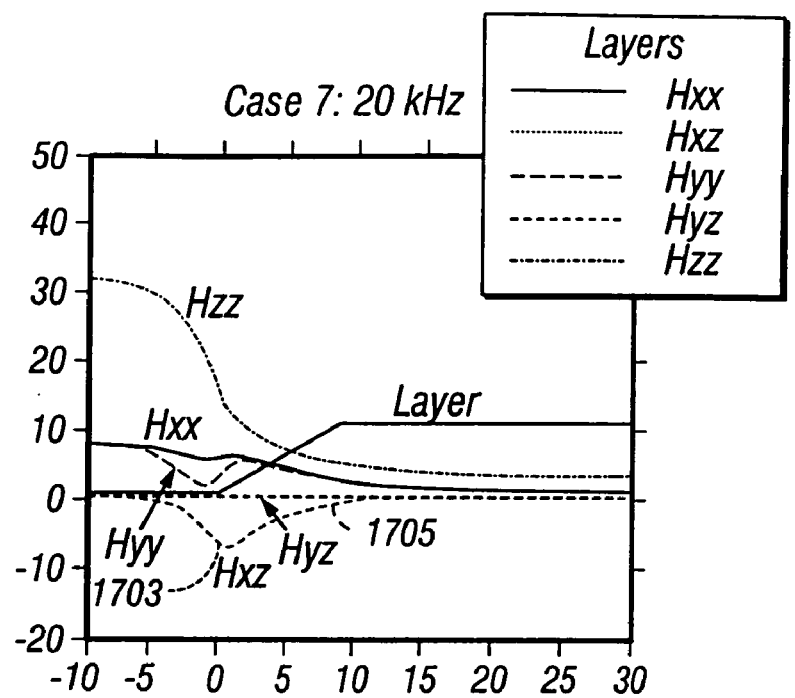
FIG. 79 shows a graph of a three-level linearly graded transition sequence along with responses of the five components to the applied RF magnetic field at 20 kHz.

FIG. 79 shows a linearly graded transition region which lies between 0 and 10 feet between a comparatively low resistivity bed (1 ohm-m) and a comparatively high resistivity bed (11 ohm-m). The resistivities of this bed layer structure are tabulated in Table 6.

TABLE 6

| Resistivity Bed | Depth top boundary (ft) | Rh (ohm-m) | Rv (ohm-m) |
|---|---|---|---|
| 1 | −10 | 1 | 1 |
| 2 | 0 | Linear grading | Linear grading |
| 3 | 10 | 11 | 11 |

At all levels, the resistivity is isotropic. The deflection of $H_{xz}$ depends on the conductivity profile. In the beginning of the transition zone, the deflection of $H_{xz}$ (1703) is large because the slope of the conductivity profile (reciprocal of resistivity) is large. At the end of the zone, the conductivity slope is smaller, and therefore $H_{xz}$ (1705) does not detect the transition into the third bed. Again, the deflection in the entire region is negative because the resistivity is increasing.

Figure 80:
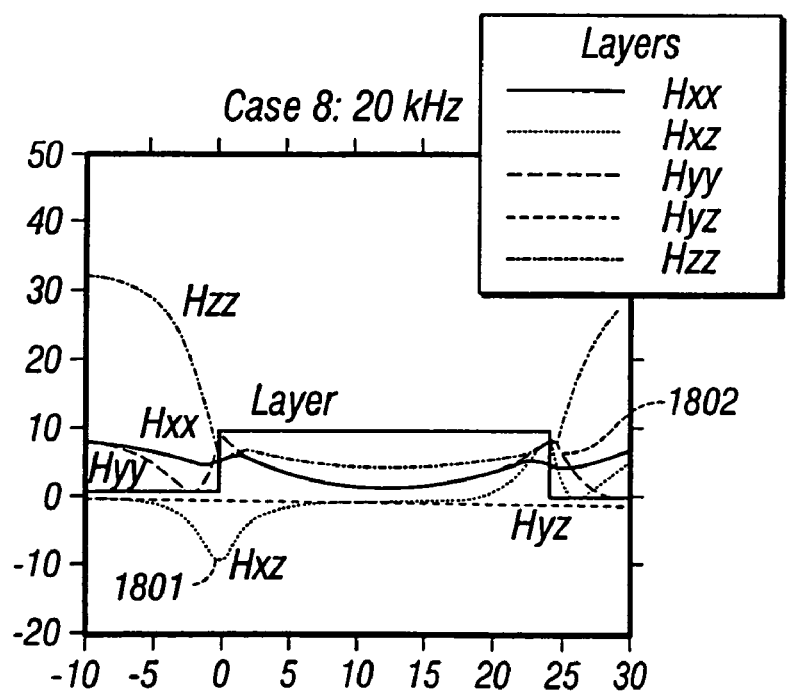
FIG. 80 shows a graph of a thick resistive bed sandwiched between two conductive beds along with responses of the five components of the applied RF magnetic field at 20 kHz.

FIG. 80 shows a case of a thick resistive bed sandwiched between two conductive beds. The sequence corresponds to a top level of shale, a middle thick resistive sand level, and a bottom level of shale. The resistivities of this bed layer structure are tabulated in Table 7.

TABLE 7

| Resistivity Bed | Depth top boundary (ft) | Rh (ohm-m) | Rv (ohm-m) |
|---|---|---|---|
| 1 | −10 | 1 | 1 |
| 2 | 0 | 10 | 10 |
| 3 | 10 | 1 | 1 |

The deflection of $H_{xz}$ (801) is negative at the boundary at a depth of 0 feet and has the same order of magnitude as the corresponding deflection in FIG. 75. Similarly, at the boundary between the beds at 25 feet, the deflection of $H_{xz}$ (803) is positive as the tool crosses into the layer of lower resistivity. $H_{zz}$ responses are also consistent with the results of FIG. 76.

Figure 81:
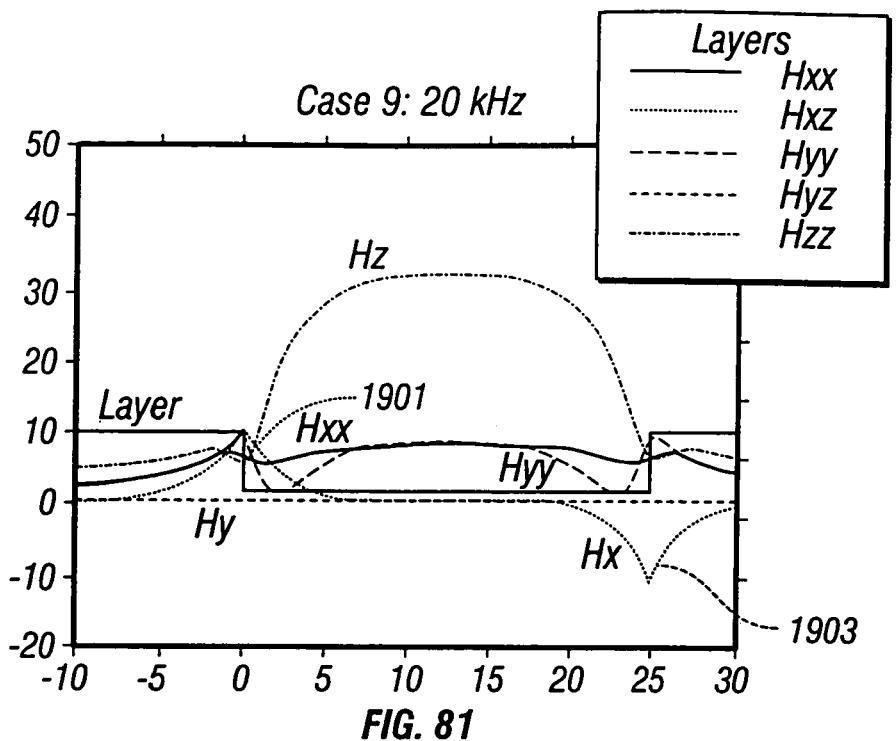
FIG. 81 shows a graph of a thick conductive bed sandwich between two resistive beds with responses of the five components of the applied RF magnetic field at 20 kHz.

FIG. 81 shows the converse situation from that in FIG. 80, wherein a conductive bed layer is sandwiched between two resistive bed layers. The resistivities of this bed layer structure are tabulated in Table 8.

TABLE 8

| Conductive Bed | Depth top boundary (ft) | Rh (ohm-m) | Rv (ohm-m) |
|---|---|---|---|
| 1 | −10 | 10 | 10 |
| 2 | 0 | 1 | 1 |
| 3 | 10 | 10 | 10 |

The $H_{xz}$ signal has a positive deflection (1901) for the boundary at which the resistivity decreases with depth and a negative deflection (1903) where the resistivity increases with depth.

Figure 82:
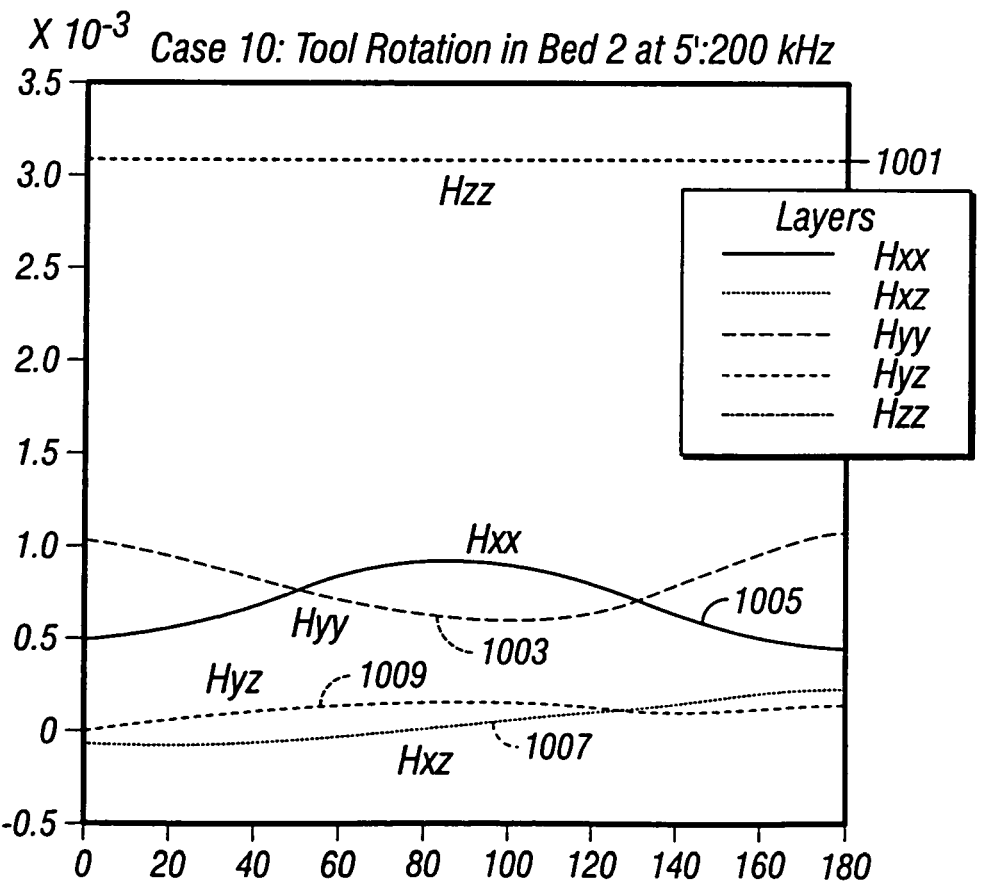
FIG. 82 shows the five component responses to the applied 200-kHz RF magnetic field as the invention is rotated through 180 degrees inside a horizontal borehole within the second bed of FIG. 76.
Figure 83:
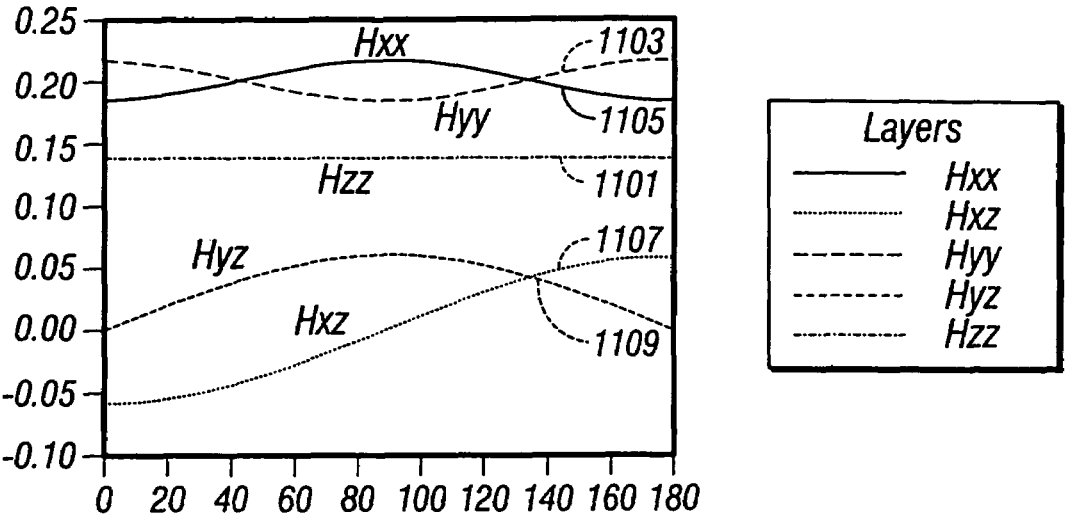
FIG. 83 shows the five component responses to the applied 20-kHz RF magnetic field as the invention is rotated through 180 degrees inside a horizontal borehole within the second bed of FIG. 76.

FIGS. 82 and 83 show graphs of response curves of a horizontal borehole centered at the midpoint (depth of 5 feet) of the second bed layer of FIG. 76. In the horizontal position, the layer above has different resistivities than the layer below, having consequences for the magnetic responses. The position of the tool is static, and the tool is rotated by 180 degrees about its axis. In FIG. 82, the tool is operated at 200 kHz. Since the tool is static and horizontal, the $H_{zz}$ (1001) component is constant with rotation. The $H_{yy}$ (1003) and $H_{xx}$ (1005) components oscillate and interchange their values around a mean value as the tool rotates. It can be shown that the average of $H_{xx}$ and $H_{yy}$ is a constant independent of rotation. However, tool dip, location and the formation type do affect the values of the responses. The angular period of oscillation of $H_{xx}$ and $H_{yy}$ is half a rotation (1801). Likewise $H_{xz}$ (1007) and $H_{yz}$ (1009) also oscillate but have a period of once per full rotation (3601).

The graph in FIG. 83 results from of the same physical configuration as in FIG. 82, except that the tool is operating at 20 kHz. The behavior of all the components is similar to those in Case 10. The angular period of oscillation of $H_{yy}$ (1103) and $H_{xx}$ (1105) is half a rotation (1801). Likewise $H_{xz}$ (1107) and $H_{yz}$ (1109) also oscillate but have a period of once per full rotation (3601). At 20 kHz, the magnitude of the signal response is less than the response at 200 kHz. Also, in FIG. 84, the magnitudes of the $H_{xx}$ (1105) and $H_{yy}$ (1103) components are greater than the magnitude of the $H_{zz}$ (1101) component.

Figure 84:
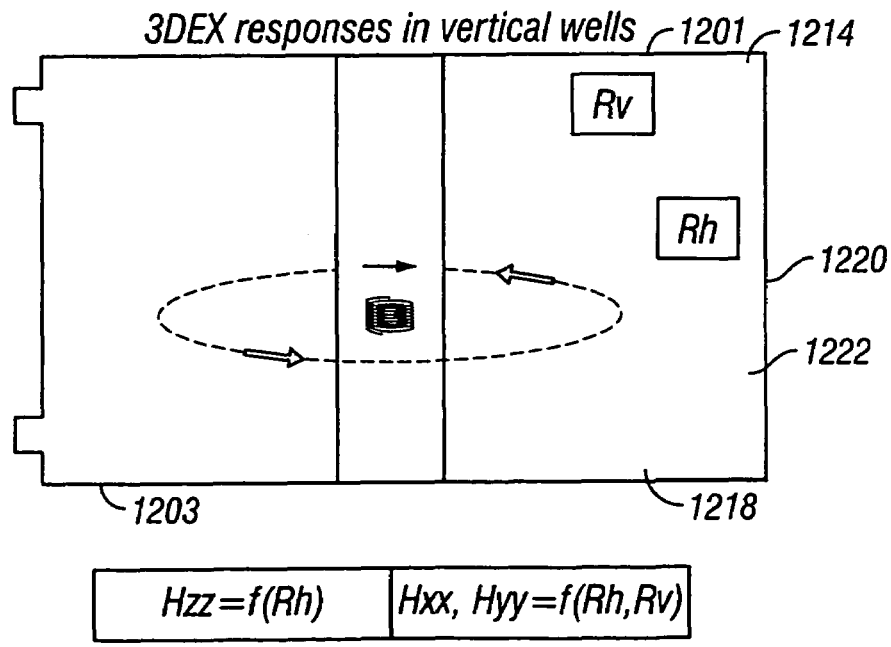
FIG. 84 shows a multi-component 3DEX induction configuration of the invention for vertical wells.

FIG. 84 gives a sketch of a 3DEX multi-component induction configuration in a vertical well. The formation comprises a series of horizontal layers alternating between sand (1220) with high total resistivity (high $R_h$) and shale (1222) with low total resistivity (low $R_t$). The well bore contains two transmitter coils for illustrative purposes. The upper coil (1201), creates a response (1211) that extends in a plane containing a vertical line. This response would be labeled $H_{xx}$ or $H_{yy}$ and would be a function of $R_h$ and of $R_v$. The lower (1203) coil creates a response (1213) that lies entirely within a horizontal plane. This response for $H_{zz}$ would be a function of $R_h$ only.

Figures 85A, 85B:
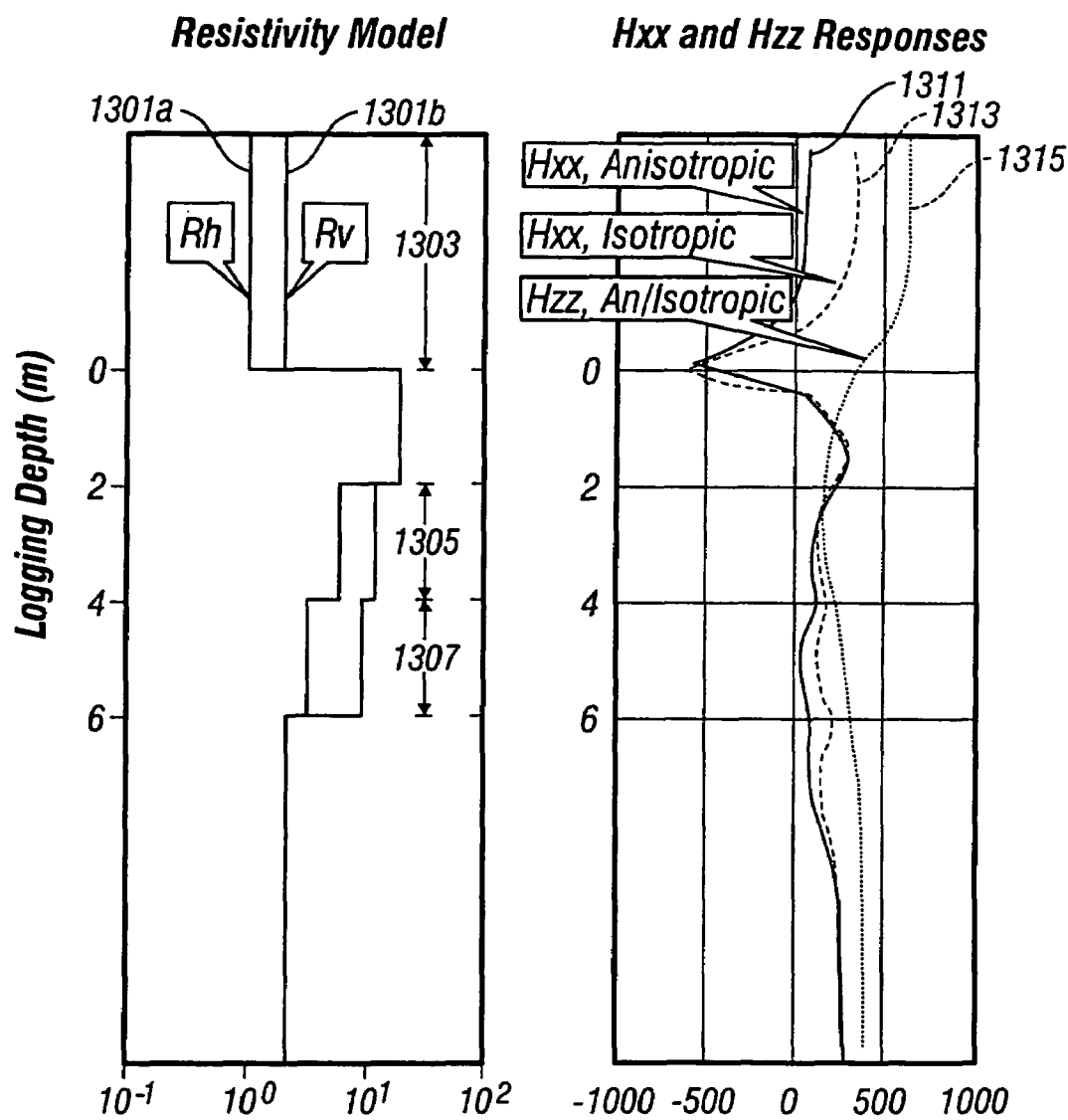
FIG. 85$a$ shows a plot of a model of formation resistivity against logging depth, with three anisotropic resistivity intervals.

Shown in FIG. 85a is a resistivity model of a medium with horizontal and vertical resistivities denoted by 1301a and 1301b. The model has three anisotropic intervals indicated as 1303, 1305, and 1307 where the vertical resistivity $R_v$ is greater than the horizontal resistivity $R_h$. FIG. 85b shows the apparent conductivity responses for the $H_{xx}$ (1311) component in the anisotropic model of FIG. 85a. Also shown is the $H_{xx}$ component (1313) for the case of a resistivity model that is isotropic at all depths. The $H_{zz}$ (1315) component of the response for an isotropic model is the same as for the anisotropic model. From FIG. 85b, the following observations may be made about the resistivity responses for a vertical well in an anisotropic formation: The $H_{zz}$ response (1315) is not responsive to anisotropy in the formation, while the $H_{xx}$ curves (1311, 1313) are responsive. The $H_{xx}$ response is suppressed by anisotropy. The $H_{xx}$ responses are quite complicated and can even reverse sign close to significant resistivity contrasts. The $H_{xx}$ response may have spikes at bed boundaries.

Figure 86:
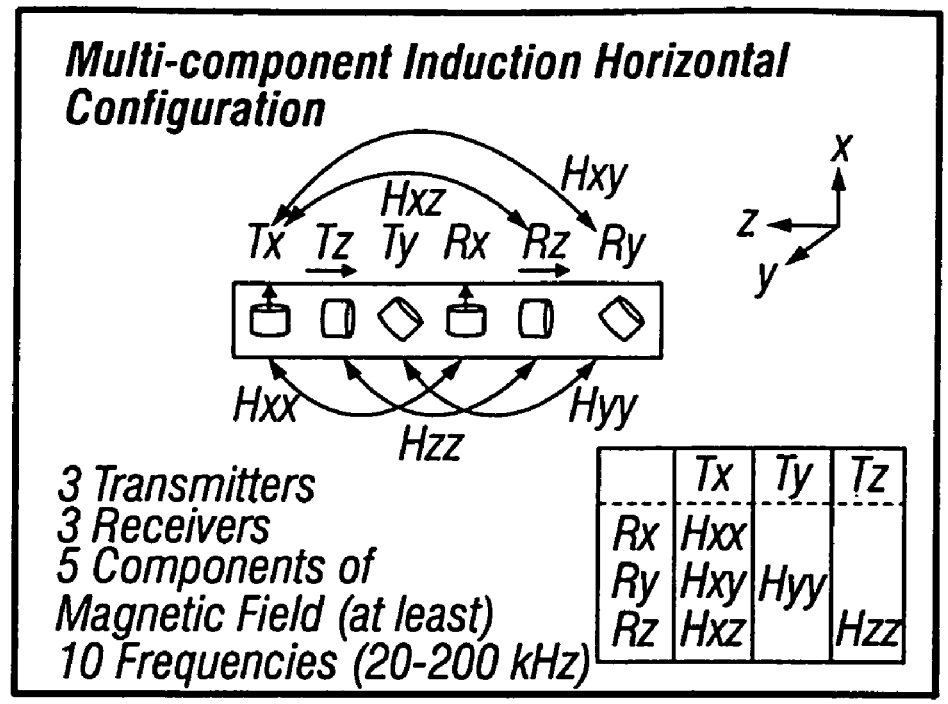
FIG. 86 shows a multi-component induction configuration of the invention for horizontal wells.

FIG. 86 shows a sketch of a horizontal configuration for a multi-component induction tool. The orientation of the transmitters and receivers remain fixed with respect to the tool. The multi-component tool in horizontal configuration is sensitive to the anisotropic formation, tool location as well as the rotation of the tool around its axis. Only the $H_{zz}$ component is insensitive to tool rotation. In horizontal configuration, the average $0.5 \cdot (H_{xx}+H_{yy})$ is independent of tool rotation. The $H_{zz}$ and $0.5 \cdot (H_{xx}+H_{yy})$ measurements are dependent on the formation and the tool location and thus can be used to determine the distance from the bed boundaries and for geo-steering the invention.

The method of the present invention may be used with data acquired with a logging instrument conveyed on a wireline and also with data acquired using a measurements while drilling (MWD) apparatus conveyed on a drilling tubular such as a drill string or coiled tubing. In particular, when used with MWD measurements, this directional information may be used for controlling the direction of drilling and maintaining the position of the borehole relative to beds in the proximity of the borehole.

A MWD tool conveyed to the borehole will perform measurements with the various transmitter receiver array combinations and configurations. These measurements have azimuthal sensitivity and could be symmetric or asymmetric with respect to the tool axis.

Figure 89:
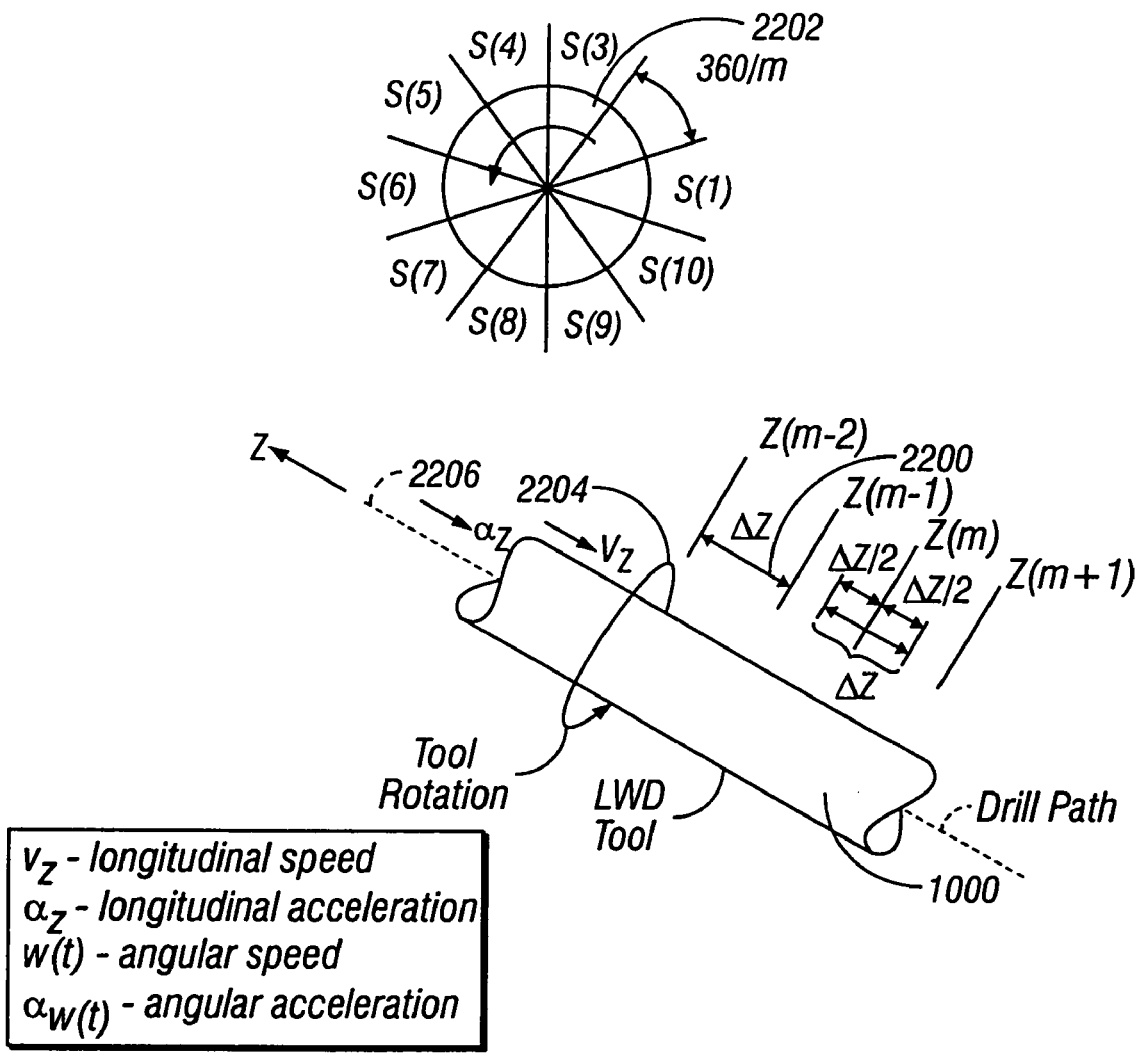
Figures 91, 93:
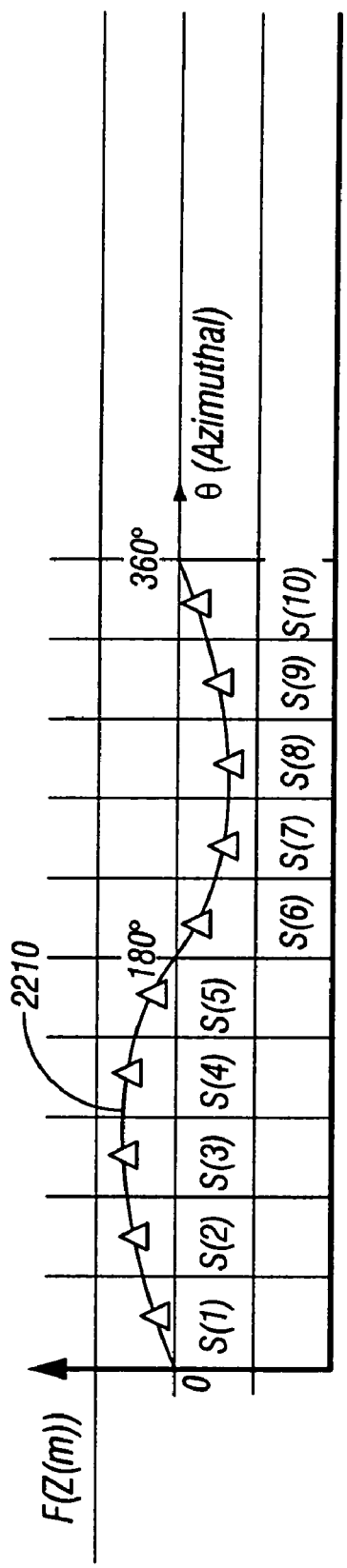
Figure 92:
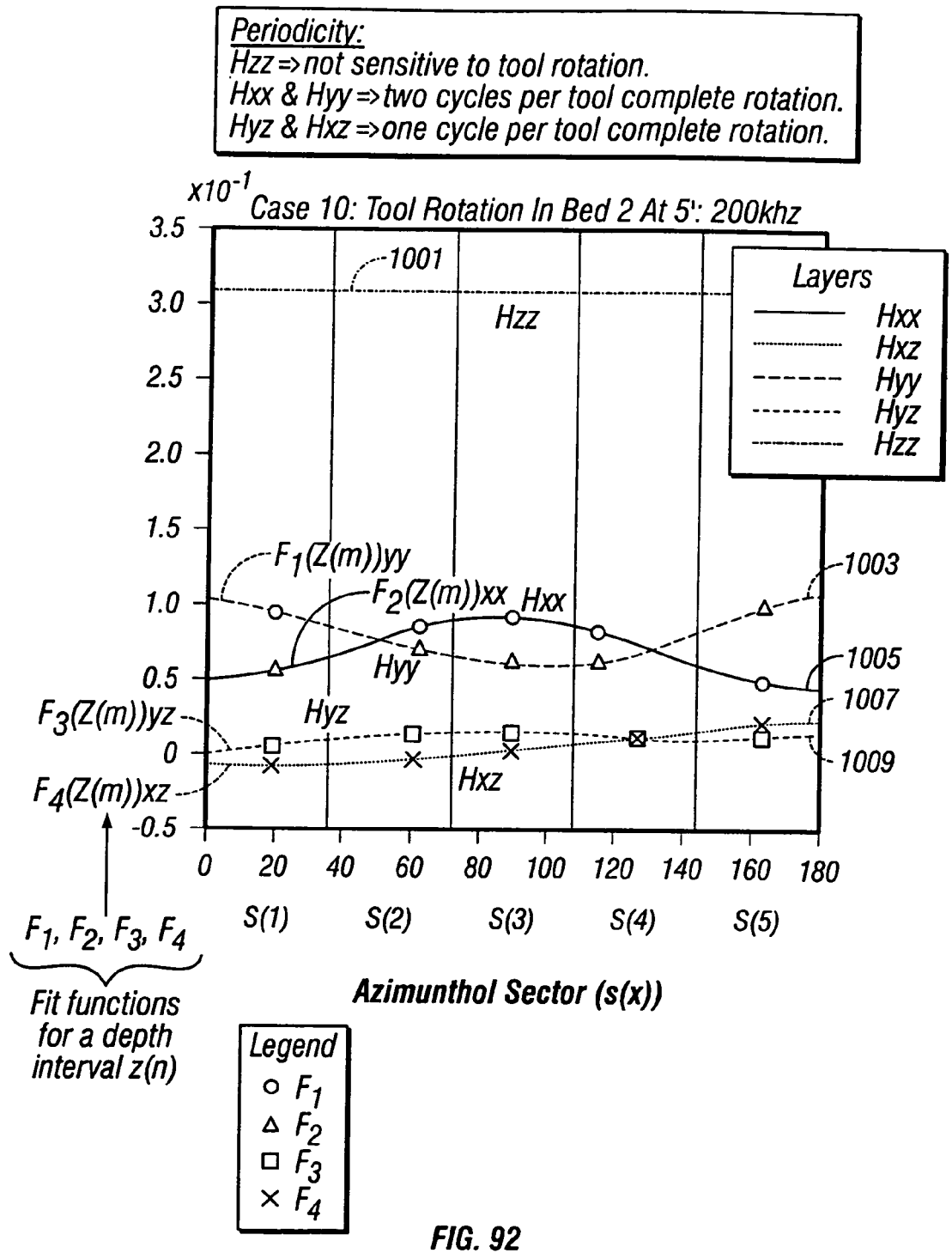

These measurements are deeper electromagnetic data than what is obtained from MWD image tools or other shallow azimuthal tools. In order to improve signal to noise ratio and facilitate interpretation these azimuthal measurements can be organized by depth interval (down to the desired depth resolution) and azimuth sector. FIG. 89 shows a MWD tool 1000 placed in the borehole along the drill path 2206. This tool travels along the drill path with a vertical velocity Vz (t) and an acceleration Az(t). The tool also rotates around its longitudinal axis as indicated by arrow 2204 with an angular velocity w(t) and angular acceleration Aw(t). All these dynamic variables can represent the basic tool movements and position inside the borehole. A cross section of the MWD tool shows the azimuthal angular positions within the borehole divided into ten sectors S(1), S(2), through S(10) for example. One azimuthal sector 2202 is shown in this figure. Auxiliary measurements usually made with with this type of tool such as inclinometer, gyroscope (fiber, mechanical, etc . . . ), accelerometers (1, 2 and 3 axis), magnetometers provide additional data to recognize the drill path and also the relative position of the tool with respect to the formation while these measurements were performed. With this data available it is possible to bin the measured raw data (RD) in two dimensional bins plus well path and tool position data relative to the formation. The raw data can be organized in depth intervals (n) and azimuth sectors (k) clusters to obtain a raw data array RD(n,k,$t_i$). The raw data time series assigned to an azimuth sector might not have equal time interval sampling with respect to the transmitter source's periodic repeat cycle since the tool rotation very likely might not be synchronized with this transmitter source periodic repeat cycle. Time averaging of this re-organized raw data can reduce the signal to noise ratio and improve its accuracy by reducing the standard deviation of the raw data as shown by equations in FIG. 93 for repetitive time domain or frequency domain transmitter sources. The measured raw data time series is clustered in depth intervals, azimuth sector and assigned to a relative time point within the transmitter source's periodic cycle time interval. Optionally in at least one step the tool a portion of the tool could be stationary and pointed in a preferred azimuth direction while the the raw data (RD) time series is acquired. The clustered in bins and averaged data M(n,k) 2208 for each depth interval n and azimuth sector k can form another array in table illustrated in FIG. 90. During drilling planning the well path is defined along a reservoir geological model with the reservoir physical parameter description including for the resistivity targets associated with the objectives justifying the drilling the well. These resistivity targets have a characteristic response. FIG. 92 shows for example various azimuthal responses for certain multicomponent induction measurements (Hxx, Hyy, Hxz, Hyz) to resistivity layers. The averaged data in table shown in FIG. 90 can be used to estimate this expected azimuthal response of the measurement array to a specific formation target of known characteristics and then this estimate can be used to interpret the parameters of the geometry (distance direction thickness) and material properties of this target. All examples shown in FIG. 92 follow a trigonometric sinusoidal function. Hxx and Hyy have two identical cycles per complete tool rotation and Hyz and Hxz have one symmetric cycle per tool rotation.

Different targets will have a different function. Failure to properly match the expected functions for a given measurement array and specified formation target could be displayed visually or in a summary report as mismatches are identified (expected versus actual) or error between averaged array data (M(n,k)) and function estimate 2210 of the expected relationships associated with expected formation response (FIG. 91). Actual data for various azimuth sector and expected functions is illustrated in charts shown in FIG. 92, which contains four functions (F1 through F4). This information could be used for geo-steering, drilling and well placement decision while drilling.

Figure 94:
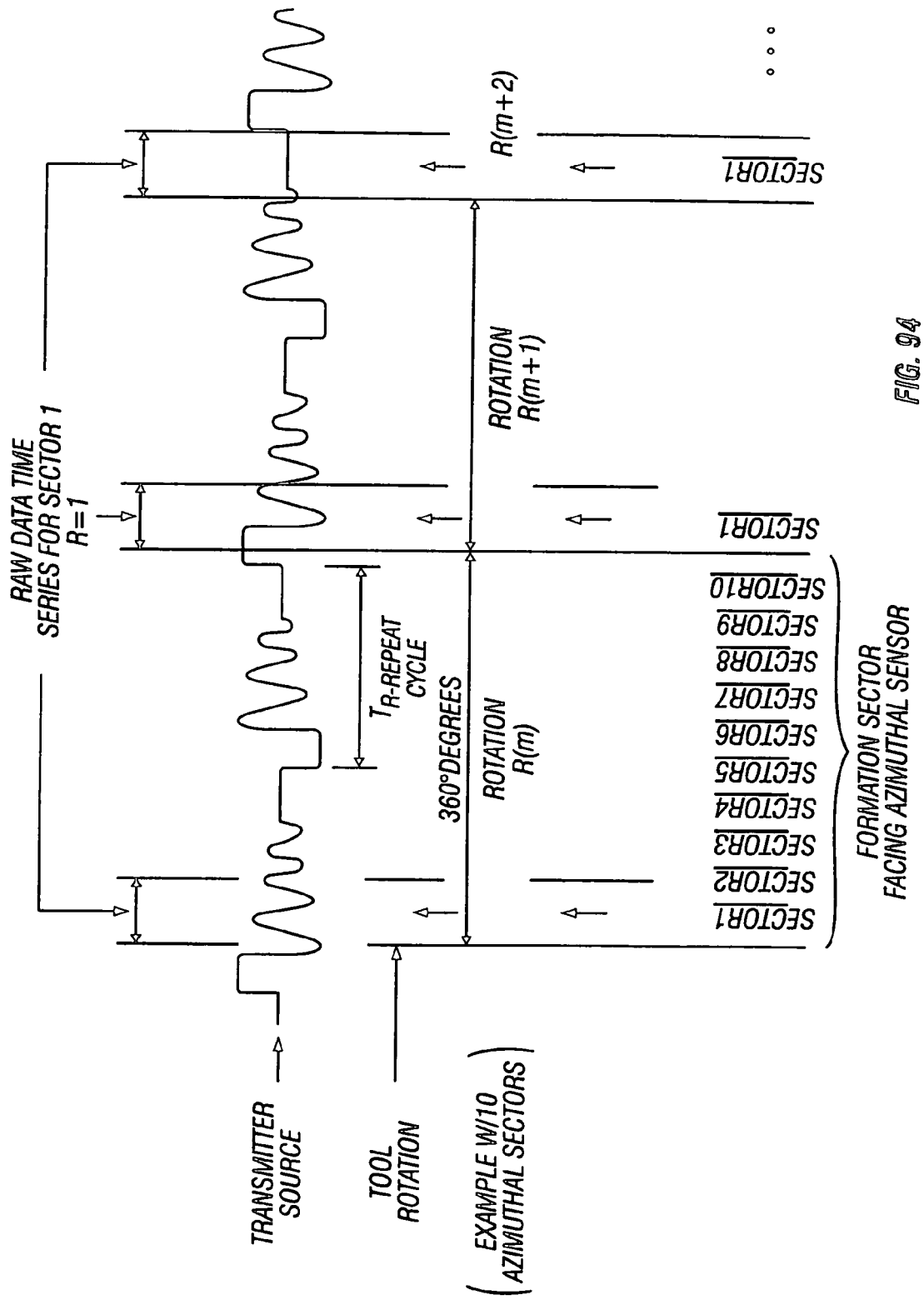
FIG. 94, the raw data assigned to a depth interval and azimuth sector can fall in different points of the repeat cycle.

For time averaging to occur, the transmitter source is preferably periodic with respect to both time domain and frequency domain. As shown in FIG. 94, the raw data assigned to a depth interval and azimuth sector can fall in different points of the repeat cycle thus, in this case, the time averaging algorithm will average a time series which might not have equal time intervals between sampled points. The tool rotation is not synchronized with a transmitter repeat cycle, however, in an alternative embodiment, the tool rotation can be synchronized with the transmitter repeat cycle. In another embodiment of the method of the present invention, the tool is held stationary while the raw data times are collected. In this case the measuring part of the tool is non-rotating.

The data is interpreted for geo-steering application in association with other acquired microresistivity and image logs such as nuclear, resistivity, and acoustic borehole images. The transmitter can be on the surface or in a nearby well. Flexible circuits are also used in other auxiliary and complementary electromagnetic measurements for both geo-steering and formation evaluation.

The above example of a preferred embodiment has been provided for illustration purposes only and is not intended to limit the scope of the invention, which is determined by the following claims.

What is claimed is:

1. A method of determining a parameter of interest of an earth formation having a plurality of layers, the method comprising:
   conveying a multi-component resistivity logging tool into a borehole in said formation;
   using at least one transmitter receiver combinations and providing a measurement indicative of the parameter of interest;
   using a switchable aperture on a shield of the resistivity logging tool for providing a selective sensitivity to the parameter of interest;
   wherein using the switchable aperture further comprises using a switching device to alter at least one of (i) a vertical dimension of the aperture, (ii) a horizontal dimension of the aperture.

2. The method of claim 1, further comprising using the measurement for at least one of (i) geo-steering, and (ii) drilling assistance and well placement decisions.

3. The method of claim 2 wherein the measurement further comprises a measurement made with a multi-component array and wherein using the measurement further comprises using a measurement made with at least one of: (i) a gyroscope, (ii) an accelerometer, (iii) a magnetometer, and (iv) an inclinometer.

4. The method of claim 1, further comprising:
   performing dual compensated measurement of a multi-component array to improve at least one of: (i) a signal to noise ratio, (ii) measurement stability and (iii) signal content with reservoir, geological and geophysical information.

5. The method of claim 1, wherein providing the measurement further comprises providing the measurement at a plurality of frequencies, and using the measurement at the plurality of frequencies for determining the parameter of interest.

6. The method of claim 1 wherein using the switchable aperture further comprises making a measurement at least one of (i) and xy orientation, (ii) an xz orientation, (iii) a yz orientation, (iv) a 2'-4' orientation, and (v) a 4'-9' orientation.

7. The method of claim 1, wherein providing the measurement further comprises:
   measuring a time domain response; and
   converting the time domain response into a frequency domain response.

8. The method of claim 1, further comprising:
   binning measurements made by the logging tool at a plurality of rotational angles.

9. The method of claim 8 further comprising:
   averaging depth intervals and azimuthal sectors for the binned measurement data.

10. The method of claim 9 further comprising:
    processing the binned measurement data; and
    estimating or inverting formation drilling target parameters from the processed binned measurement data from a given transmitter receiver array.

11. The method of claim 1, where rotation of the tool is not synchronized with a transmitter repeat cycle.

* * * * *